United States Patent
Li et al.

(10) Patent No.: US 12,497,378 B2
(45) Date of Patent: Dec. 16, 2025

(54) TETRAHYDRONAPHTHALENE COMPOUNDS, PHARMACEUTICAL COMPOSITIONS, AND USES THEREOF

(71) Applicant: GUANGZHOU HENOVCOM BIOSCIENCE CO., LTD., Guangzhou (CN)

(72) Inventors: Deyao Li, Guangzhou (CN); Yiqian Zhou, Guangzhou (CN); Qi Guo, Guangzhou (CN); Huajin You, Guangzhou (CN); Lijun Zhang, Guangzhou (CN); Jiancun Zhang, Guangzhou (CN)

(73) Assignee: GUANGZHOU HENOVCOM BIOSCIENCE CO., LTD., Guangzhou (CN)

( * ) Notice: Subject to any disclaimer, the term of this patent is extended or adjusted under 35 U.S.C. 154(b) by 414 days.

(21) Appl. No.: 18/033,621

(22) PCT Filed: Oct. 26, 2021

(86) PCT No.: PCT/CN2021/126336
§ 371 (c)(1),
(2) Date: Apr. 25, 2023

(87) PCT Pub. No.: WO2022/089408
PCT Pub. Date: May 5, 2022

(65) Prior Publication Data
US 2023/0391744 A1    Dec. 7, 2023

(30) Foreign Application Priority Data

Oct. 27, 2020   (CN) .......................... 202011162561.3

(51) Int. Cl.
*C07D 333/26*   (2006.01)
(52) U.S. Cl.
CPC .................................. *C07D 333/26* (2013.01)
(58) Field of Classification Search
CPC .................................................. C07D 333/26
USPC ........................................................ 514/438
See application file for complete search history.

(56) References Cited

U.S. PATENT DOCUMENTS

| | | |
|---|---|---|
| 4,931,270 A | 6/1990 | Horn et al. |
| 8,383,093 B1 * | 2/2013 | Moreadith ............ A61K 9/0019 424/78.3 |
| 2015/0218136 A1 | 8/2015 | Kandula |
| 2016/0015684 A1 | 1/2016 | Higuchi et al. |

FOREIGN PATENT DOCUMENTS

| | | |
|---|---|---|
| CN | 1832734 A | 9/2006 |
| CN | 101534809 A | 9/2009 |
| CN | 108341798 A | 7/2018 |
| CN | 109415335 A | 3/2019 |
| EP | 0254989 A2 | 2/1988 |
| WO | 8912445 A1 | 12/1989 |
| WO | 2013067199 A2 | 5/2013 |
| WO | 2018014277 A1 | 1/2018 |

OTHER PUBLICATIONS

PCT/CN/2021/126336 Translated preliminary report on patentability (Year: 2023).*
International Search Report for PCT/CN2021/126336, mailed on Feb. 8, 2022.
S.P.Parker, Ed., McGraw-Hill Dictionary of Chemical Terms(1984)McGraw-Hill Book Company, New York ; and Eliel, E.and Wilen, S., "Stereochemistry of Organic Compounds", John Wiley & Sons, Inc., New York, 1994.
Eliel, Ernest L., Stereochemistry of Organic Compounds; John Wiley & Sons, Inc., A Wiley-Interscience Publication 1994.

* cited by examiner

*Primary Examiner* — Yevgeny Valenrod
(74) *Attorney, Agent, or Firm* — Schmeiser, Olsen & Watts LLP

(57) ABSTRACT

A novel tetrahydronaphthalene compound is provided, or a stereoisomer, a solvate, a pharmaceutically acceptable salt thereof, or a pharmaceutical composition including the compound, and a use of the compound or the composition for preparing a medicament in prevention and/or treatment of a central nervous system disease, wherein the compound has a structure of formula (I),

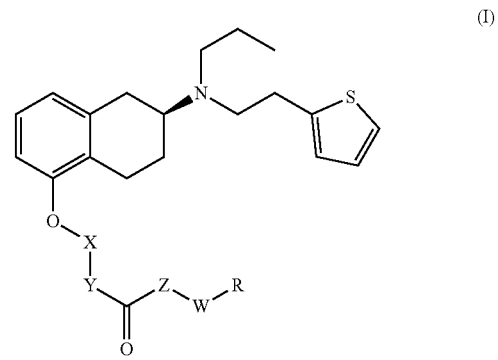

wherein each of X, Y, Z, W and R is defined as described in the present disclosure.

20 Claims, 1 Drawing Sheet

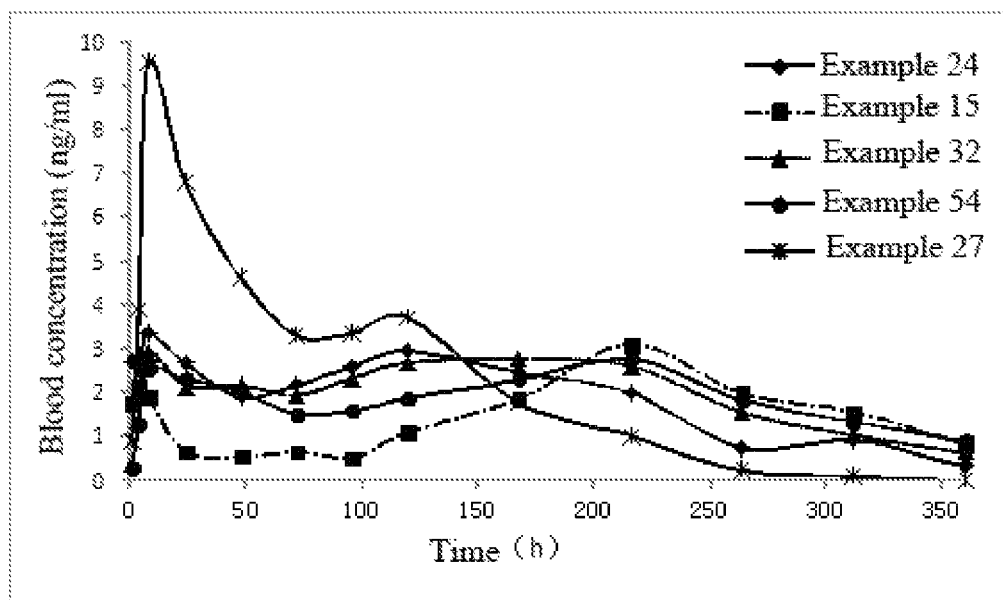

TETRAHYDRONAPHTHALENE COMPOUNDS, PHARMACEUTICAL COMPOSITIONS, AND USES THEREOF

CROSS-REFERENCE TO RELATED APPLICATIONS

This application claims priority to PCT Application No. PCT/CN2021/126336, having a filing date of Oct. 26, 2021, which is based on Chinese Application No. 202011162561.3, having a filing date of Oct. 27, 2020, the entire contents both of which are hereby incorporated by reference.

FIELD OF TECHNOLOGY

The following relates to the technical field of pharmaceutical chemistry, particularly, it relates to a tetrahydronaphthalene compound, or a stereoisomer, a solvate, or a pharmaceutically acceptable salt thereof, a pharmaceutical composition comprising the compound and a use of the compound or the composition for preparing a medicament in prevention and/or treatment of a central nervous system disease.

BACKGROUND

Parkinson's diseases (PD), also named as paralysis agitans, is a common neurodegenerative disease. It is a progressive and multiple disease with insidious onset etc., and its clinical symptoms mainly include motor symptoms, such as slow movement, static tremor, muscle rigidity, etc., and non-motor symptoms, such as constipation, sleep disorder, dysphagia, Restless Legs Syndrome (RLS), etc. PD is the second most common neurodegenerative disease, ranking after Alzheimer's disease. According to the statistics from National Parkinson Foundation of America in 2013, there were 4 to 6 million patients all over the world. In industrialized countries, the prevalence rate of PD was close to 0.3% of the total population. The proportion of PD patients aged 60 years or older was 1%, and it increased rapidly to 4%-5% for patients aged over 85 years. For the 10 most populous countries in the world and the 5 most populous countries in Western Europe, a study showed that the number of PD patients in these 15 countries will reach 8.7 to 9.3 million in 2030, indicating an approximately double incidence as compared with the current incidence.

Restless Legs Syndrome (RLS) is a central nervous system disease and was firstly described by a British doctor, Thomas Willis, in 1672, and it was not concerned by clinicians until the 1980s. Its clinical manifestations usually include extreme discomfort of both lower limbs of patients during a nighttime sleep, and therefore the patients are forced to keep moving their lower limbs or walking, which may seriously affect their sleep, quality of life, and cause depression and anxiety, etc.

According to the statistics, the incidence rate of RLS in PD patients (pRLS) is significantly higher than that in common population. The incidence rate of pRLS in Asia is 0.98% to 27.5%, while the incidence rate of pRLS in Europe and America is 5.5% to 27%. However, the incidence rate of primary RLs (iRLS) in Asia is 0.9% to 12.1%, which is significantly lower than that in Europe and America (3.9% to 18.8%). The incidence rate of sleep disorders in PD patients is about 70%, and pRLS is one of the factors causing sleep problems. The use of dopaminergic drugs may be beneficial in the treatment of PD and RLS. It is well-known that Levodopa-based dopamine replacement therapy is still a "gold standard" for PD treatment. However, as the treatment time of levodopa is increasing, motor complications occur after its long-term application and seriously affect the quality of life of the patients. Studies have shown that the occurrence of motor complications can be prevented and reversed by prolonging the action time of dopamine drugs and providing sustained dopaminergic stimulation.

Rotigotine is a non-ergot dopamine receptor agonist, which can be used to treat Parkinson's disease by stimulating the dopamine receptor. Rotigotine is also an effective therapeutic drug recommended for the treatment of RLS by the Federation of European Neuroscience Societies, the European Academy of Neurology and the European Sleep Research Society. However, Rotigotine has poor oral-bioavailability and strong first-pass effect, and therefore it should not be administrated orally. At present, available Rotigotine in the market is a once-a-day transdermal absorption and controlled release patch, which was approved by the FDA in May 2007 for the adjuvant therapy of early primary PD and advanced PD, and was also approved by FDA in February, 2012 for a new indication, i.e., Restless Legs Syndrome (RLS). However, as the transdermal patch, local skin reactions such as erythema, dermatitis and pruritus often occur, which will seriously affect patient's compliance and lead to discontinuity of medication. Discontinued medication may lead to repeated peaks and troughs of blood drug concentrations, which may aggravate the conditions and bring more serious mental and financial burden to the patients or their families. The Chinese patents CN108341798 and CN109415335 disclose a long-acting prodrug derivative of Rotigotine, but the melting points of the compounds disclosed in the patents do not exceed 53° C. The low melting points of the compounds cause a great number of difficulties for large-scale preparation of the preparations, and easily lead to the change of the properties of the drugs during a long-term storage. Further, it will affect the stable release of long-acting drugs in the body, leading to fluctuations in effective blood drug concentration in the body, and eventually make the long-acting drugs lose their long-acting effects. Therefore, it is necessary to modify the structure of Rotigotine compounds to obtain a novel tetrahydronaphthalene compound and prepare a long-acting preparation. Thus, the frequency of administration is reduced, patient's compliance with medication is improved, or forgetfulness of medication due to the inherent forgetfulness of elderly patients with PD is avoided, thereby ensuring the continuity of medication and improving efficacy, which bring great benefits for patients or their families and even for society. The compound of the present disclosure has a high melting point and a low water-solubility, and can be well prepared into a suspension preparation with a low dissolution rate, and its efficacy can last for several weeks after a single administration.

Definition and General Terms

All the scientific and technological terms used in the present disclosure have the same meaning as commonly understood by those skilled in the conventional art to which the present disclosure belongs, unless otherwise stated. All patents and publications related to the present disclosure are incorporated into the present disclosure by reference in their entirety.

Unless otherwise stated or there is an obvious conflict in context, the articles "a", "an" and "the" used herein are intended to include "at least one" or "one or more". Therefore, these articles used herein refer to articles of one or more than one (i.e. at least one) article. For example, "a component" means one or more components, that is, more than one component may be considered to be applied or used in the example of the technical solution.

"Stereoisomers" refer to compounds having the same chemical structure, but different arrangement of the atoms or groups in space. The stereoisomers include enantiomers, diastereomers, conformational isomers (rotational isomers), geometrical isomers (cis/trans isomers), atropisomers, etc.

The stereochemical definitions and rules used in the present disclosure generally follow S. P. Parker, Ed., *McGraw-Hill Dictionary of Chemical Terms* (1984) McGraw-Hill Book Company, New York; and Eliel, E. and Wilen, S., "*Stereochemistry of Organic Compounds*", John Wiley & Sons, Inc., New York, 1994.

Any asymmetric atoms (e.g., carbon, etc.) of a compound disclosed herein can exist in racemic or enantiomerically enriched form, such as (R)-configuration, (S)-configuration, or (R, S)-configuration. In some embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)-configuration or (S)-configuration.

"Pharmaceutically acceptable" refers to some compounds, materials, compositions and/or preparations, which within reasonable medical judgements, are suitable for contact with patients' tissues without excessive toxicity, irritation, allergic reactions, or other problems and complications corresponding to a reasonable benefit/risk ratio, and are effectively used for the intended purpose.

In general, the term "substituted" means that one or more hydrogen atoms in a given structure are replaced by a specified substituent. Unless otherwise stated, one substituted group can have a substituent at each substitutable position of the group. When more than one position in the given structural formula can be substituted by one or more substituents selected from a specific group, then the substituents can be substituted at each position with the same or different substitutions.

The term "unsubstituted" indicates that the specified group does not have any substituent.

The term "optionally substituted . . . with" and the term "unsubstituted or substituted . . . with" are interchangeable, that is, the structure is unsubstituted or substituted with one or more substituents of the present disclosure. The substituents of the present disclosure include, but are not limited to, H, D, oxo(=O), thio(=S), F, Cl, Br, I, $N_3$, CN, $NO_2$, OH, SH, $NH_2$, carbonyl, alkyl, haloalkyl, alkenyl, alkynyl, alkoxy, alkylamino, hydroxyalkyl, cyanoalkyl, cycloalkyl, heterocyclyl, —C(=O)NH—$R^{4a}$, —NHC(=O)—$R^{4a}$, —S(=O)$_{1-2}$NH—$R^{4b}$, —NHS(=O)$_{1-2}$—$R^{4b}$, $C_{6-10}$ aryl, or $C_{1-9}$ heteroaryl, etc., wherein each of $R^{4a}$ and $R^{4b}$ is defined as described in the present disclosure.

In addition, it should be noted that, unless otherwise expressly stated, the description ways used in the present disclosure such as "each of . . . is independently selected from . . . " and "are each independently selected from" and " . . . are independently" are interchangeable and should be understood in broad sense. It may mean that specific options expressed on the same symbol in different groups do not affect each other, and it also may mean that specific options expressed on the same symbol in the same group do not affect each other.

In each part of the description of the present disclosure, the substituents of the compounds disclosed in the present disclosure are disclosed according to the type or scope of the group. In particular, the present disclosure includes each independent subcombination of each member of the type and scope of these groups. For example, the term "$C_{1-6}$ alkyl" specifically refers to independently disclosed methyl, ethyl, $C_3$ alkyl, $C_4$ alkyl, $C_5$ alkyl, and $C_6$ alkyl.

In each part of the description of the present disclosure, the term linking substituent is described. When the structure clearly needs a linking group, the Markush variables listed for the group should be understood as the linking group. For example, if the structure requires a linking group and the Markush group definition for the variable lists "alkyl" or "aryl", it should be understood that the "alkyl" or "aryl" respectively represents a linked alkylene group or arylene group.

The term "alkyl" or "alkyl group" used herein means a saturated linear or branched monovalent hydrocarbon group containing 1 to 30 carbon atoms, wherein the alkyl group may be optionally substituted with one or more substituents described herein. Unless otherwise specified, the alkyl group contains 1 to 30 carbon atoms. Unless otherwise specified, the alkyl group contains 1 to 22 carbon atoms. In one embodiment, the alkyl group contains 1 to 12 carbon atoms; in another embodiment, the alkyl group contains 1 to 6 carbon atoms; in a further embodiment, the alkyl group contains 1 to 4 carbon atoms; in yet another embodiment, the alkyl group contains 1 to 3 carbon atoms. The alkyl group may be optionally substituted with one or more substituents described herein.

Embodiments of the alkyl group include, but are not limited to, methyl (Me, —$CH_3$), ethyl (Et, —$CH_2CH_3$), n-propyl (n-Pr, —$CH_2CH_2CH_3$), isopropyl (i-Pr, —CH($CH_3$)$_2$), n-butyl (n-Bu, —$CH_2CH_2CH_2CH_3$), isobutyl (i-Bu, —$CH_2CH(CH_3)_2$), sec-butyl (s-Bu, —CH($CH_3$)$CH_2CH_3$), tert-butyl (t-Bu, —C($CH_3$)$_3$), n-pentyl (—$CH_2CH_2CH_2CH_2CH_3$), 2-pentyl (—CH($CH_3$)$CH_2CH_2CH_3$), 3-pentyl (—CH($CH_2CH_3$)$_2$), 2-methyl-2-butyl (—C($CH_3$)$_2CH_2CH_3$), 3-methyl-2-butyl (—CH($CH_3$)CH($CH_3$)$_2$), 3-methyl-1-butyl (—$CH_2CH_2CH(CH_3)_2$), 2-methyl-1-butyl (—$CH_2CH(CH_3)CH_2CH_3$), n-hexyl (—$CH_2CH_2CH_2CH_2CH_2CH_3$), 2-hexyl (—CH($CH_3$)$CH_2CH_2CH_2CH_3$), 3-hexyl (—CH($CH_2CH_3$)($CH_2CH_2CH_3$)), 2-methyl-2-pentyl (—C($CH_3$)$_2CH_2CH_2CH_3$), 3-methyl-2-pentyl (—CH($CH_3$)CH($CH_3$)$CH_2CH_3$), 4-methyl-2-pentyl (—CH($CH_3$)$CH_2CH(CH_3)_2$), 3-methyl-3-pentyl (—C($CH_3$)($CH_2CH_3$)$_2$), 2-methyl-3-pentyl (—CH($CH_2CH_3$)CH($CH_3$)$_2$), 2,3-dimethyl-2-butyl (—C($CH_3$)$_2$CH($CH_3$)$_2$), 3,3-dimethyl-2-butyl (—CH($CH_3$)C($CH_3$)$_3$), n-heptyl, n-octyl, etc.

The term "alkenyl" means a linear or branched monovalent hydrocarbyl group containing 2 to 30 carbon atoms, wherein there is at least one unsaturation point, that is, a carbon-carbon $sp^2$ double bond, which includes "cis" and "trans" configurations, or "E" and "Z" configurations. In one embodiment, the alkenyl group contains 2 to 30 carbon atoms; in one embodiment, the alkenyl group contains 2 to 22 carbon atoms; in one embodiment, the alkenyl group contains 2 to 8 carbon atoms; in another embodiment, the alkenyl group contains 2 to 6 carbon atoms; in yet another embodiment, the alkenyl group contains 2 to 4 carbon atoms. Embodiments of alkenyl group include, but are not limited to, vinyl (—CH=$CH_2$), allyl (—$CH_2$CH=$CH_2$), etc. The alkenyl group may be optionally substituted with one or more substituents described herein.

The term "alkynyl" means a linear or branched monovalent hydrocarbon group containing 2 to 30 carbon atoms, wherein there is at least one unsaturation point, that is, a carbon-carbon sp triple bond. In one embodiment, the alkynyl group contains 2 to 30 carbon atoms; in one embodiment, the alkynyl group contains 2 to 22 carbon atoms; in one embodiment, the alkynyl group contains 2 to 8 carbon atoms; in another embodiment, the alkynyl group contains 2 to 6 carbon atoms; in yet another embodiment, the alkynyl group contains 2 to 4 carbon atoms. Embodiments of alkynyl group include, but are not limited to, ethynyl (—C≡CH), propargyl (—CH$_2$C≡CH), 1-propynyl (—C≡C—CH$_3$), etc. The alkynyl group may be optionally substituted with one or more substituents described herein.

The term "aliphatic" or "aliphatic group" used in the present disclosure refers to a linear (i.e. non-branched) or branched, substituted or unsubstituted hydrocarbon chain that is fully saturated or is unsaturated with one or more unsaturated degree. Unless otherwise specified, the aliphatic group contains 1 to 30 carbon atoms; in some embodiments, the aliphatic group contains 1 to 20 carbon atoms; in some embodiments, the aliphatic group contains 1 to 10 carbon atoms; in some other embodiments, the aliphatic group contains 1 to 8 carbon atoms; in some other embodiments, the aliphatic group contains 1 to 6 carbon atoms; in some other embodiments, the aliphatic group contains 1 to 4 carbon atoms; in some other embodiments, the aliphatic group contains 1 to 3 carbon atoms. Suitable aliphatic groups include, but are not limited to linear or branched, substituted or unsubstituted alkyl, alkenyl, or alkynyl, wherein the alkyl, alkenyl, or alkynyl are defined as described in the present disclosure. Embodiments of aliphatic or aliphatic group include, but are not limited to methyl, ethyl, propyl, iso-propyl, butyl, tert-butyl, hexyl, iso-butyl, sec-butyl, ethenyl, propenyl, butenyl, ethynyl, etc.

The term "cycloalkyl" used herein, unless otherwise specified, refers to a monovalent saturated or partially unsaturated (but not aromatic) monocyclic or polycyclic hydrocarbon. In some embodiments, the cycloalkyl group may be a bridged or unbridged, spiro cyclic or non-spiro cyclic, and/or fused or non-fused bicyclic. In some embodiments, the cycloalkyl group includes 3 to 10 carbon atoms, i.e. C$_3$ to C$_{10}$ cycloalkyl. In some embodiments, the cycloalkyl group has 3 to (C$_{3-15}$), 3 to 10 (C$_{3-10}$), or 3 to 7 (C$_{3-7}$) carbon atoms. In some embodiments, the cycloalkyl group is monocyclic or bicyclic. In some embodiments, the cycloalkyl group is monocyclic. In some embodiments, the cycloalkyl group is bicyclic. In some embodiments, the cycloalkyl group is tricyclic. In some embodiments, the cycloalkyl group is fully saturated. In some embodiments, the cycloalkyl group is partially saturated. In some embodiments, the cycloalkyl group is cyclopropyl, cyclobutyl, cyclopentyl, cyclohexyl, cycloheptyl, bicyclo[2.1.1]hexyl, bicyclo[2.2.1]heptyl, decahydronaphthyl, or adamantyl. When a cycloalkyl group is substituted, it can be on any ring, that is, on any aromatic or non-aromatic ring contained by the cycloalkyl group, and it is independently substituted with one or more substituents described herein.

The terms "heterocyclyl" and "heterocycle" are used interchangeably herein, and unless otherwise specified, they refer to a monovalent monocyclic non-aromatic ring system and/or polycyclic ring system containing at least one non-aromatic ring; wherein the non-aromatic monocyclic ring atoms comprise one or more heteroatoms (in some embodiments, there being 1, 2, 3, or 4 heteroatoms) independently selected from O, S(O)$_{0-2}$ and N, and the remaining ring atoms are all carbon atoms; and wherein the ring atoms in the polycyclic ring system comprise one or more heteroatoms (in some embodiments, there being 1, 2, 3, or 4 heteroatoms) independently selected from O, S(O)$_{0-2}$ and N, and the remaining ring atoms are all carbon atoms. In some embodiments, the heterocyclyl contains 1 or 2 heteroatoms, which are nitrogen atoms. In some embodiments, the heterocyclyl is polycyclic and contains one heteroatom in a non-aromatic ring, or contains one heteroatom in an aromatic ring, or contains two heteroatoms in an aromatic ring, or contains two heteroatoms, one an aromatic ring and the other in a non-aromatic ring. In some embodiments, the heterocyclyl group has 3 to 20, 3 to 15, 3 to 10, 3 to 8, 4 to 7, or 5 to 6 ring atoms. In some embodiments, the heterocyclyl group is a monocyclic, bicyclic, tricyclic, or tetracyclic ring system. In some embodiments, the heterocyclyl group may be a bridged or unbridged, spiro cyclic or non-spiro cyclic, and/or fused or non-fused bicyclic. One or more nitrogen atoms and sulfur atoms can be optionally oxidized, and one or more nitrogen atoms can be optionally quaternized, and one or more carbon atoms can be optionally substituted with

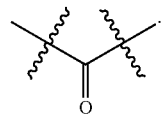

Some rings may be partially or fully saturated, or aromatic, provided that the heterocycle is not fully aromatic. The monocyclic heterocycle and polycyclic heterocycle may be connected to the main structure at any heteroatoms or carbon atoms that result in a steady compound. The polycyclic heterocyclyl can be connected to the main structure through any ring, including any aromatic or non-aromatic ring, regardless of whether the ring contains a heteroatom or not. In some embodiments, the heterocyclyl is a "heterocycloalkyl group", which is 1) a saturated or partially unsaturated (but not aromatic) monovalent monocyclic group containing at least one heterocycloatom as described herein, or 2) saturated or partially unsaturated (but not aromatic) monovalent bicyclyl or tricyclic group, wherein at least one ring contains at least one heteroatom as described herein. When the heterocyclyl and heterocycloalkyl group are substituted, they can be substituted on any ring, that is, on any aromatic or non-aromatic ring contained by the heterocyclyl and heterocycloalkyl group. In some embodiments, such heterocyclyl group includes, but is not limited to, epoxyethanyl, azetidinyl, oxetanyl, thietanyl, pyrrolidinyl, 2-pyrrolinyl, 3-pyrrolinyl, pyrazolinyl, pyrazolidinyl, imidazolinyl, imidazolidinyl, tetrahydrofuranyl, dihydrofuranyl, tetrahydrothienyl, dihydrothienyl, 1,3-dioxolanyl, dithiolanyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thioxanyl, homopiperazinyl, homopiperidinyl, oxepanyl, thiepanyl, oxazepinyl, diazepinyl, thiazepinyl, benzodioxanyl, benzodioxolyl, benzofuranone, benzopyranone, benzopyranyl, dihydrobenzofuranyl, benzotetrahydrothienyl, benzothiopyranyl, benzoxazinyl, β-carbolinyl, benzopyranyl, chromonyl, cinnolyl, coumaryl, decahydroquinolinyl, decahydroisoquinolinyl, dihydrobenzisothiazinyl, dihydrobenzisoxazinyl, dihydrofuranyl, dihydroisoindolyl, dihydropyranyl, dihydropyrazolyl, dihydropyrazinyl, dihydropyridinyl, dihydropyrimidinyl, dihydropyrrolyl, dioxolanyl, 1,4-dithiopyranyl, furanonyl, imidazolidinyl, 2,4-dioxo-imidazolidinyl, imidazolinyl, indolinyl, 2-oxo-indolinyl, isobenzotetrahydrofuranyl, isobenzotetrahydrothienyl, isobenzodihydropyranyl, isocoumarinyl, isodihydroindolyl (isoindolinyl), 1-oxo-isodihydroindolyl, 1,3-dioxo-isodihydroindolyl, isothiazolidinyl, isoxazolidinyl, 3-oxo-isoxazolidinyl, morpholinyl, 3,5-dioxo-morpholinyl, octahydroindolyl, octahydroisoindolyl, 1-oxo-octahydroisoindolyl, 1,3-dioxo-hexahydroisoindolyl, oxazolidinonyl, oxazolidinyl, oxiranyl, piperazinyl, 2,6-dioxo-piperazinyl, piperidinyl, 2,6-dioxo-piperidinyl, 4-piperidinone, 2-oxopyrrolidinyl, 2,5-dioxopyrrolidinyl, quinuclidinyl, tetrahydroisoquinolinyl, 3,5-dioxo-thiomorpholinyl, thiazolidinyl, 2,4-dioxo-thiazolidinyl, tetrahydroquinolinyl, phenothiazinyl, phenoxazinyl, xanthene and 1,3,5-trithiocyclohexyl. Embodiments of the —CH$_2$-group in the heterocyclyl substituted with —C(=O)— include, but are not limited to, 2-oxopyrrolidinyl, oxo-1,3-thiazolidinyl, 2-piperidone, 3,5-dioxopiperidinyl and pyrimidinedione. Embodiments of sulfur atom oxidized in the heterocyclyl include, but are not limited to, sulfolanyl and a 1,1-dioxothiomorpholinyl. The heterocyclyl may be optionally substituted with one or more substituents described herein.

In one embodiment, the heterocyclyl is a heterocyclyl composed of 3 to 8 atoms, and refers to a saturated or partially unsaturated monocyclic ring containing 3 to 8 ring atoms, wherein at least one ring atom is selected from nitrogen, sulfur and oxygen atoms. Unless otherwise specified, the heterocyclyl consisting of 3 to 8 atoms may be a carbon group or a nitrogen group, and the —CH$_2$— group may be optionally substituted with —C(=O)—. The sulfur atom of the ring can optionally be oxidized to S-oxide. The nitrogen atom of the ring can optionally be oxidized to an N-oxide. Embodiments of heterocyclyl consisting of 3 to 8 atoms include, but are not limited to, azetidinyl, oxetanyl, thietanyl, pyrrolidinyl, 2-pyrrolinyl, 3-pyrrolinyl, pyrazolinyl, pyrazolidinyl, imidazolinyl, imidazolidinyl, tetrahydrofuranyl, dihydrofuranyl, tetrahydrothienyl, dihydrothienyl, 1,3-dioxolanyl, dithiolanyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thioxanyl, homopiperazinyl, homopiperidinyl, oxepanyl, thiepanyl, oxazepinyl, diazepinyl, thiazepinyl. Embodiments of —CH$_2$— group in the heterocyclyl substituted with —C(=O)— include, but are not limited to, 2-oxopyrrolidinyl, oxo-1,3-thiazolidinyl, 2-piperidinonyl, 3,5-dioxopiperidinyl and pyrimidinedionyl. Embodiments of sulfur atom in the heterocyclyl oxidized include, but are not limited to, sulfolanyl and 1,1-dioxothiomorpholinyl. The heterocyclyl consisting of 3 to 8 atoms can be optionally substituted with one or more substituents described herein.

In one embodiment, the heterocyclyl is a heterocyclyl consisting of 3 to 6 atoms, and refers to a saturated or partially unsaturated monocyclic ring containing 3 to 6 ring atoms, wherein at least one ring atom is selected from nitrogen, sulfur and oxygen atoms. Unless otherwise specified, the heterocyclyl consisting of 3 to 6 atoms may be a carbon group or a nitrogen group, and the —CH$_2$— group may be optionally substituted with —C(=O)—. The sulfur atom of the ring can optionally be oxidized to S-oxide. The nitrogen atom of the ring can optionally be oxidized to an N-oxide. The heterocyclyl consisting of 3 to 6 atoms can be optionally substituted with one or more substituents described herein.

In another embodiment, the heterocyclyl is a heterocyclyl consisting of 5 to 6 atoms, and refers to a saturated or partially unsaturated monocyclic ring containing 5 to 6 ring atoms, wherein at least one ring atom is selected from nitrogen, sulfur and oxygen atoms. Unless otherwise specified, the heterocyclyl consisting of 5 to 6 atoms may be a carbon group or a nitrogen group, and the —CH$_2$— group may be optionally substituted with —C(=O)—. The sulfur atom of the ring can optionally be oxidized to S-oxide. The nitrogen atom of the ring can optionally be oxidized to an N-oxide. Embodiments of heterocyclyl consisting of 5 to 6 atoms include, but are not limited to, pyrrolidinyl, 2-pyrrolinyl, 3-pyrrolinyl, pyrazolinyl, pyrazolidinyl, imidazolinyl, imidazolidinyl, tetrahydrofuranyl, dihydrofuranyl, tetrahydrothienyl, dihydrothienyl, 1,3-dioxocyclopentyl, dithiocyclopentyl, 2-oxopyrrolidinyl, oxo-1,3-thiazolidinyl, sulfolanyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thioxanyl, 2-piperidinonyl, 3,5-dioxopiperidinyl and pyrimidinedionyl, 1,1-dioxylthiomorpholinyl. The heterocyclyl consisting of 5 to 6 atoms may be optionally substituted with one or more substituents described herein.

The term "aryl" used herein, unless otherwise specified, refers to a monovalent $C_6$~$C_{14}$ carbocyclyl system containing at least one aromatic ring, wherein the aromatic ring system is monocyclic, bicyclic, or tricyclic. The aryl group can be connected to the main structure through any of its rings, that is, any aromatic or non-aromatic ring. In some embodiments, the aryl group is phenyl, naphthyl, bicyclo[4.2.0]octyl-1,3,5-trienyl, indanyl, fluorenyl, or tetrahydronaphthyl. When the aryl group is substituted, it can be substituted on any ring, that is, on any aromatic or non-aromatic ring contained by the aryl group. In some or any embodiments, aryl is phenyl, naphthyl, tetrahydronaphthyl, fluorenyl, or indanyl; the aryl group, such as the phenyl, naphthyl, tetrahydronaphthyl, fluorenyl, and indanyl.

The term "heteroaryl" as used herein, unless otherwise specified, refers to a monovalent monocyclic or polycyclic aromatic group, wherein ring atoms comprise at least one heteroatom (in some embodiments, there being 1, 2, 3, or 4 heteroatoms) independently selected from O, $S(O)_{0-2}$ and N in the ring. The heteroaryl group is connected to the rest of the molecule through any atoms in the ring system in consideration of its valence rules. In some embodiments, each ring of a heteroaryl group may contains 1 or 2 O atoms, 1 or 2 S atoms, and/or 1 to 4 N atoms, or a combination thereof, provided that the total number of heteroatoms in each ring is 4 or less, and each ring contains at least 1 carbon atom. In some embodiments, the heteroaryl group has 5 to 20, to 15, or 5 to 10 ring atoms. When the heteroaryl group is substituted, it can be substituted on any ring. In certain embodiments, monocyclic heteroaryl groups include, but are not limited to, furyl, imidazolyl, isothiazolyl, isoxazolyl, oxadiazolyl, oxazolyl, pyrazinyl, pyrazolyl, pyridazinyl, pyridinyl, pyrimidinyl, pyrrolyl, thiadiazolyl, thiazolyl, thienyl, tetrazolyl, triazinyl and triazolyl. In certain embodiments, bicyclic heteroaryl groups include, but are not limited to, benzofuranyl, benzimidazolyl, benzisoxazolyl, benzopyranyl, benzothiadiazolyl, benzothiazolyl, benzothienyl, benzotriazolyl, benzoxazolyl, furopyridyl, imidazopyridyl, imidazothiazolyl, indazinyl, indolyl, indazolyl, isobenzofuryl, isobenzothienyl, isoindolyl, isoquinolinyl, isothiazolyl, naphthyridinyl, oxazolopyridyl, phthalazinyl, pteridinyl, purinyl, pyridopyridyl, pyrrolepyridyl, quinolinyl, quinoxalinyl, quinazolinyl, thiadiazolopyrimidinyl and thienopyridinyl. In certain embodiments, tricyclic heteroaryl groups include, but are not limited to, acridinyl, benzindolyl, carbazolyl, dibenzofuranyl, perimidinyl, phenanthrolinyl, phenanthridinyl and phenazinyl. In some or any embodiments, the heteroaryl group is indolyl, furyl, pyridyl, pyrimidinyl, imidazolyl, or pyrazolyl; each of which is optionally substituted with 1, 2, 3, or 4 groups defined as described herein.

The terms "cycloalkyl aliphatic group", "heterocyclic aliphatic group", "aryl aliphatic group" and "heteroaryl aliphatic group" mean aliphatic groups substituted with cycloalkyl, heterocyclic, aryl and heteroaryl, respectively, wherein the cycloalkyl, heterocyclic, aryl, heteroaryl and aliphatic groups are defined as described in the present disclosure.

The term "pharmaceutically acceptable salt" used in the present disclosure refers to organic salts and inorganic salts of the compound of the present disclosure. The pharmaceutically acceptable salts are well known for one skilled in the field, as described in the literature: S. M. Berge et al., describe pharmaceutically acceptable salts in detail in J. Pharmaceutical Sciences, 1977, 66: 1-19. The pharmaceutically acceptable non-toxicsalts formed by acid include, but are not limited to, inorganic acid salts formed by reaction with amino groups such as hydrochloride, hydrobromide, phosphate, sulfate, and perchlorate, and organic acid salts, such as acetate, oxalate, maleate, tartrate, citrate, succinate, malonate, or other salts formed by methods described in books and literatures such as ion exchange. Other pharmaceutically acceptable salts include adipate, alginate, ascorbate, aspartate, benzene sulfonate, benzoate, bisulfate, borate, butyrate, camphanate, camphorsulfonate, cyclopentylpropionate, digluconate, laurylsulfonate, ethanesulfonate, formate, fumarate, gluceptate, glycerophosphate, gluconate, hemisulfate, enanthate, hexanoate, hydriodate, 2-hydroxyethanesulfonate, lactobionate, lactate, laurate, lauryl sulfate, malate, malonate, mesylate, 2-naphthalenesulfonate, nicotinate, nitrate, oleate, palmitate, embonate, pectate, persulphate, 3-phenylpropionate, picrate, pivalate, propionate, stearate, thiocyanate, tosilate, undecanoate, valerate, etc. The salts obtained by reaction with suitable alkali include alkaline metal, alkaline earth metal, ammonium and $N^+(C_1\sim C_4$ alkyl$)_4$ salts. The present disclosure also designs the quaternary ammonium salt formed by any compound containing the N group. Water-soluble or oil-soluble or dispersed products can be obtained by quaternization. The alkaline metal or alkaline earth metal salts include sodium, lithium, potassium, calcium, magnesium, etc. The pharmaceutically acceptable salts further include appropriate, non-toxic ammonium, quaternary ammonium salts and amine cation formed by anti-equilibrium ion, such as halides, hydroxides, carboxylates, sulfates, phosphates, nitrates, $C_{1-8}$ sulfonates and aromatic sulfonates.

The "solvate" of the present disclosure refers to the association complex formed by one or more solvent molecules and the compounds of the present disclosure. The solvents that form solvates include, but are not limited to, water, isopropanol, ethanol, methanol, dimethyl sulfoxide, ethyl acetate, acetic acid, and aminoethanol. The term "hydrate" refers to an association complex formed by the solvent molecule, which is water.

When the solvent is water, the term "hydrate" can be used. In some embodiments, a compound of the present disclosure can be connected to one water molecule, such as monohydrate; in further embodiments, a compound of the present disclosure can be connected to more than one water molecules, such as dihydrate, and in yet another embodiments, a compound of the present disclosure can be connected to less than one water molecule, such as hemihydrate. It should be noted that the hydrates of the present disclosure retain the biologically effectiveness of the compound in its non-hydrated form.

SUMMARY

An aspect relates to a tetrahydronaphthalene compound, a pharmaceutical composition comprising the compound, and a use of the compound or the composition for preparing a medicament in prevention and/or treatment of a central nervous system disease, especially Parkinson's diseases, Restless Legs Syndrome (RLS), or depression. Particularly, the medicament is a long-acting drug. The compound of the present disclosure has a higher melting point and a lower solubility, and can be prepared into a suspension preparation with a lower dissolution rate and its efficacy can last for several weeks after a single administration.

An aspect relates to providing a new tetrahydronaphthalene compound having a structure of formula (I), or a stereoisomer, a solvate, or a pharmaceutically acceptable salt thereof:

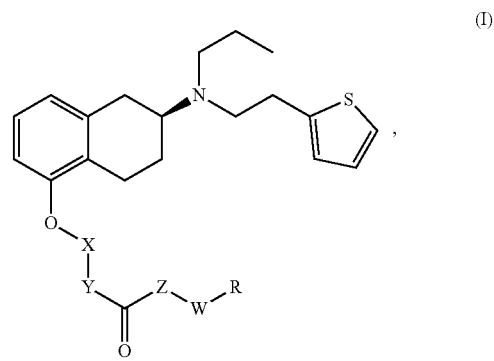

(I)

wherein,
X is absent, or X is —C(R$^1$)(R$^2$)—;
Y is absent, or Y is O;
Z is absent, or Z is $C_{1-15}$ alkylene;
W is —C(=O)NH—, or —NHC(=O)—;
each of R$^1$ and R$^2$ is independently H, D, F, Cl, OH, —CN, or $C_{1-4}$ alkyl;
R is $C_{1-30}$ alkyl, $C_{1-30}$ heteroalkyl, $C_{2-30}$ alkenyl, $C_{2-30}$ alkynyl, $C_{3-10}$ cycloalkyl, $C_{3-10}$ cycloalkyl-$C_{1-10}$ aliphatic, $C_{2-10}$ heterocyclyl, $C_{2-10}$ heterocyclyl-$C_{1-10}$ aliphatic, aryl, aryl-$C_{1-10}$ aliphatic, heteroaryl, heteroaryl-$C_{1-10}$ aliphatic, cholane aliphatic group, —R$^{3a}$—C(=O)NH—R$^{3b}$, or —R$^{3a}$—NHC(=O)—R$^{3b}$;
R$^{3a}$ is $C_{1-24}$ alkylene, $C_{2-10}$ alkenylene, arylene, —$C_{1-10}$ aliphatic-aryl-, or -aryl-$C_{1-10}$ aliphatic-;
R$^{3b}$ is H, $C_{1-22}$ alkyl, $C_{2-10}$ alkenyl, aryl, or aryl-$C_{1-10}$ aliphatic;
each of the alkyl, alkylene, heteroalkyl, alkenyl, alkenylene, alkynyl, cycloalkyl, heterocyclyl, cycloalkyl aliphatic, heterocyclyl aliphatic, aryl, arylene, aryl aliphatic, heteroaryl, heteroaryl aliphatic, -aliphatic-aryl-, -aryl-aliphatic-, cholane aliphatic group of R$^1$, R$^2$, R, R$^{3a}$, and R$^{3b}$ is independently substituted with 1, 2, 3, or 4 substituents independently selected from H, D, oxo (=O), thio (=S), F, Cl, Br, —OH, —CN, amino, —C(=O)NH—R$^{4a}$, —NHC(=O)—R$^{4a}$, —S(=O)$_{1-2}$NH—R$^{4b}$, —NHS(=O)$_{1-2}$—R$^{4b}$, $C_{1-6}$ alkyl, $C_{1-6}$ alkoxy, carboxyl, $C_{3-6}$ cycloalkyl, $C_{6-10}$ aryl, and $C_{1-9}$ heteroaryl; and each of $R^{4a}$ and $R^{4b}$ is independently H, or $C_{1-6}$ alkyl.

In some embodiments, the compound has a structure of formula (II) as follows:

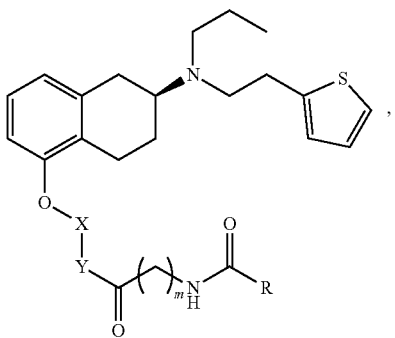

(II)

or a stereoisomer, a solvate, or a pharmaceutically acceptable salt thereof, wherein, m is an integer from 1 to 5.

In some embodiments, X is absent; and Y is absent.

In some embodiments, each of $R^1$ and $R^2$ is independently H, D, F, Cl, OH, —CN, methyl, or ethyl.

In some embodiments, R is $C_{1-30}$ alkyl, $C_{2-30}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{1-30}$ alkyl, $C_{2-30}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo(=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

In some embodiments, R is $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{2-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

In some embodiments, R is $C_{1-22}$ alkyl, $C_{2-22}$ alkenyl, $C_{2-7}$ heterocyclyl-$C_{1-6}$ aliphatic, —$R^{3a}$—C(=O)NH—$R^{3b}$, —$R^{3a}$—NHC(=O)—$R^{3b}$, or $C_{6-10}$ aryl-$C_{1-6}$ aliphatic;

wherein, each of $C_{1-22}$ alkyl, $C_{2-22}$ alkenyl, $C_{2-7}$ heterocyclyl-$C_{1-6}$ aliphatic, —$R^{3a}$—C(=O)NH—$R^{3b}$, —$R^{3a}$—NHC(=O)—$R^{3b}$, or $C_{6-10}$ aryl-$C_{1-6}$ aliphatic is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

In some embodiments, R is $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

In some embodiments, $R^{3a}$ is $C_{1-20}$ alkylene, $C_{2-6}$ alkenylene, $C_{6-10}$ arylene, —$C_{1-6}$ aliphatic-$C_{6-10}$ aryl-, or —$C_{6-10}$ aryl-$C_{1-6}$ aliphatic-; and $R^{3b}$ is H, $C_{1-19}$ alkyl, $C_{2-6}$ alkenyl, $C_{6-10}$ aryl, or $C_{6-10}$ aryl-$C_{1-6}$ aliphatic-;

wherein, each of $C_{1-19}$ alkyl, $C_{1-20}$ alkylene, $C_{2-6}$ alkenyl, $C_{2-6}$ alkenylene, $C_{6-10}$ aryl, $C_{6-10}$ arylene, —$C_{1-6}$ aliphatic-$C_{6-10}$ aryl-, —$C_{6-10}$ aryl-$C_{1-6}$ aliphatic-, or —$C_{6-10}$ aryl-$C_{1-6}$ aliphatic- is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

In some embodiments, each of $R^{4a}$ and $R^{4b}$ is independently H, or $C_{1-3}$ alkyl.

In some embodiments, the compound is selected from:

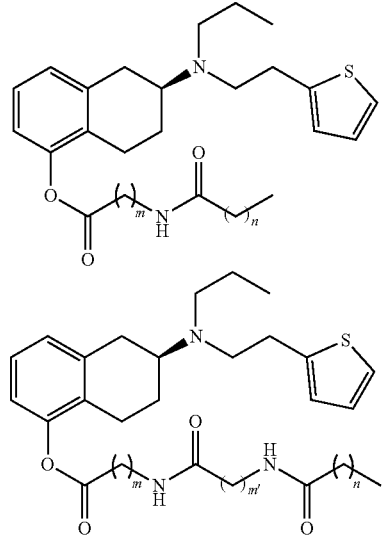

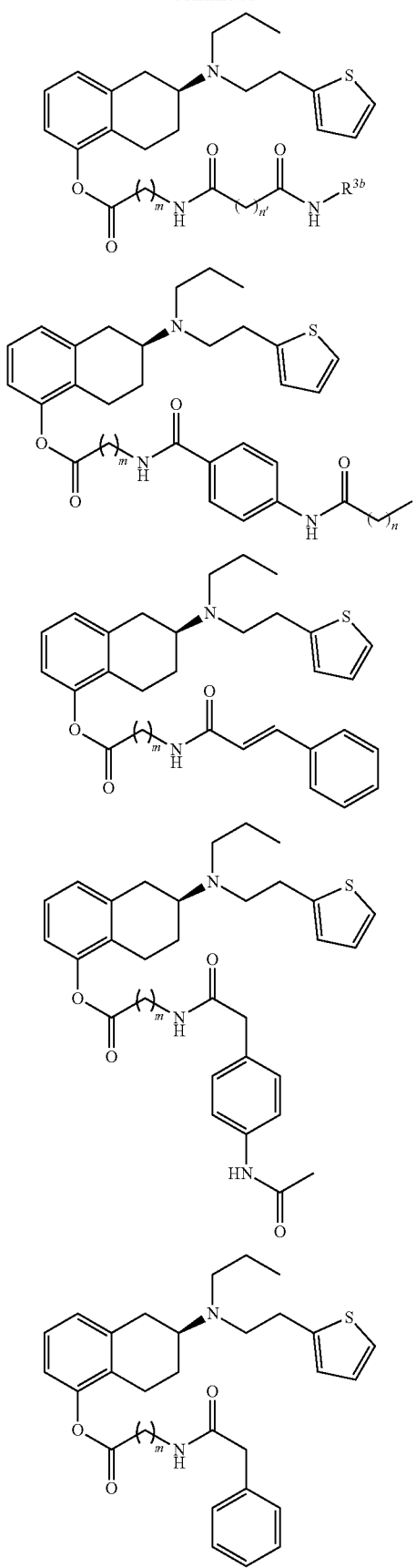

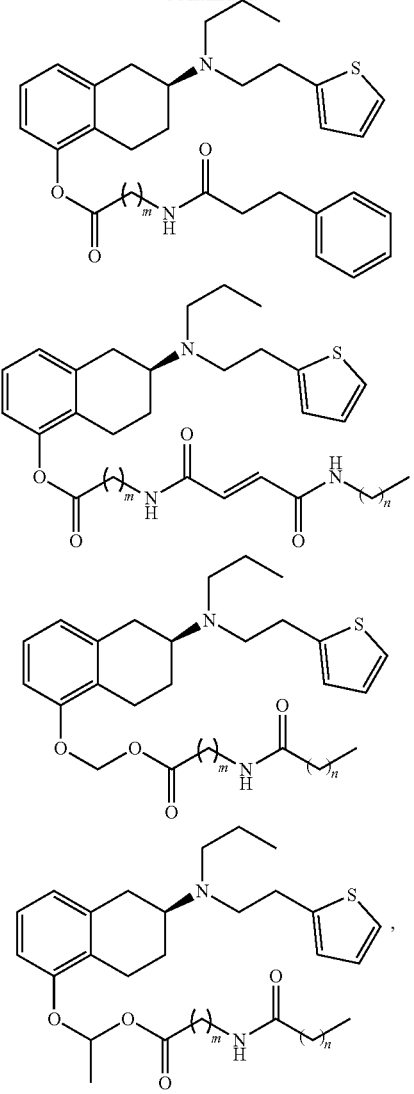

or a stereoisomer, a solvate, or a pharmaceutically acceptable salt thereof, wherein, each of m and m' is independently an integer from 1 to 5; n is an integer from 7 to 20; n' is an integer from 2 to 20; and $R^{3b}$ is H, or $C_{1-18}$ alkyl.

In some embodiments, $R^{3b}$ is H, or $C_{1-12}$ alkyl. In another embodiment, $R^{3b}$ is H, or $C_{1-10}$ alkyl.

In some embodiments, wherein the compound is a compound selected from any one of the following compounds:

(1)

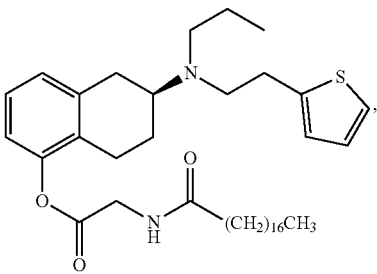

(2)
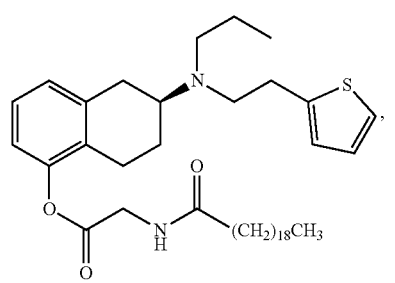
(3)
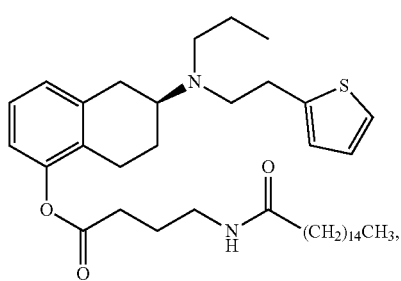
(4)
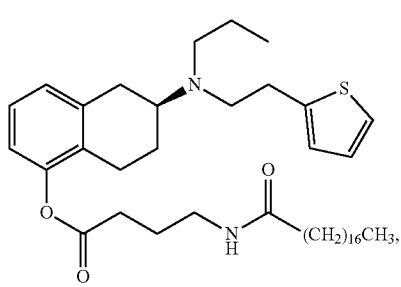
(5)
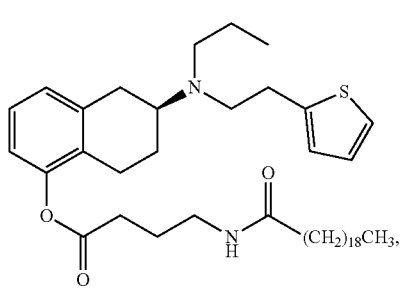
(6)
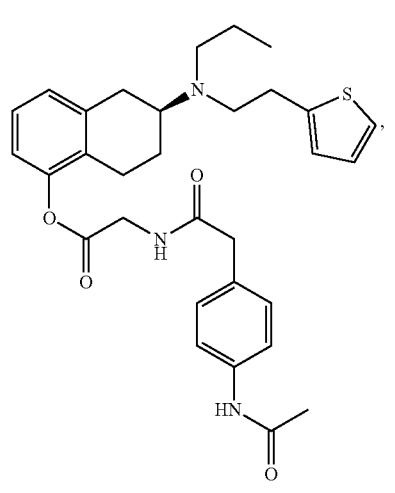
(7)
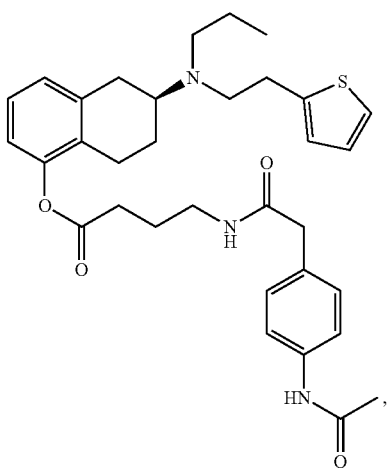
(8)
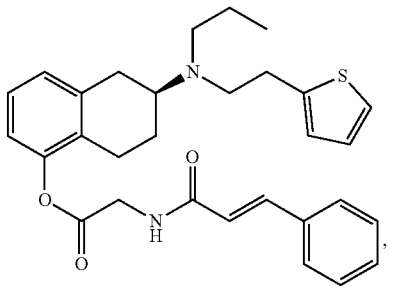
(9)
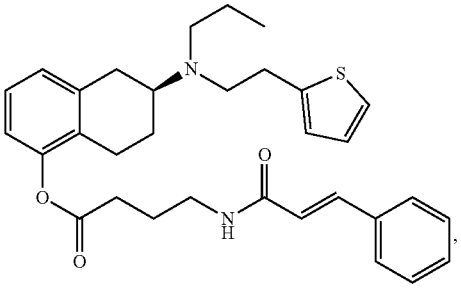
(10)
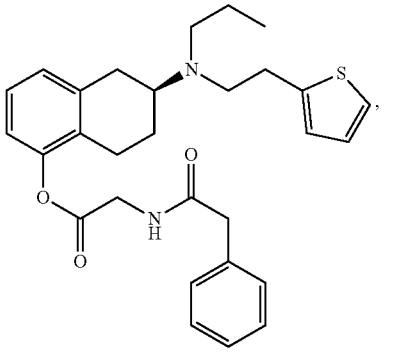

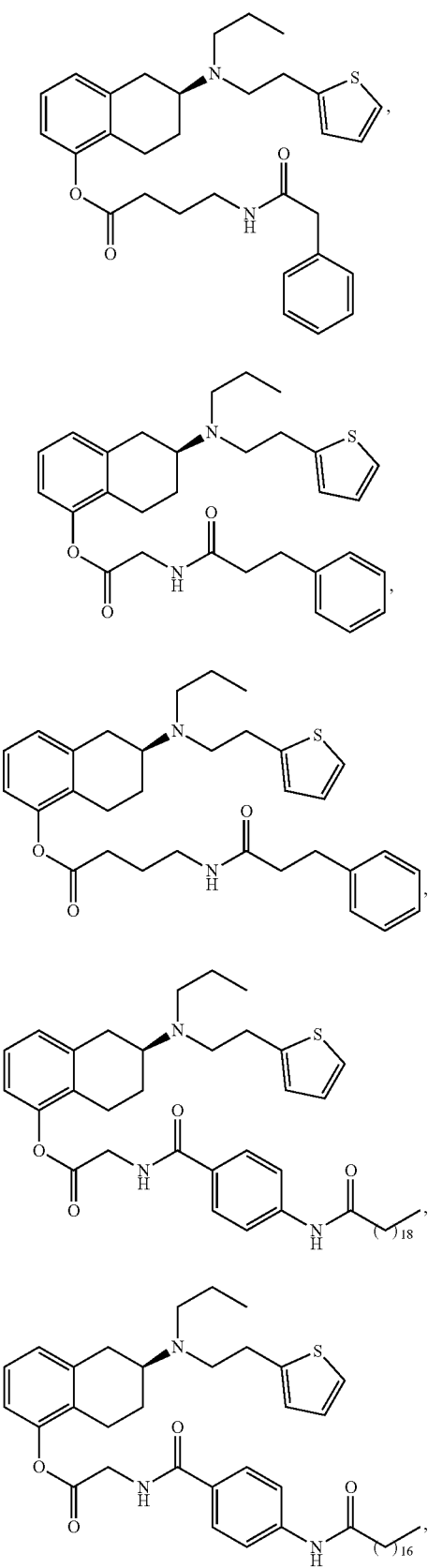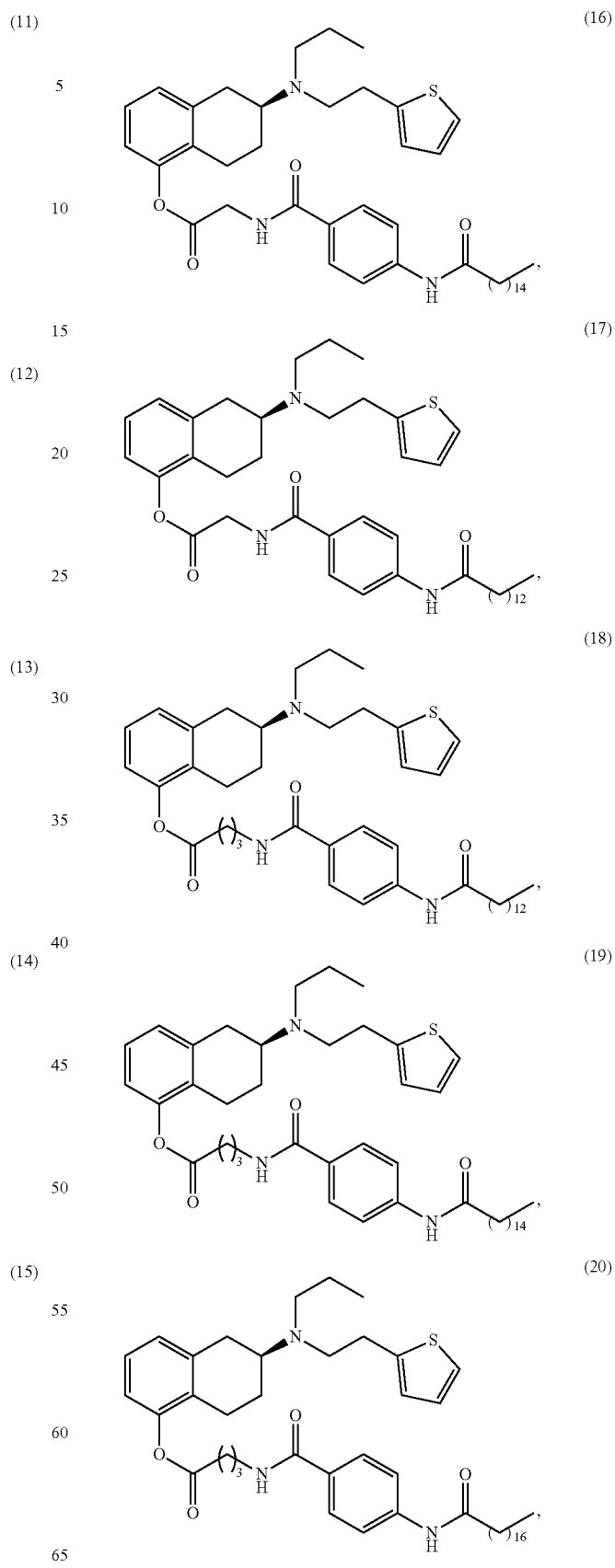

19
-continued
(21)
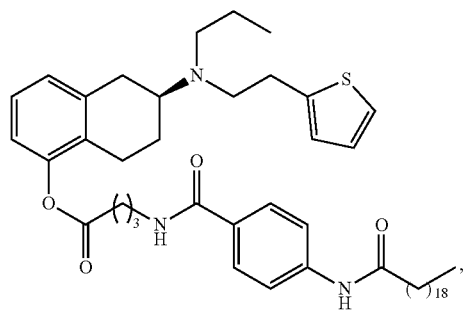
(22)
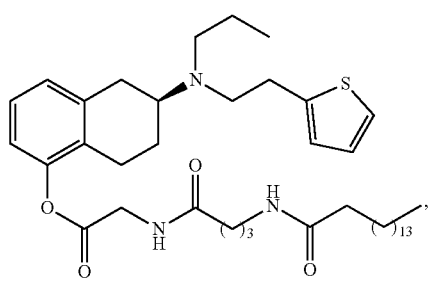
(23)
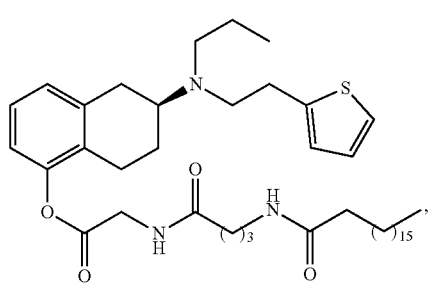
(24)
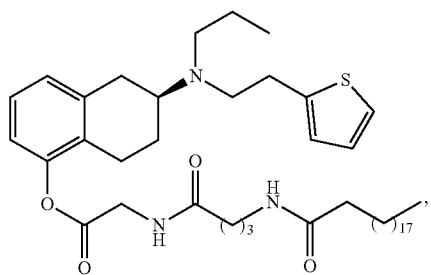
(25)
20
-continued
(26)
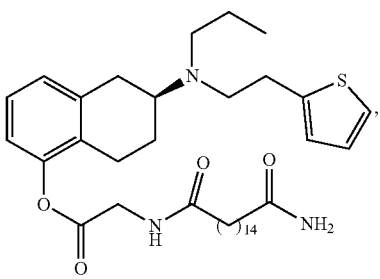
(27)
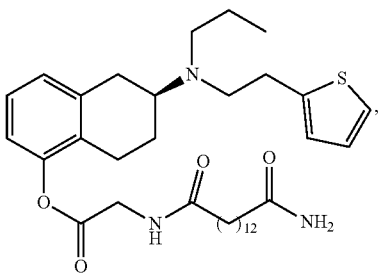
(28)
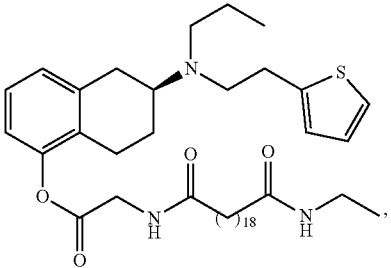
(29)
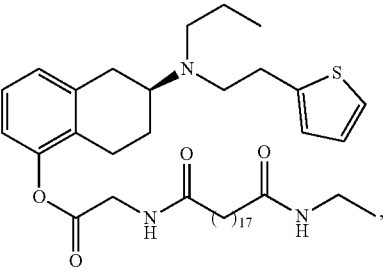
(30)
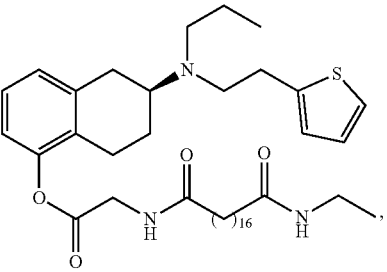

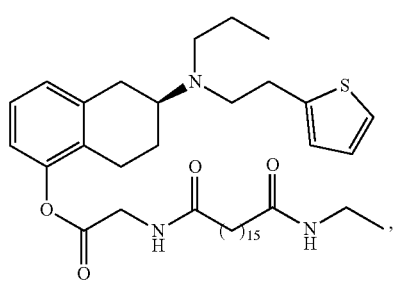 (31)
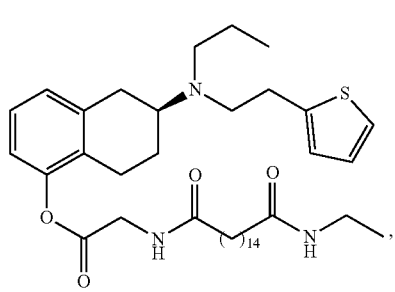 (32)
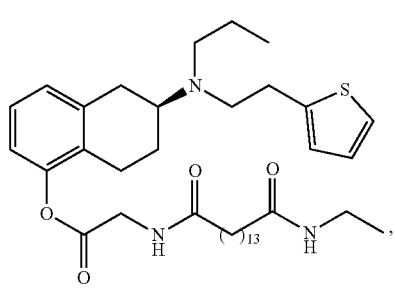 (33)
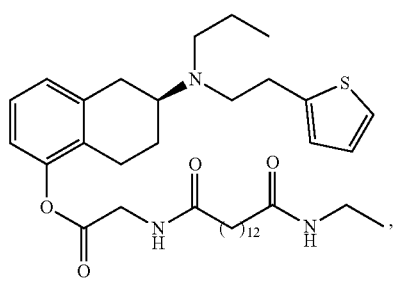 (34)
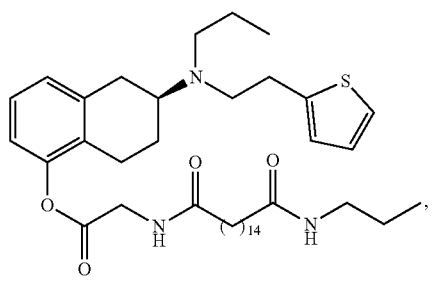 (35)
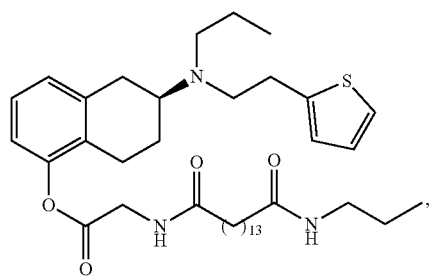 (36)
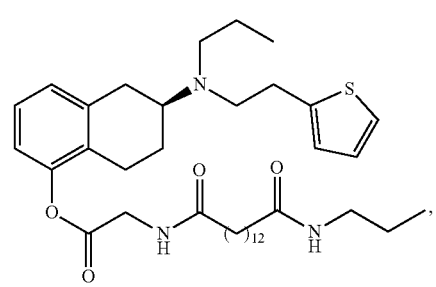 (37)
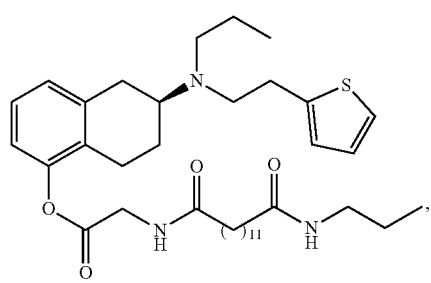 (38)
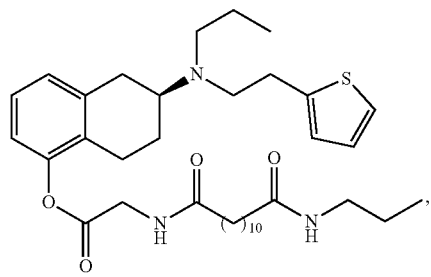 (39)
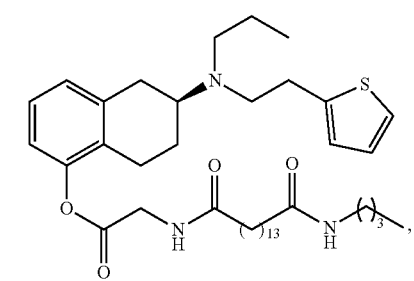 (40)

(41)
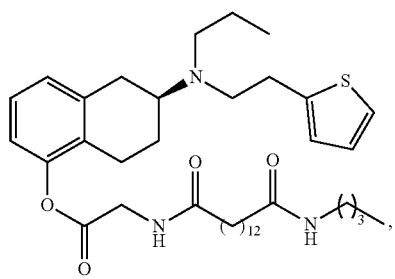
(42)
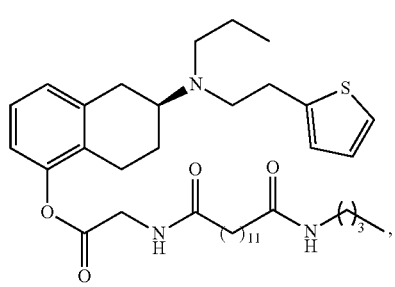
(43)
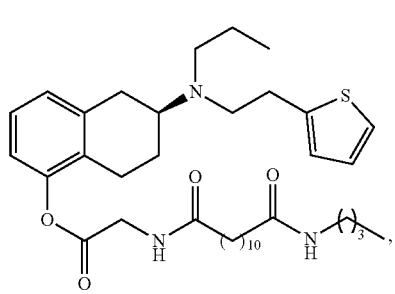
(44)
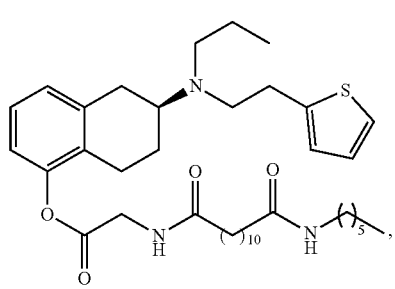
(45)
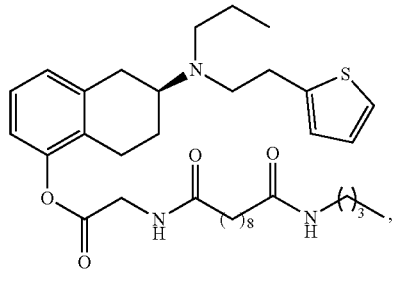
(46)
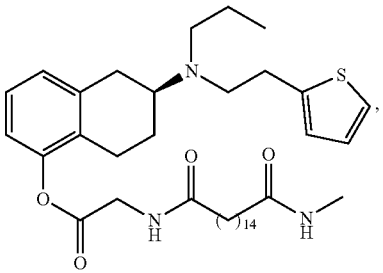
(47)
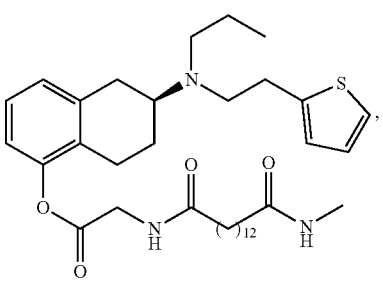
(48)
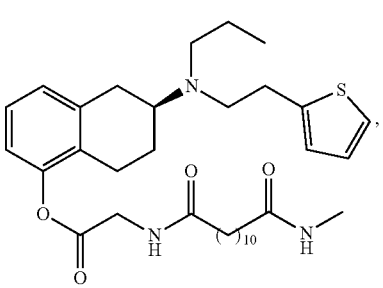
(49)
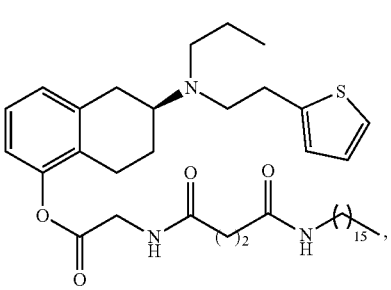
(50)
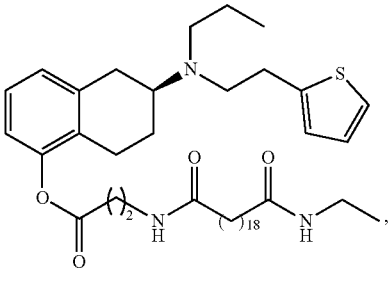

(51)
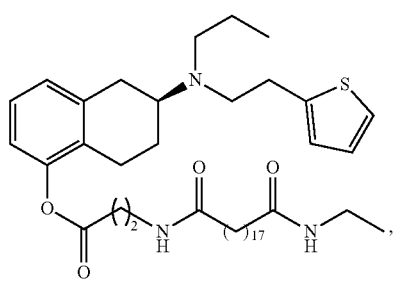
(52)
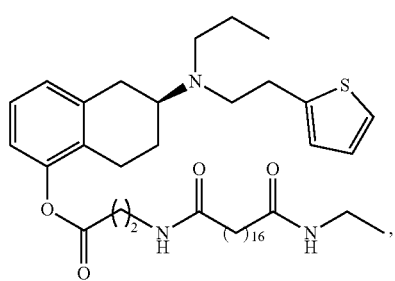
(53)
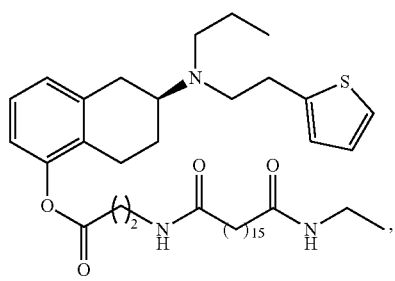
(54)
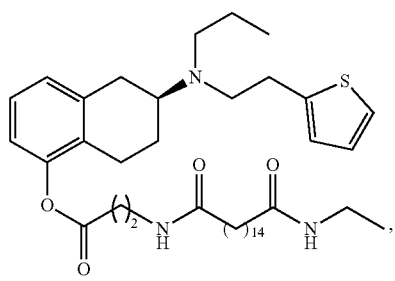
(55)
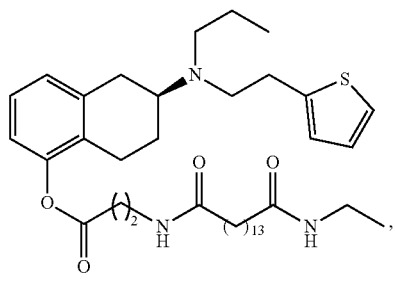
(56)
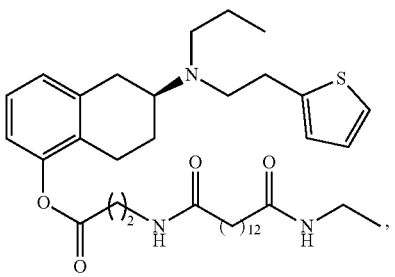
(57)
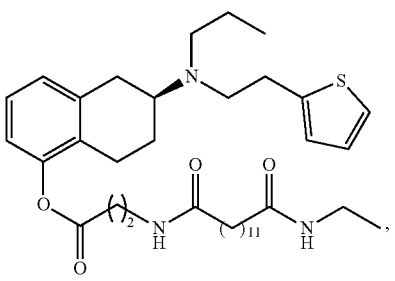
(58)
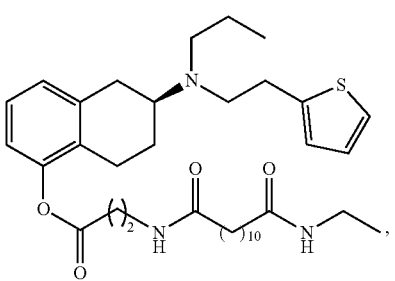
(59)
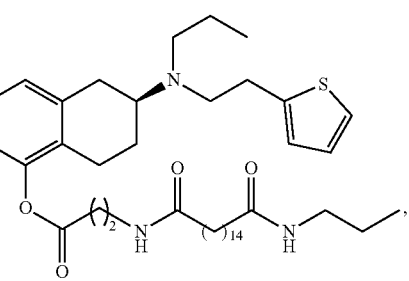
(60)
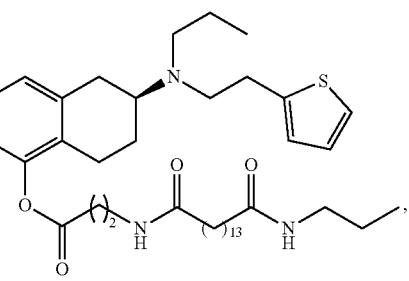

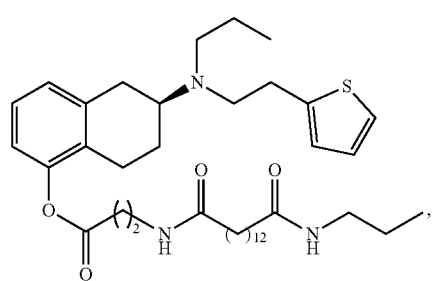
(61)
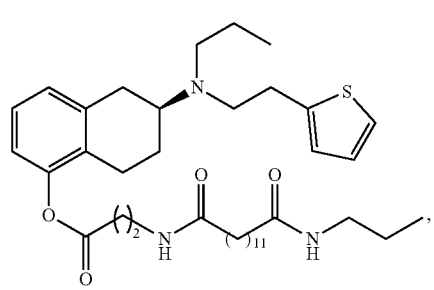
(62)
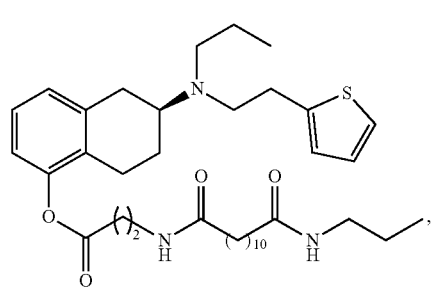
(63)
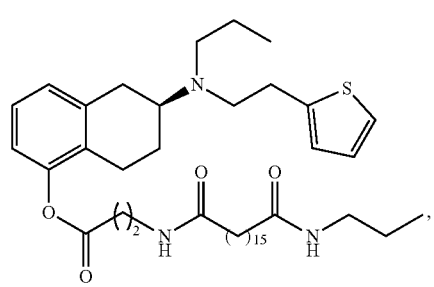
(64)
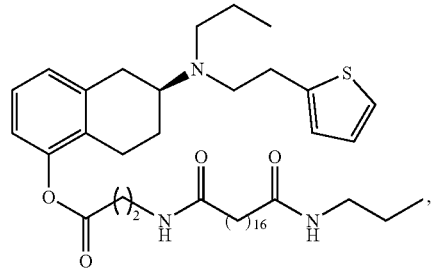
(65)
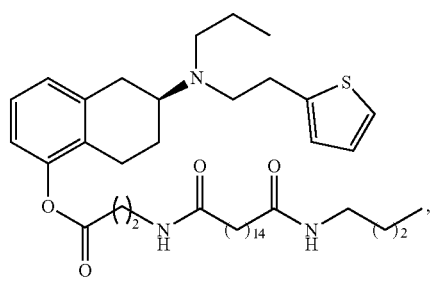
(66)
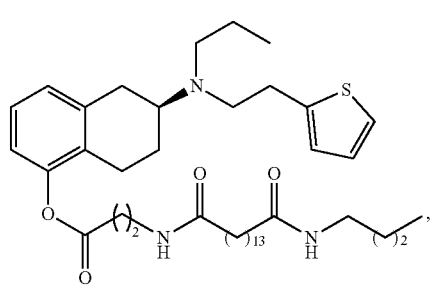
(67)
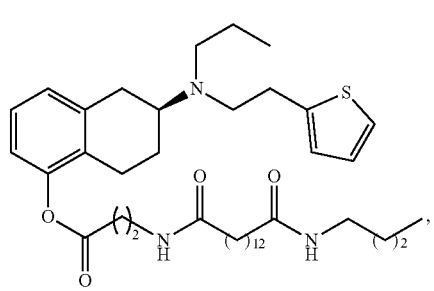
(68)
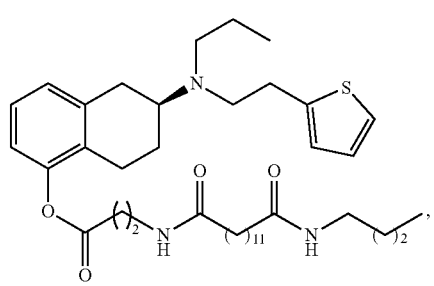
(69)
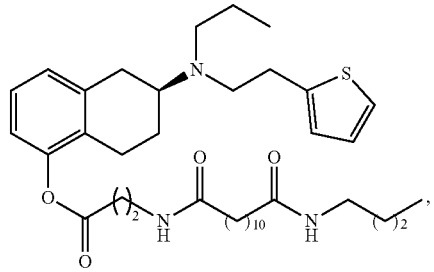
(70)

-continued

(71) 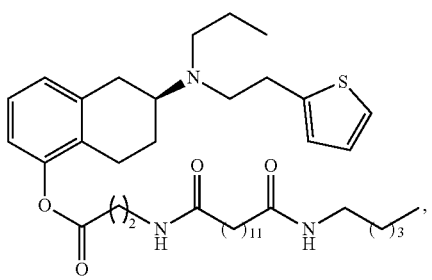

(72) 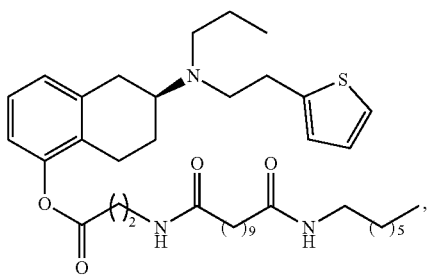

(73) 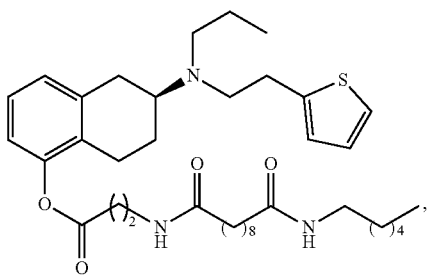

(74) 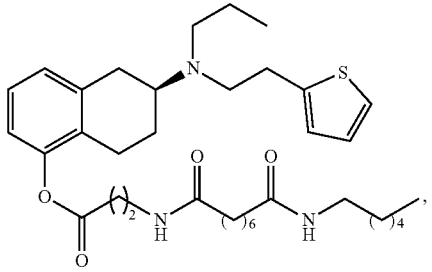

(75) 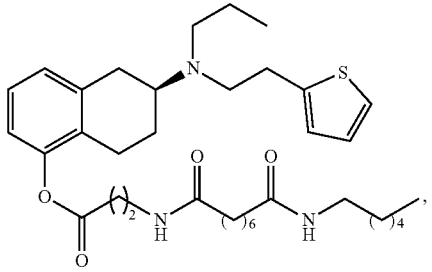

-continued

(76) 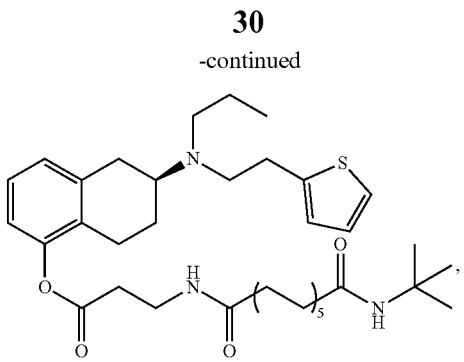

(77) 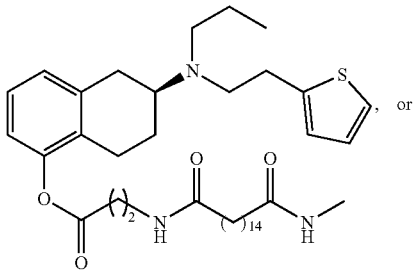

(78) 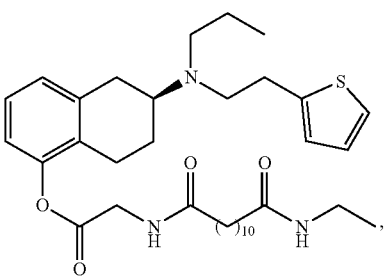

or a stereoisomer, a solvate, or a pharmaceutically acceptable salt thereof.

It is another aspect to provide a pharmaceutical composition, comprising the compound or the stereoisomer, the solvate, or the pharmaceutically acceptable salt thereof of the present disclosure, and a pharmaceutically acceptable excipient, a carrier, or a diluent.

It is another aspect to provide a use of the compound, the stereoisomer, the solvate, or a pharmaceutically acceptable salt thereof, or the pharmaceutical composition of the present disclosure for preparing a medicament in prevention and/or treatment of a central nervous system disease.

In some embodiments, the central nervous system disease comprises Parkinson's disease, Restless Legs Syndrome, or depression.

In some embodiments, the medicament is a long-acting drug.

Pharmaceutical Composition, Preparation and Use

When the compound of the present disclosure is used as a medicament, it is usually administered in a form of a pharmaceutical composition. The composition may be prepared in a well-know manner of pharmaceutical technology and comprises at least one of the compounds according to formula I, or formula II of the present disclosure. In general, the compound of the present disclosure is administered in a pharmaceutically effective amount. The actual dosage of the compound of the present disclosure will usually be determined by the physician according to relevant conditions, which include symptoms to be treated, a selected administration pathway, an actual compound of the present disclosure administered, the age, weight and response of the individual patients, and symptom severity of the patients, etc.

The present disclosure provides a pharmaceutical composition comprising the compound of the present disclosure and a pharmaceutical carrier. The pharmaceutical composition can be prepared into a medicament suitable for a specific administration route, including oral, parenteral, and rectal administration, etc. In addition, the pharmaceutical compound may be prepared into a solid form (which includes, but is not limited to capsule, tablet, pilula, granula, pulvis, or suppository) or a liquid form (which includes, but is not limited to solution, suspension, or emulsion). The pharmaceutical composition may be performed by common pharmaceutical operations, such as sterilization, and/or the pharmaceutical composition may comprise a conventional inert diluent, a conventional lubricant, a conventional buffering agent, or an conventional auxiliary agent, for example, a preservative, a stabilizer, a wetting agent, an emulgator, and a buffering agent etc.

As a liquid composition intended for oral administration, it may be a pharmaceutically acceptable solution, suspension, emulsion, syrup, or elixir, containing an inert diluent, such as water or liquid paraffin. The composition may also comprise substances other than diluents and, in some embodiments, it may comprise a wetting agent, a sweetener or a flavoring product.

The composition intended for parenteral administration may be an emulsion, or a sterile solution. In some certain embodiments, propylene glycol, polyethylene glycol, vegetable oil, especially olive oil, or injectable organic ester can be used as a solvate or a carrier. In some embodiments, ethyl oleate can be used as a solvate or a carrier. The composition may further comprise an adjuvant, especially a wetting agent, an isotonic agent, an emulgator, a dispersing agent, and a stabilizer. Several sterilization methods can be used, and in some embodiments, a bacteriological filler can be used for sterilization by radiation or by heat. The composition can also be prepared into a solid composition in a sterile form, which can be dissolved into sterile water or any other sterile injectable medium during usage.

In some embodiments, the composition of the present disclosure is a pharmaceutical composition or a single unit dosage form. The pharmaceutical composition or the single unit dosage form of the present disclosure includes a preventive or therapeutically effective amount of one or more prophylactic or therapeutic agents (for example, the compound or other preventive or therapeutic agents of the present disclosure), and typically one or more pharmaceutically acceptable carriers or excipients. In specific embodiments and the present disclosure, the term "pharmaceutically acceptable" refers to a medicament approved by supervision organization of federal or state government, or listed in a United State Pharmacopeia or other recognized pharmacopeias for use in animals, especially for humans. The term "carrier" includes diluents, adjuvants (such as, Frend's adjuvant (complete or incomplete)), excipients, intermedium, which are administered with the therapeutic agent. The pharmaceutical carrier may be sterile solution, such as water and oils including petroleum, animal oil, vegetable oil, or the oils from synthetic sources, such as peanut oil, soybean oil, mineral oil, sesame oil, etc. When the composition is intravenously administered, water may be used as a carrier. Saline solution, glucose aqueous solution and glycerite may also be used as a liquid carrier, especially for injection solution. Embodiments of the suitable pharmaceutical carriers are described in *Remington:* *The Science and Practice of Pharmacy; Pharmaceutical Press;* $22^{nd}$ edition (Sep. 15, 2012).

Typical pharmaceutical compositions and dosage forms contain one or more excipients. Suitable excipients are known to one skilled in the pharmaceutical field. In some embodiments, suitable excipients include starch, glucose, lactose, sucrose, gelatin, malt, rice, flour, chalk, silica gel, sodium stearate, glycerin monostearate, talc, sodium chloride, skimmed milk powder, glycerin, propylene, ethylene glycol, water, ethanol, etc. Whether a particular excipient is suitable for incorporation into a pharmaceutical composition or dosage forms depends on many factors well-known in the conventional art, including, but not limited to, the way that the dosage form is administered to the subject, and the specific active ingredients in the dosage. If necessary, the composition or single unit dosage form also contain a little amount of wetting agent, emulgator, or pH buffering agent.

As for the patient weighed approximately 50 kg to 70 kg, the pharmaceutical composition or composition product of the present disclosure may contain about 1 mg to 1000 mg of active ingredients in a single unit dosage, or contain about 1 mg to 500 mg, or about 1 mg to 250 mg, or about 1 mg to 150 mg, or about 0.5 mg to 100 mg, or about 1 mg to 50 mg of active ingredients. A therapeutically effective dosage of the compound, pharmaceutical composition or composition product thereof depends on the individual's species, weight, age and individual health conditions, the condition or disease to be treated or severity thereof. A physician, clinician or veterinarian can easily determine the effective dosage of each active ingredient, which is required to prevent, treat a disease or condition, or to inhibit the progression of the disease or condition.

The above-mentioned characteristics of the dosages can be demonstrated in vitro and vivo assays with suitable mammals, such as mice, rats, dogs, monkeys, or isolated organs, tissues and products thereof. The compound of the present disclosure can be applied in vitro in a form of liquid, such as aqueous solution; or in vivo, it can be applied intestinally or parenterally (the composition is best applied intravenously), for example in a form of suspension or aqueous solution. In vitro, the dose ranges from about 10-3 molarity to 10-9 molarity. In vivo, the therapeutically effective dosage depends on administration routes, in a range of about 0.1 mg/kg to 500 mg/kg, or about 1 mg/kg to 100 mg/kg.

The compound of the present disclosure can be administrated with one or more other therapeutic ingredients together, or administrated before or after one or more other therapeutic ingredients. The compound of the present disclosure may be administrated with another ingredient through a same administration route or different administration routes; alternatively, the compound of the present disclosure and another ingredient are comprised in a same pharmaceutical composition, and thus administrated together.

In another aspect, the present disclosure provides a compound of the present disclosure or a pharmaceutical composition including the compound of the present disclosure, for use in medicine. In specific embodiments, the present disclosure provides a compound of the present disclosure or a pharmaceutical composition including the compound of the present disclosure for preventing and/or treating a central nervous system disease in a mammal, in particular, for preventing and/or treating Parkinson's diseases, Restless Legs Syndrome or depression.

BRIEF DESCRIPTION

Some of the embodiments will be described in detail, with reference to the following FIGURE, wherein like designations denote like members, wherein:

FIG. 1 depicts a distribution diagram of blood concentration of active compounds at different time points after the mouse is intramuscularly injected with the compound suspension of the present disclosure.

DETAILED DESCRIPTION

In order to describe the present disclosure, embodiments are listed hereinafter. It should be understood that the present disclosure is not limited to the embodiments, and only provides methods for practicing the present disclosure.

In general, unless otherwise stated, the compound of the present disclosure can be prepared by the method described herein, wherein the substituents are defined as shown in formula I, or II. The following reaction schemes and embodiments are used to further illustrate the content of the present disclosure.

It should be recognized by one skilled in the conventional art that the chemical reactions described in the present disclosure can be used to appropriately prepare many other compounds of the present disclosure, and other methods for preparing the compounds are considered to be within the scope of the present disclosure. For embodiment, the synthesis of non-exemplary compounds according to the present disclosure may be successfully prepared by one skilled in the conventional art through modifying methods, such as appropriate protection of interfering groups, by using other well-known reagents in addition to those described in the present disclosure, or regularly modifying some reaction conditions. In addition, the reaction disclosed in the present disclosure or well-known reaction conditions are also recognized to be applicable for the preparation of other compounds of the present disclosure.

In the embodiments described hereinafter, unless otherwise indicated, all the temperatures are set to degree centigrade. The reagents are commercially available from commercial suppliers, such as Aldrich Chemical Company, Arco Chemical Company, Energy-chemical Company, Shanghai Shaoyuan Company, J&K Chemical Company, Aladdin Chemical Company, Meryer Chemical Company TCI Chemical Company, Xiya Reagent Company, Bidepharm Company, Macklin Company and Alfa Chemical Company, and are used without further purifying, unless otherwise indicated. General reagents are purchased from Shantou Xilong Chemical Co., Ltd, Guangdong Guanghua Sci-Tech Co., Ltd., Guangzhou Chemical Reagent Factory, Tianjin Haoyuyu Chemicals Co., Ltd., Tianjin Fuchen Chemical Reagent Factory, Wuhan Xinhuayuan Science and Technology Development Co., Ltd., Qingdao Tenglong Chemical Reagent Co., Ltd., and Qingdao Haiyang Chemical Factory.

Anhydrous tetrahydrofuran, dioxane, methylbenzene, and diethyl ether are obtained by refluxing and drying with metallic sodium. Anhydrous dichloromethane and chloroform are obtained by refluxing and drying with calcium hydride. Ethyl acetate, petroleum ether, n-hexane, N,N-dimethylacetamide, and N,N-dimethylformamide are dried with anhydrous sodium sulfate before use.

The following reactions generally perform under a positive pressure of nitrogen gas or argon gas or with a drying tube on anhydrous solvent (unless otherwise indicated). Reaction flasks are plugged with suitable rubber plugs, and substrates are injected by a syringe. Glasswares are all dried.

Chromatographic column uses silica gel. The silica gel (300 to 400 meshes) is purchased from Qingdao Haiyang Chemical Factory.

$^1$H NMR spectrum is recorded by Bruker 400 MHz or 500 MHz nuclear magnetic resonance spectrometer. $^1$H NMR spectrum uses $CDCl_3$, $DMSO-d_6$, $CD_3OD$, or $acetone-d_6$ as solvent (in ppm), and uses TMS (0 ppm) or chloroform (7.26 ppm) as reference. When multiplicities are present, the following abbreviations are used: s (singlet), d (double), t (triplet), m (multiplet), br (broadened), dd (doublet of doublets), dt (doublet of triplets). Coupling constants are used in Hz.

The measurement conditions of low-resolution mass spectrometer (MS) data are: Agilent 6120 quadrupole HPLC-M (column model: Zorbax SB-C18, 2.1×30 mm, 3.5 microns, 6 min, flow rate: 0.6 mL/min. The mobile phase: 5%-95% (the ratio of (0.1% formic acid in $CH_3CN$) to (0.1% formic acid in $H_2O$)), being ionized by electrospray ionization (ESI), and detected by UV at 210 nm/254 nm.

Pure compounds are prepared by Agilent 1260 pre-HPLC or Calesep pump 250 pre-HPLC (column model: NOVASEP 50/80 mm DAC) and are detected by UV at 210 nm/254 nm.

EMBODIMENTS

Embodiment 1 (S)-6-(propyl(2-(thiophen-2-yl)ethyl)amino)-5,6,7,8-tetrahydronaphthalen-1-yl 2-stearamido acetate

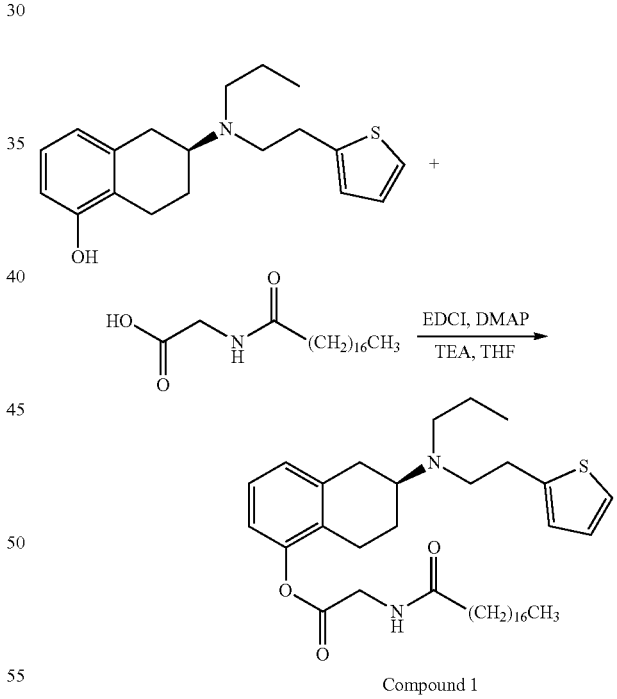

Compound 1

Rotigotine (1 g, 3.17 mmol), octadecanamide acetic acid (0.70 g, 3.49 mmol, 1.1 eq), DMAP (39 mg, 0.32 mmol, 0.1 eq), triethylamine (0.48 g, 4.75 mmol, 1.5 eq) and THF (15 mL) were added to a 50 mL single-neck flask. The mixture was stirred while EDCI (0.73 g, 3.80 mmol, 1.2 eq) was added, and then the mixture was stirred overnight at 70° C. TLC showed that the raw materials were completely reacted. The mixture was filtered, and a filter cake was washed by THF, and then the filtrate was combined and concentrated under reduced pressure, to obtain residues, which were purified through column chromatography (petroleum ether/ethyl acetate=60/40), and finally a white solid powder, Compound 1 (0.95 g, yield: 60%) was obtained. $^1$H NMR (500 MHz, CDCl$_3$) δ 7.16-7.11 (m, 2H), 7.11 (d, J=7.2 Hz, 1H), 6.94-6.90 (m, 1H), 6.84 (d, J=8.0 Hz, 1H), 6.81 (d, J=2.8 Hz, 1H), 5.97 (t, J=5.2 Hz, 1H), 4.32 (d, J=5.2 Hz, 2H), 2.96-2.89 (m, 4H), 2.81-2.74 (m, 4H), 2.53-2.47 (m, 3H), 2.27 (t, J=8.0 Hz, 2H), 2.03 (m, 1H), 1.73-1.61 (m, 2H), 1.59 (m, 1H), 1.47 (q, J=6.8 Hz, 2H), 1.35-1.23 (m, 28H), 0.88 (m, 6H). MS(m/z): 639.23 [M+H]$^+$.

Embodiment 2 (S)-6-(propyl(2-(thiophen-2-yl)ethyl)amino)-5,6,7,8-tetrahydronaphthalen-1-yl 2-icosanamido acetate

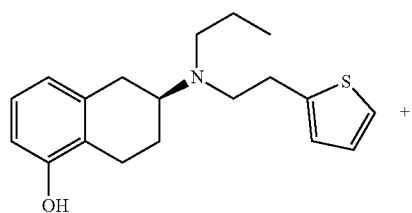
+
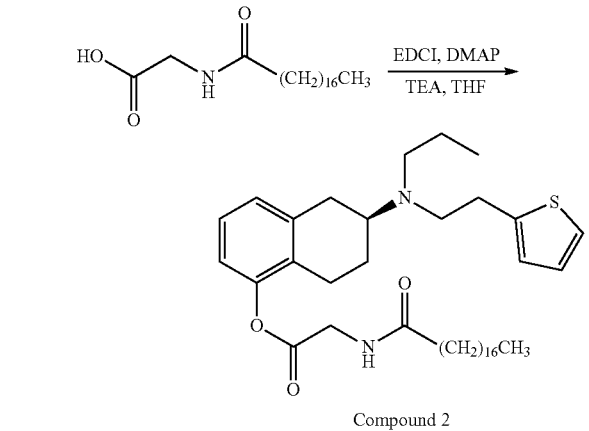

Compound 2

Referring to the method of Embodiment 1, icosanamido acetic acid (1.1 eq) was used to replace octadecanamide acetic acid, so that a white solid powder, Compound 2 (2.30 g, yield: 64.0%) was prepared. $^1$H NMR (500 MHz, CDCl$_3$) δ 7.15-7.11 (m, 2H), 7.11 (d, J=7.2 Hz, 1H), 6.93-6.91 (m, 1H), 6.84 (d, J=8.0 Hz, 1H), 6.81 (d, J=2.8 Hz, 1H), 5.97 (t, J=5.2 Hz, 1H), 4.32 (d, J=5.2 Hz, 2H), 2.97-2.89 (m, 4H), 2.82-2.73 (m, 4H), 2.54-2.47 (m, 3H), 2.27 (t, J=8.0 Hz, 2H), 2.03 (m, 1H), 1.72-1.62 (m, 2H), 1.59 (m, 1H), 1.47 (q, J=6.8 Hz, 2H), 1.25 (m, 32H), 0.88 (m, 6H). MS(m/z): 667.71 [M+H]$^+$.

Embodiment 3 (S)-6-(propyl(2-(thiophen-2-yl)ethyl)amino)-5,6,7,8-tetrahydronaphthalen-1-yl 4-palmitamido butanoate

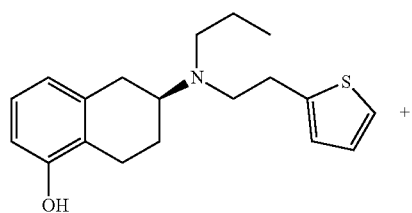
+
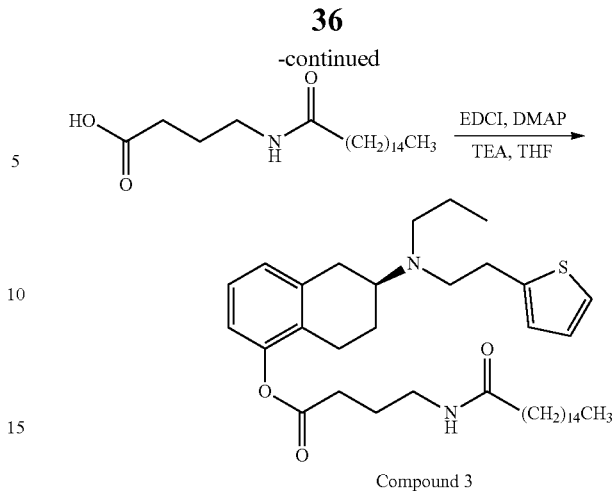

Compound 3

Referring to the method of Embodiment 1, 4-palmitamido butyric acid (1.1 eq) was used to replace octadecanamide acetic acid, so that a white solid powder, Compound 3 (0.53 g, yield: 26%) was prepared. MS(m/z): 639.15 [M+H]$^+$.

Embodiment 4 (S)-6-(propyl(2-(thiophen-2-yl)ethyl)amino)-5,6,7,8-tetrahydronaphthalen-1-yl 4-stearamido butanoate

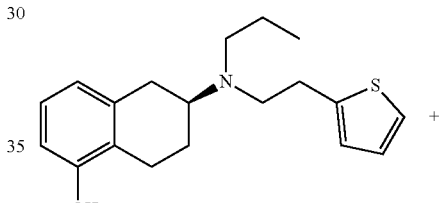
+
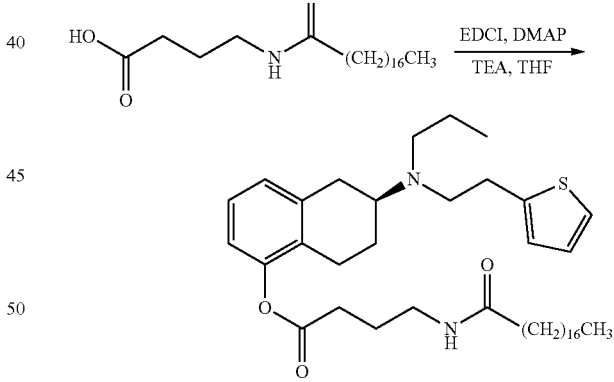

Compound 4

Referring to the method of Embodiment 1, 4-stearamido butyric acid (1.1 eq) was used to replace octadecanamide acetic acid, so that a white solid powder, Compound 4 (0.77 g, yield: 47.3%) was prepared. $^1$H NMR (400 MHz, CDCl$_3$) δ 7.14-7.10 (m, 2H), 6.98 (d, J=7.6 Hz, 1H), 6.93-6.91 (dd, J=4.2 Hz, 3.2 Hz, 1H), 6.82 (d, J=3.6 Hz, 1H), 6.81 (s, 1H), 5.65 (br, 1H), 3.41-3.36 (dd, J=12.8 Hz, 6.8 Hz, 2H), 2.97-2.89 (m, 4H), 2.84-2.76 (m, 4H), 2.63 (t, J=7.2 Hz, 2H), 2.56-2.46 (m, 3H), 2.16 (t, J=8.0 Hz, 2H), 2.03 (m, 1H), 2.00-1.93 (m, 2H), 1.64-1.59 (m, 3H), 1.54-1.47 (m, 2H), 1.25 (m, 28H), 0.92-0.86 (m, 6H). MS(m/z): 667.59 [M+H]$^+$.

Embodiment 5 (S)-6-(propyl(2-(thiophen-2-yl)ethyl)amino)-5,6,7,8-tetrahydronaphthalen-1-yl 4-icosanamido butanoate

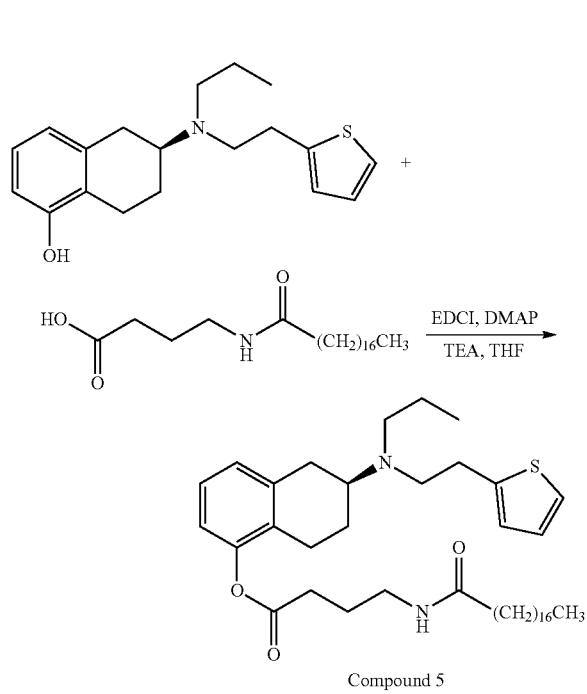

Referring to the method of Embodiment 1, 4-icosanamido butyric acid (1.1 eq) was used to replace octadecanamide acetic acid, so that a while solid powder, Compound 5 (1.80 g, yield: 40.8%) was prepared. $^1$H NMR (500 MHz, CDCl$_3$) δ 7.12 (m, 2H), 6.98 (m, 1H), 6.92 (m, 1H), 6.81 (m, 2H), 5.65 (s, 1H), 3.78 (m, 2H), 2.98-2.88 (m, 4H), 2.82-2.76 (m, 4H), 2.62 (m, 2H), 2.54 (m, 3H), 2.16 (m, 2H), 2.03 (m, 1H), 1.97-1.96 (m, 2H), 1.61 (m, 5H), 1.25 (m, 32H), 0.89 (m, 6H). MS(m/z): 696.58 [M+H]$^+$.

Embodiment 6 (S)-6-(propyl(2-(thiophen-2-yl)ethyl)amino)-5,6,7,8-tetrahydronaphthalen-1-yl (2-(4-acetamidophenyl)acetyl) glycinate

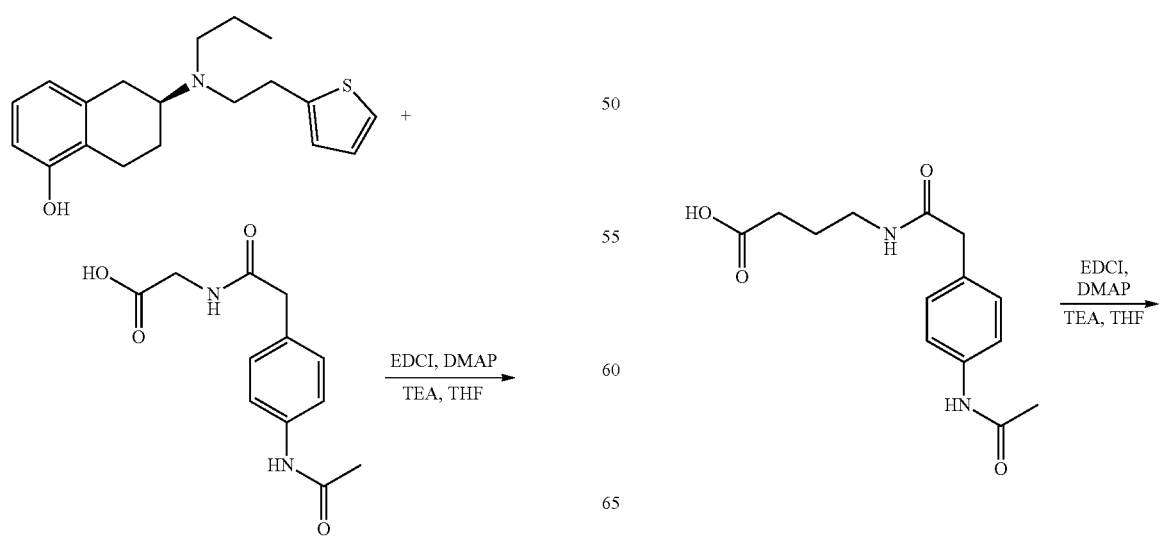

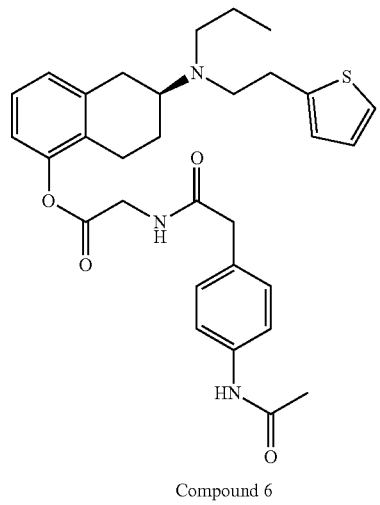

Compound 6

Referring to the method of Embodiment 1, 2-(4-acetamidophenyl)acetyl) glycine (1.1 eq) was used to replace octadecanamide acetic acid, so that Compound 6 (1.30 g, yield: 75%) was prepared. MS (m/z): 548.15 [M+H]$^+$.

Embodiment 7 (S)-6-(propyl(2-(thiophen-2-yl)ethyl)amino)-5,6,7,8-tetrahydronaphthalen-1-yl 4-(2-(4-acetamidophenyl)acetamido) butanoate

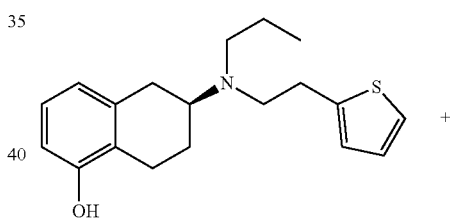

-continued

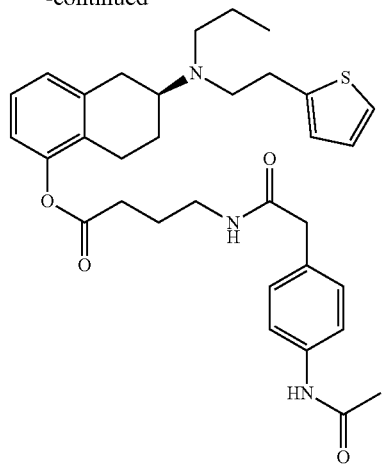

Compound 7

Referring to the method of Embodiment 1, 4-(2-(4-acetamidophenyl)acetamido) butyric acid (1.1 eq) was used to replace octadecanamide acetic acid, so that Compound 7 (0.60 g, yield: 33%) was prepared. MS(m/z): 576.31 [M+H]$^+$.

Embodiment 8 (S)-6-(propyl(2-(thiophen-2-yl)ethyl)amino)-5,6,7,8-tetrahydronaphthalen-1-yl cinnamamido acetate

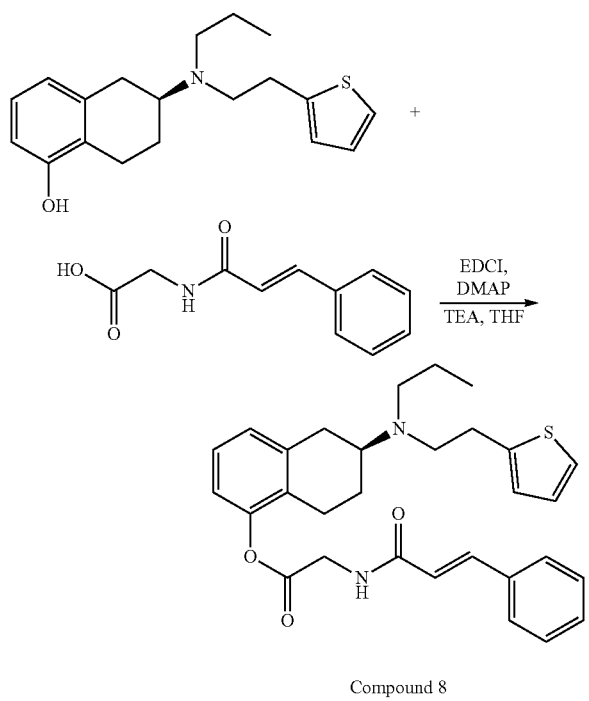

Compound 8

Referring to the method of Embodiment 1, cinnamamino acetic acid (1.1 eq) was used to replace octadecanamide acetic acid, so that Compound 8 (1.30 g, yield: 82%) was prepared. MS(m/z): 503.10 [M+H]$^+$.

Embodiment 9 (S)-6-(propyl(2-(thiophen-2-yl)ethyl)amino)-5,6,7,8-tetrahydronaphthalen-1-yl 4-(cinnamamido) butanoate

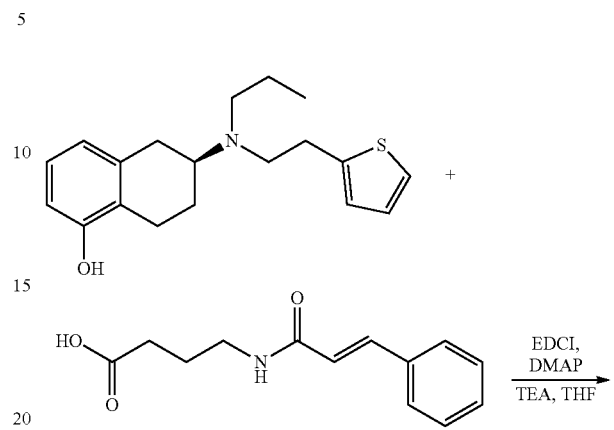

Compound 9

Referring to the method of Embodiment 1,4-cinnamamido butyric acid (1.1 eq) was used to replace octadecanamide acetic acid, so that Compound 9 (0.59 g, yield: 35%) was prepared. MS(m/z): 531.20 [M+H]$^+$.

Embodiment 10 (S)-6-(propyl(2-(thiophen-2-yl)ethyl)amino)-5,6,7,8-tetrahydronaphthalen-1-yl 2-(phenylacetamido) acetate

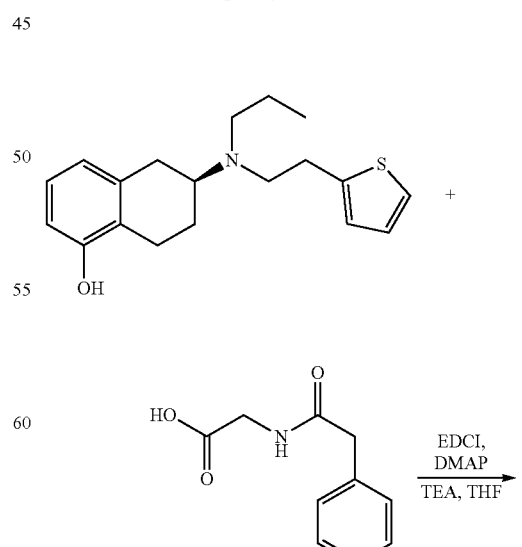

41
-continued

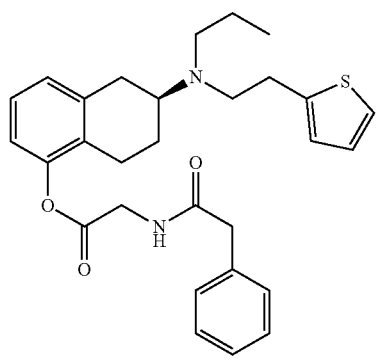

Compound 10

Referring to the method of Embodiment 1, 2-(phenylac-etamido) acetic acid (1.1 eq) was used to replace octade-canamide acetic acid, so that Compound 10 (1.23 g, yield: 79%) was prepared. MS (m/z): 491.08 [M+H]$^+$.

Embodiment 11 (S)-6-(propyl(2-(thiophen-2-yl) ethyl)amino)-5,6,7,8-tetrahydronaphthalen-1-yl 4-(2-phenylacetamido) butanoate

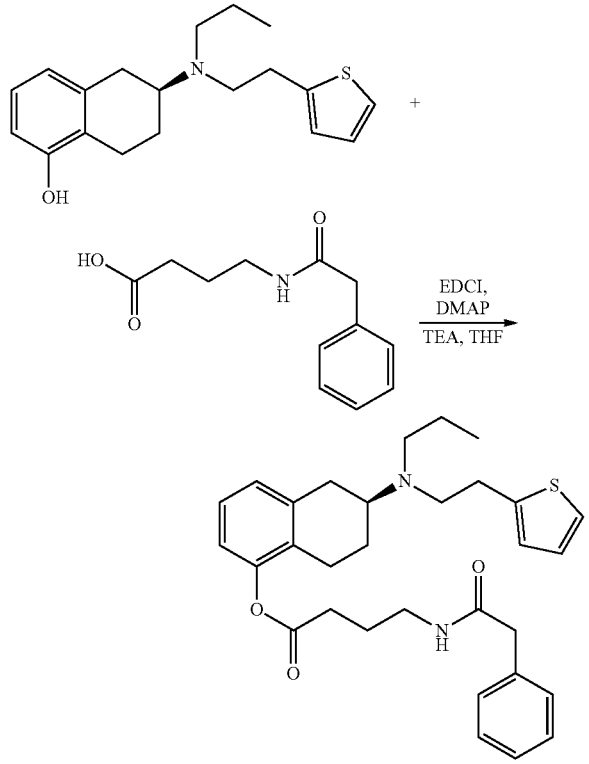

Compound 11

Referring to the method of Embodiment 1, 4-(2-pheny-lacetamido) butyric acid (1.1 eq) was used to replace octa-decanamide acetic acid, so that Compound 11 (0.5 g, yield: 30%) was prepared. MS(m/z): 519.13 [M+H]$^+$.

42

Embodiment 12 (S)-6-(propyl(2-(thiophen-2-yl) ethyl)amino)-5,6,7,8-tetrahydronaphthalen-1-yl (3-phenylpropanylamido) acetate

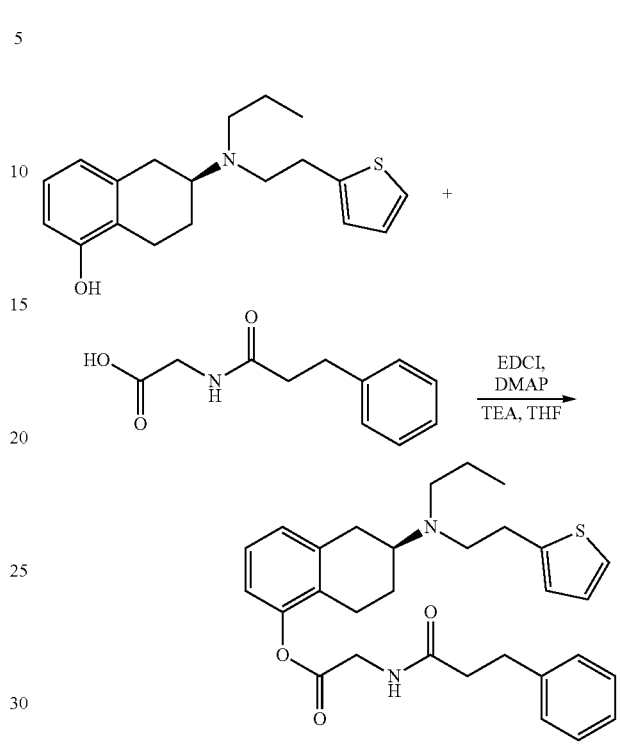

Compound 12

Referring to the method of Embodiment 1, (3-phenylpro-panylamido) acetic acid (1.1 eq) was used to replace octa-decanamide acetic acid, so that Compound 12 (1.18 g, yield: 74%) was prepared. MS(m/z): 505.10 [M+H]$^+$.

Embodiment 13 (S)-6-(propyl(2-(thiophen-2-yl) ethyl)amino)-5,6,7,8-tetrahydronaphthalen-1-yl 4-(3-phenylpropanylamido) butanoate

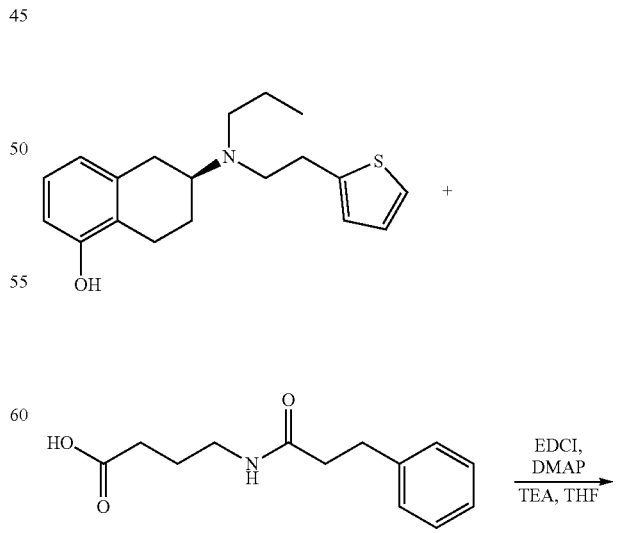

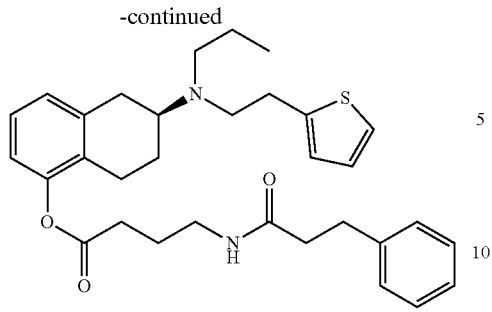

Compound 13

Referring to the method of Embodiment 1, 4-(3-phenylacetamido) butyric acid (1.1 eq) was used to replace octadecanamide acetic acid, so that Compound 13 (0.47 g, yield: 28%) was prepared. MS(m/z): 533.17 [M+H]$^+$.

Embodiment 14 (S)-6-(propyl(2-(thiophen-2-yl) ethyl)amino)-5,6,7,8-tetrahydronaphthalen-1-yl (4-icosanamidobenzoyl) glycinate

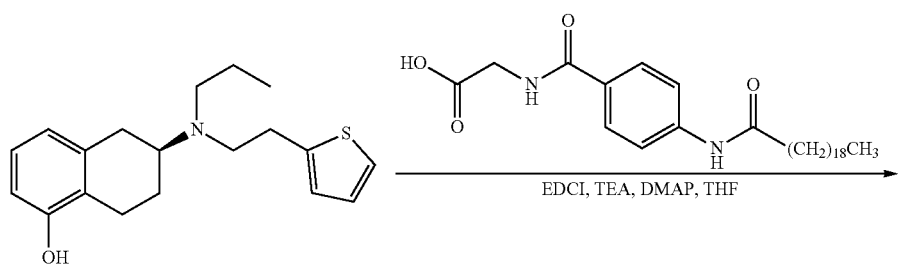

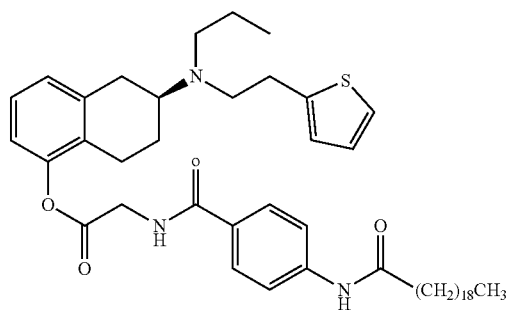

Compound 14

Referring to the method of Embodiment 1, (4-icosanamidobenzoyl) glycine (1.1 eq) was used to replace octadecanamide acetic acid, so that Compound 14 (0.31 g, yield: 13%) was prepared. $^1$H NMR (500 MHz, CDCl$_3$) δ 7.80 (d, J=8.5 Hz, 2H), 7.62 (d, J=8.5 Hz, 2H), 7.33 (m, 1H), 7.16-7.11 (m, 2H), 7.01 (d, J=7.5 Hz, 1H), 6.92 (t, J=5.0 Hz, 1H), 6.88 (d, J=7.5 Hz, 1H), 6.82 (s, 1H), 6.68 (br, 1H), 4.50 (d, J=5.0 Hz, 2H), 2.98 (m, 4H), 2.85-2.83 (m, 4H), 2.56-2.54 (m, 3H), 2.37 (t, J=7.5 Hz, 2H), 2.08 (m, 1H), 1.74-1.69 (m, 2H), 1.59-1.42 (m, 3H), 1.25 (m, 32H), 0.90-0.84 (m, 6H). MS(m/z): 786.56 [M+H]$^+$.

Embodiment 15 (S)-6-(propyl(2-(thiophen-2-yl)ethyl)amino)-5,6,7,8-tetrahydronaphthalen-1-yl (4-stearamidobenzoyl) glycinate

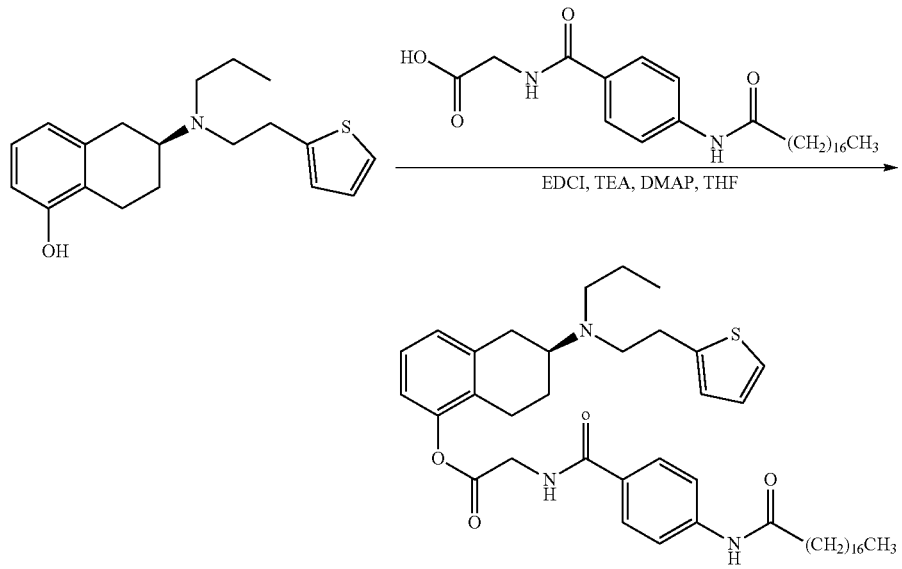

Compound 15

Referring to the method of Embodiment 1, (4-stearamidobenzoyl) glycine (1.1 eq) was used to replace octadecanamide acetic acid, so that a white solid powder, Compound 15 (0.18 g, yield: 12.5%) was prepared. $^1$H NMR (500 MHz, CDCl$_3$) δ 7.80 (d, J=8.5 Hz, 2H), 7.62 (d, J=8.5 Hz, 2H), 7.33 (m, 1H), 7.15-7.12 (m, 2H), 7.01 (d, J=7.5 Hz, 1H), 6.92 (t, J=5.0 Hz, 1H), 6.88 (d, J=7.5 Hz, 1H), 6.82 (s, 1H), 6.69 (br, 1H), 4.50 (d, J=5.0 Hz, 2H), 2.98 (m, 4H), 2.85-2.83 (m, 4H), 2.56-2.54 (m, 3H), 2.37 (t, J=7.5 Hz, 2H), 2.08 (m, 1H), 1.75-1.70 (m, 2H), 1.58-1.43 (m, 3H), 1.25 (m, 28H), 0.91-0.86 (m, 6H). MS(m/z): 758.76 [M+H]$^+$.

Embodiment 16 (S)-6-(propyl(2-(thiophen-2-yl)ethyl)amino)-5,6,7,8-tetrahydronaphthalen-1-yl (4-palmitamidobenzoyl) glycinate

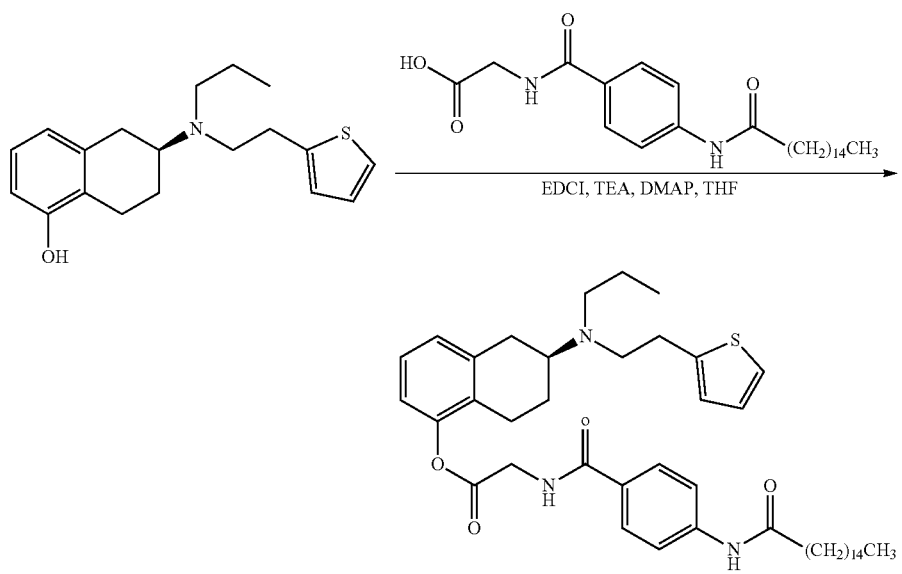

Compound 16

Referring to the method of Embodiment 1, (4-palmitamidobenzoyl) glycine (1.1 eq) was used to replace octadecanamide acetic acid, so that a white solid powder, Compound 16 (0.36 g, yield: 15%) was prepared. MS(m/z): 730.49 [M+H]+.

Embodiment 17 (S)-6-(propyl(2-(thiophen-2-yl)ethyl)amino)-5,6,7,8-tetrahydronaphthalen-1-yl (4-tetradecanamidobenzyol) glycinate

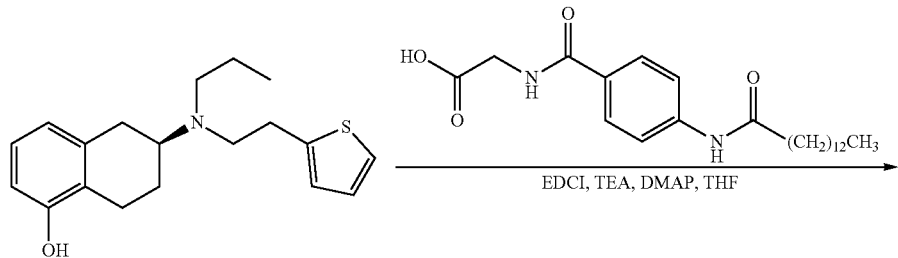

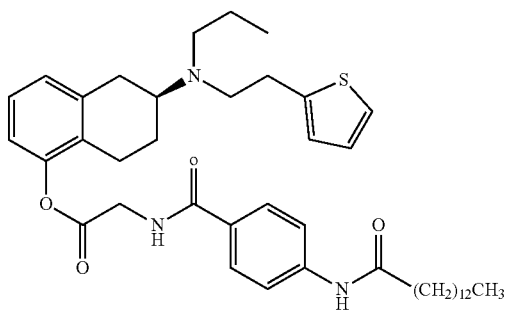

Compound 17

Referring to the method of Embodiment 1, (4-tetradecanamidobenzoyl) glycine (1.1 eq) was used to replace octadecanamide acetic acid, so that a white solid powder, Compound 17 (0.28 g, yield: 14.3%) was prepared. MS(m/z): 702.47 [M+H]+.

Embodiment 18 (S)-6-(propyl(2-(thiophen-2-yl)ethyl)amino)-5,6,7,8-tetrahydronaphthalen-1-yl 4-(4-tetradecanamidobenzamido) butanoate

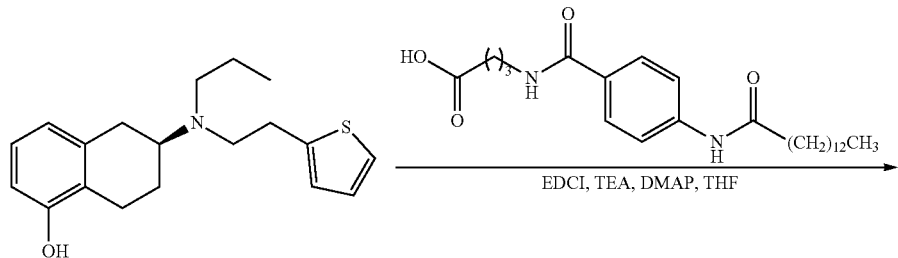

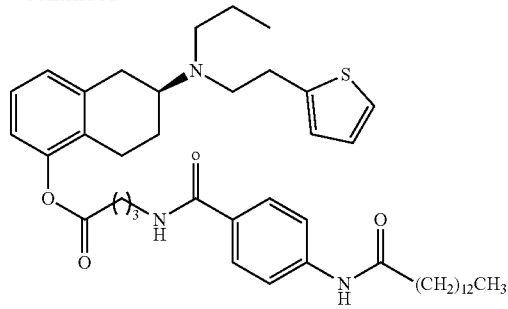

Compound 18

Referring to the method of Embodiment 1, 4-(4-tetradecanamidobenzamido) butyric acid (1.1 eq) was used to replace octadecanamide acetic acid, so that a white solid powder, Compound 18 (0.12 g, yield: 11%) was prepared. MS(m/z): 730.65 [M+H]$^+$.

Embodiment 19 (S)-6-(propyl(2-(thiophen-2-yl)ethyl)amino)-5,6,7,8-tetrahydronaphthalen-1-yl 4-(4-palmitoylamidobenzamido) butanoate

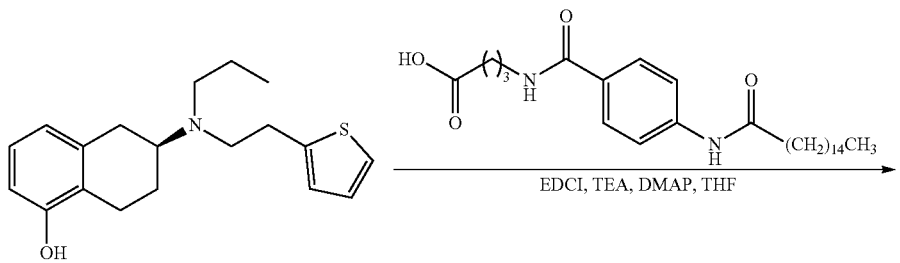

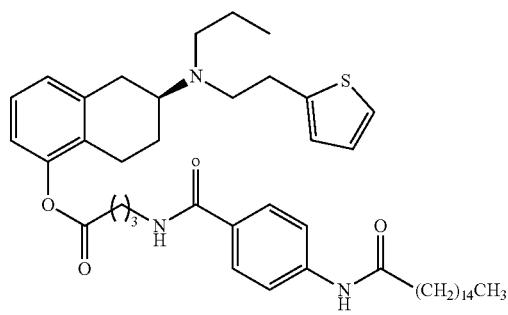

Compound 19

Referring to the method of Embodiment 1, 4-(4-palmitoylamidobenzamido) butyric acid (1.1 eq) was used to replace octadecanamide acetic acid, so that a white solid powder, Compound 19 (0.15 g, yield: 12%) was prepared. MS(m/z): 758.57 [M+H]$^+$.

Embodiment 20 (S)-6-(propyl(2-(thiophen-2-yl)ethyl)amino)-5,6,7,8-tetrahydronaphthalen-1-yl 4-(4-stearamidobenzamido) butanoate

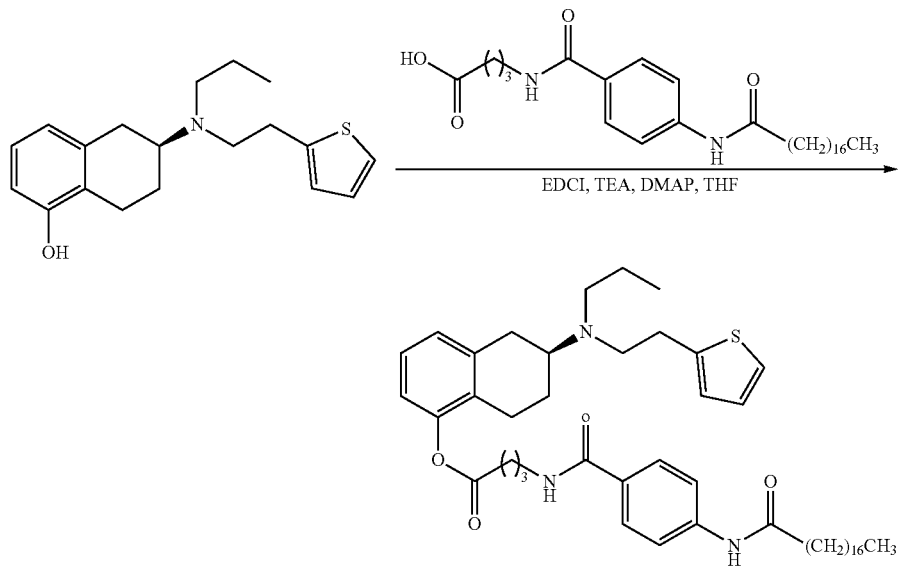

Compound 20

Referring to the method of Embodiment 1, 4-(4-stearamidobenzamido) butyric acid (1.1 eq) was used to replace octadecanamide acetic acid, so that a white solid powder, Compound 20 (0.25 g, yield: 12.5%) was prepared. MS(m/z): 788.53 [M+H]$^+$.

Embodiment 21 (S)-6-(propyl(2-(thiophen-2-yl)ethyl)amino)-5,6,7,8-tetrahydronaphthalen-1-yl 4-(4-icosanoylbenzamido) butanoate

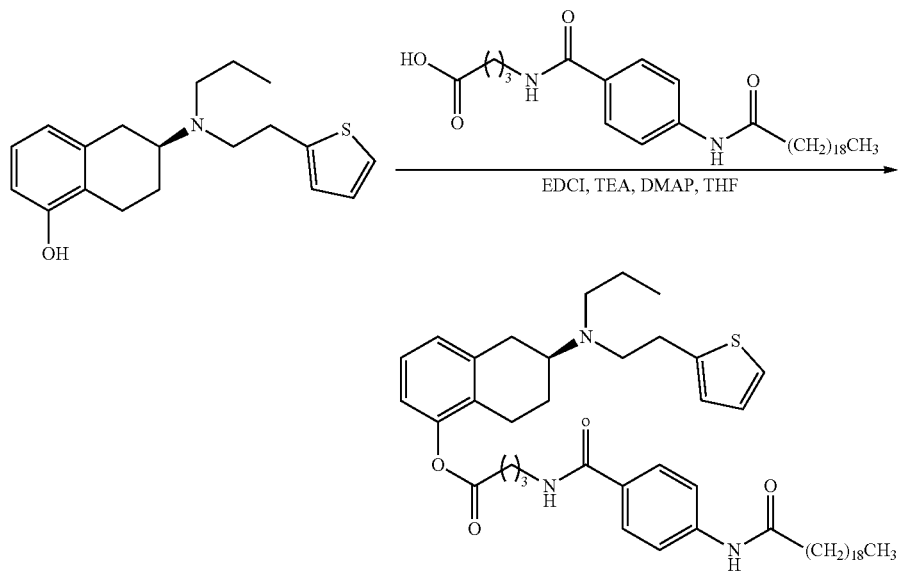

Compound 21

Referring to the method of Embodiment 1, 4-(4-icosanoylbenzamido) butyric acid (1.61 g, 3.49 mmol, 1.1 eq) was used to replace octadecanamide acetic acid, so that a white solid powder, Compound 21 (0.18 g, yield: 13%) was prepared. MS(m/z): 814.64 [M+H]$^+$.

Embodiment 22 (S)-6-(propyl(2-(thiophen-2-yl) ethyl)amino)-5,6,7,8-tetrahydronaphthalen-1-yl (4-palmitamidobutanoyl) glycinate Compound 22

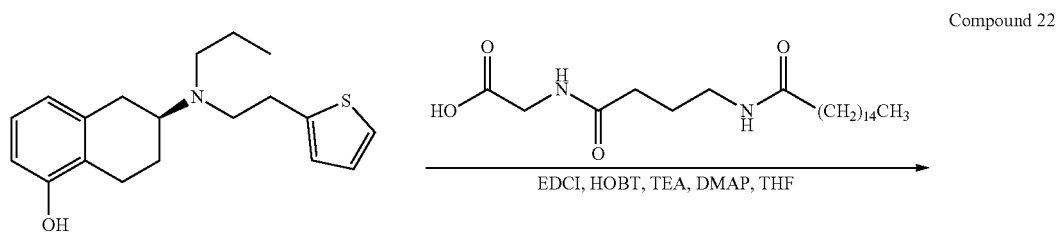

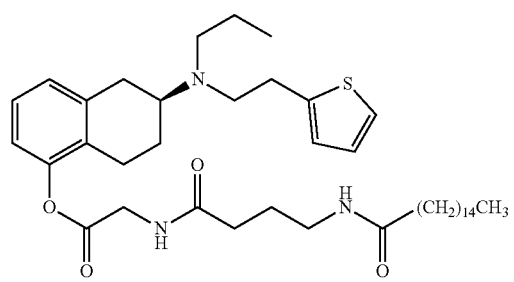

Rotigotine (0.6 g, 1.91 mmol), (4-palmitamidobutanoyl) glycine (0.91 g, 2.29 mmol, 1.10 eq), DMAP (23.2 mg, 0.19 mmol, 0.10 eq), triethylamine (0.39 g, 3.81 mmol, 2.0 eq) and THF (6 mL) were added to a 50 mL single-neck flask. The mixture was stirred while EDCI (0.55 g, 2.86 mmol, 1.2 eq) and HOBT (25.7 mg, 0.19 mmol, 0.10 eq) were added, and then the mixture was stirred overnight at 70° C. TLC showed that the raw materials were completely reacted. The mixture was filtered, and filter cake was washed by THF, and then the filtrate was combined and concentrated under reduced pressure, to obtain residues, which were purified through column chromatography (petroleum ether/ethyl acetate=2/1), and finally a white solid powder, Compound 22 (0.27 g, yield: 20.4%) was obtained. $^1$H NMR (500 MHz, CDCl$_3$) δ 7.15 (s, 1H), 7.13-7.10 (m, 2H), 6.99 (d, J=7.5 Hz, 1H), 6.93-6.91 (mr, 1H), 6.84 (d, J=8.0 Hz, 1H), 6.81 (br, 1H), 5.83 (br, 1H), 4.30 (d, J=5.5 Hz, 2H), 3.39-3.36 (dd, J=12.5 Hz, 6.0 Hz, 2H), 2.96-2.88 (m, 4H), 2.83-2.73 (m, 4H), 2.54-2.49 (m, 3H), 2.31 (t, J=6.0 Hz, 2H), 2.17 (t, J=7.5 Hz, 2H), 2.03 (br, 1H), 1.86-1.83 (m, 2H), 1.61-1.58 (m, 5H), 1.28-1.25 (m, 24H), 0.91-0.86 (m, 6H). MS(m/z): 696.58 [M+H]$^+$.

Embodiment 23 (S)-6-(propyl(2-(thiophen-2-yl) ethyl)amino)-5,6,7,8-tetrahydronaphthalen-1-yl (4-stearamidobutanoyl) glycinate Compound 23

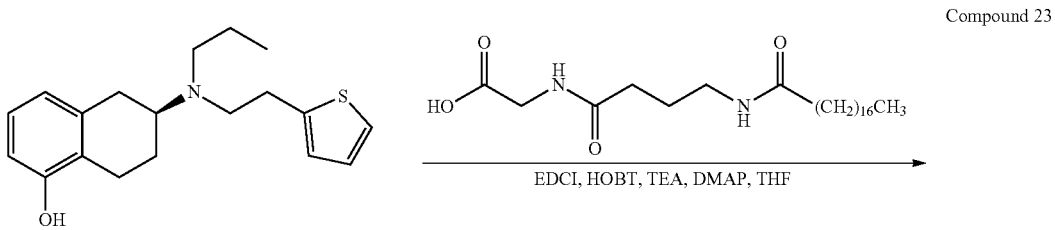

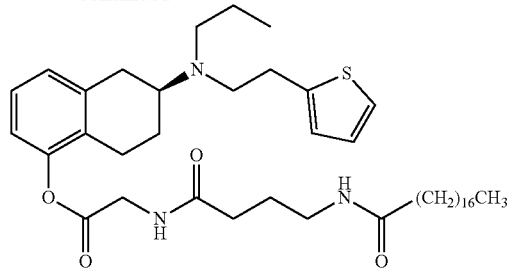

Referring to the method of Embodiment 22, (4-stearamidobutanoyl) glycine (1.1 eq) was used to replace (4-palmitamidobutanoyl) glycine, so that a white solid powder, Compound 23 (0.60 g, yield: 43.6%) was prepared. $^1$H NMR (500 MHz, CDCl$_3$) δ 7.13 (m, 3H), 7.00 (d, J=3.0 Hz, 1H), 6.92 (s, 1H), 6.85-6.83 (m, 2H), 5.83 (br, 1H), 4.30 (d, J=5.5 Hz, 2H), 3.40-3.36 (m, 2H), 2.97 (m, 4H), 2.83 (m, 4H), 2.54 (m, 3H), 2.31 (t, J=6.5 Hz, 2H), 2.17 (t, J=7.5 Hz, 2H), 2.04 (m, 1H), 1.91-1.82 (m, 2H), 1.62-1.58 (m, 5H), 1.28-1.25 (m, 28H), 0.90-0.86 (m, 6H). MS(m/z): 724.66 [M+H]$^+$.

Embodiment 24 (S)-6-(propyl(2-(thiophen-2-yl) ethyl)amino)-5,6,7,8-tetrahydronaphthalen-1-yl (4-icosanoamidobutanoyl) glycinate Compound 24

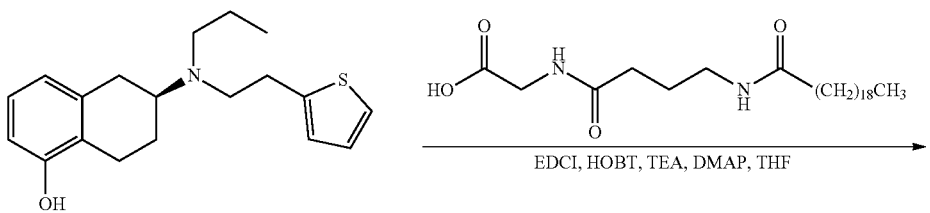

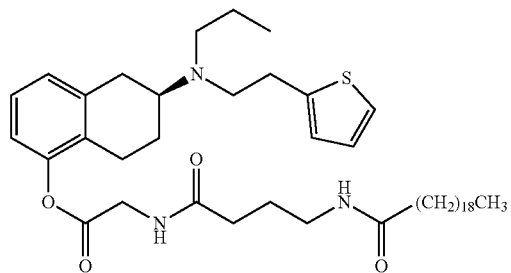

Referring to the method of Embodiment 22, (4-icosanamidobutanoyl) glycine (1.1 eq) was used to replace (4-palmitamidobutanoyl) glycine, so that a white solid powder, Compound 24 (0.78 g, yield: 65.4%) was prepared. $^1$H NMR (500 MHz, CDCl$_3$) δ 7.12 (m, 2H), 6.99 (d, J=7.5 Hz, 1H), 6.92 (m, 1H), 6.85 (d, J=7.5 Hz, 1H), 6.82 (br, 1H), 5.85 (br, 1H), 4.30 (d, J=5.5 Hz, 2H), 3.39-3.36 (m, 2H), 2.99-2.97 (m, 4H), 2.85-2.82 (m, 4H), 2.53 (m, 3H), 2.31 (t, J=6.5 Hz, 2H), 2.17 (t, J=8.0 Hz, 2H), 2.03 (m, 1H), 1.87-1.83 (m, 2H), 1.64-1.59 (m, 3H), 1.60 (m, 3H), 1.50 (m, 2H), 1.25 (m, 32H), 0.93-0.86 (m, 6H). MS(m/z): 752.65 [M+H]$^+$.

Embodiment 25 (S)-6-(propyl(2-(thiophen-2-yl)ethyl)amino)-5,6,7,8-tetrahydronaphthalen-1-yl (18-amino-18-oxooctadecanoyl) glycinate

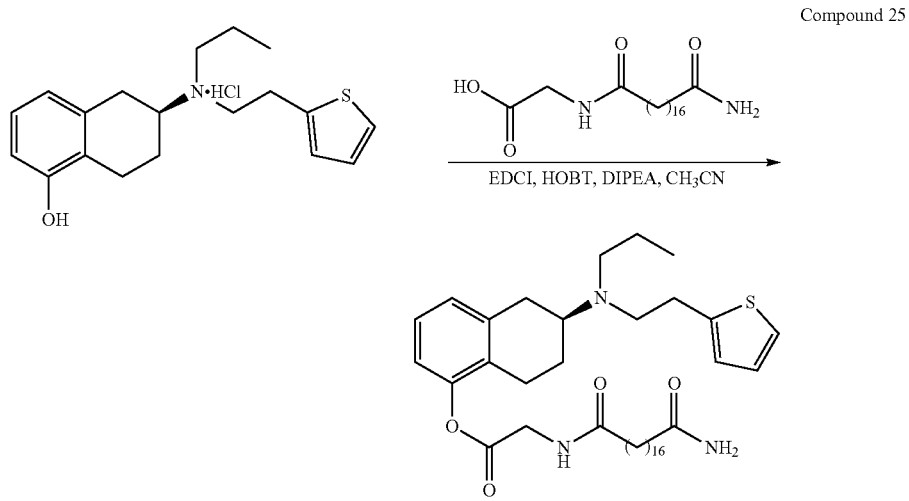

Compound 25

Rotigotine (0.4 g, 1.14 mmol), (18-amino-18-oxooctadecanoyl) glycine (0.56 g, 1.35 mmol, 1.10 eq), N, N-diisopropylethylamine (0.44 g, 3.41 mmol, 3.0 eq), CH$_3$CN (8 mL) were added to a 50 mL single-neck flask. The mixture was stirred while EDCI (0.33 g, 1.71 mmol, 1.5 eq) and HOBT (30.7 mg, 0.23 mmol, 0.20 eq) was added and then the mixture was stirred overnight at 80° C., TLC showed that the raw materials were completely reacted. The mixture was filtered, and filter cake was washed by THF, and then the filtrate was combined and concentrated under reduced pressure, to obtain residues, which were purified through column chromatography (petroleum ether:ethyl acetate=1:1), and finally a while solid powder, Compound 25 (0.04 g, yield: 5.3%) was obtained. $^1$H NMR (500 MHz, DMSO-d$_6$) δ 8.40 (br, 1H), 7.28 (d, J=4.5 Hz, 1H), 7.19 (br, 1H), 7.11 (t, J=4.5 Hz, 1H), 6.99 (d, J=3.0 Hz, 1H), 6.87 (s, 1H), 6.81 (d, J=8.0 Hz, 1H), 6.65 (br, 1H), 4.06 (d, J=5.5 Hz, 2H), 2.92-2.81 (m, 4H), 2.76-2.71 (m, 4H), 2.50-2.36 (m, 3H), 2.13 (t, J=7.0 Hz, 2H), 2.01 (t, J=7.0 Hz, 2H), 1.90 (m, 1H), 1.50-1.38 (m, 7H), 1.22-1.19 (m, 24H), 0.82 (t, J=7.0 Hz, 3H). MS(m/z): 668.64 [M+H]$^+$.

Embodiment 26 (S)-6-(propyl(2-(thiophen-2-yl)ethyl)amino)-5,6,7,8-tetrahydronaphthalen-1-yl (16-amino-16-oxohexadecanoyl) glycinate

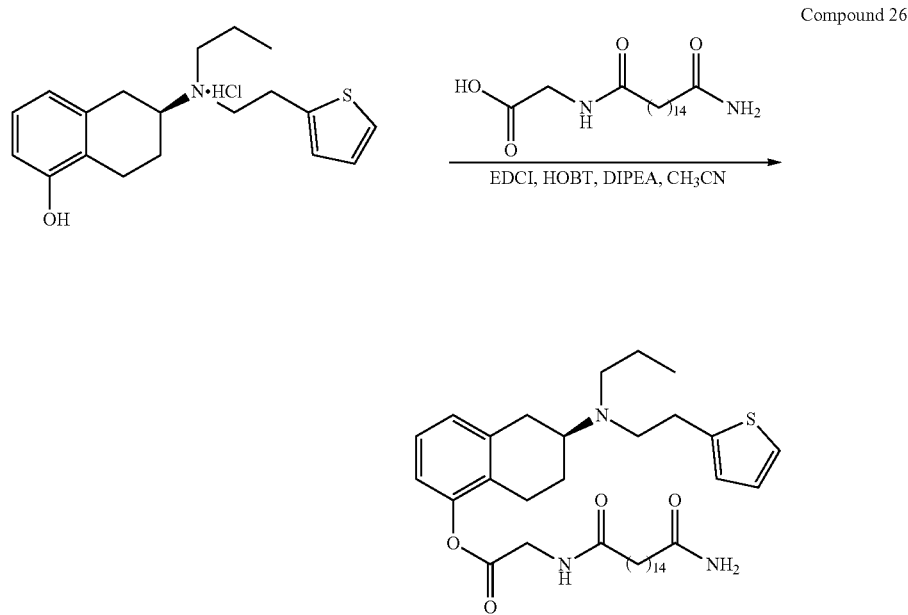

Compound 26

Referring to the method of Embodiment 25, (16-amino-16-oxooctadecanoyl) glycine (1.1 eq) was used to replace (18-amino-18-oxooctadecanoyl) glycine, so that a white solid powder, Compound 26 (0.2 g, yield: 55%) was prepared. $^1$H NMR (500 MHz, DMSO-$d_6$) δ 8.40 (br, 1H), 7.29 (d, J=4.0 Hz, 1H), 7.20 (br, 1H), 7.13 (t, J=7.5 Hz, 1H), 7.01 (d, J=3.0 Hz, 1H), 6.93 (s, 1H), 6.88 (s, 1H), 6.83 (d, J=8.0 Hz, 1H), 6.66 (br, 1H), 4.08 (d, J=5.5 Hz, 2H), 2.92-2.82 (m, 4H), 2.76-2.67 (m, 4H), 2.50-2.37 (m, 3H), 2.15 (t, J=7.0 Hz, 2H), 2.01 (t, J=7.0 Hz, 2H), 1.92 (d, J=13.5 Hz, 1H), 1.54-1.38 (m, 7H), 1.23-1.20 (m, 20H), 0.85 (t, J=7.0 Hz, 3H). MS(m/z): 640.56 [M+H]$^+$.

Embodiment 27 (S)-6-(propyl(2-(thiophen-2-yl)ethyl)amino)-5,6,7,8-tetrahydronaphthalen-1-yl (14-amino-14-oxotetradecanoyl) glycinate

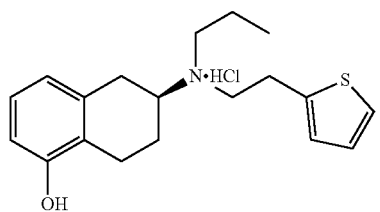
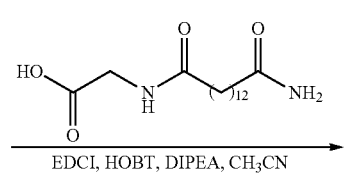

Compound 27

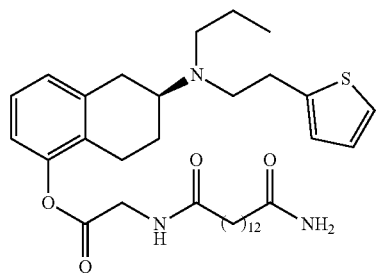

Referring to the method of Embodiment 25, (14-amino-14-oxotetradecanoyl) glycine (1.1 eq) was used to replace (18-amino-18-oxooctadecanoyl) glycine, so that a white solid powder, Compound 27 (1.0 g, yield: 57.5%) was prepared. $^1$H NMR (500 MHz, DMSO-$d_6$) δ 8.40 (br, 1H), 7.28 (d, J=5.5 Hz, 1H), 7.20 (br, 1H), 7.12 (t, J=7.5 Hz, 1H), 7.01 (d, J=7.5 Hz, 1H), 6.92 (dd, J=5.5 Hz, 3.5 Hz, 1H), 6.87 (d, J=3.0 Hz, 1H), 6.82 (d, J=8.0 Hz, 1H), 6.66 (br, 1H), 4.07 (d, J=6.0 Hz, 2H), 2.92-2.82 (m, 4H), 2.76-2.67 (m, 4H), 2.48 (m, 2H), 2.44-2.37 (m, 1H), 2.14 (t, J=7.0 Hz, 2H), 2.00 (t, J=7.5 Hz, 2H), 1.92-1.90 (m, 1H), 1.52-1.35 (m, 7H), 1.23-1.20 (m, 16H), 0.84 (t, J=7.5 Hz, 3H). MS(m/z): 612.45 [M+H]$^+$.

Embodiment 28 (S)-6-(propyl(2-(thiophen-2-yl)ethyl) amino)-5,6,7,8-tetrahydronaphthalen-1-yl (20-(ethylamino)-20-oxoicosanoyl) glycinate Compound 28

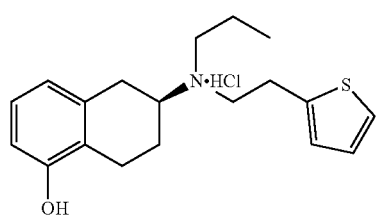
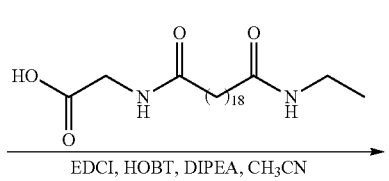

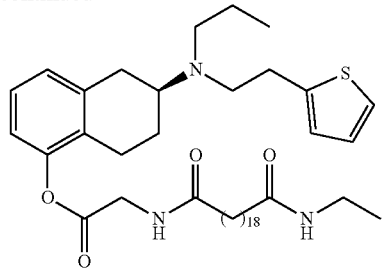

Referring to the method of Embodiment 25, (20-(ethylamino)-20-oxoicosanoyl) glycine (1.1 eq) was used to replace (18-amino-18-oxooctadecanoyl) glycine, so that a white solid powder, Compound 28 (0.38 g, yield: 52%) was prepared. MS(m/z): 724.55 [M+H]$^+$.

Embodiment 29 (S)-6-(propyl(2-(thiophen-2-yl)ethyl)amino)-5,6,7,8-tetrahydronaphthalen-1-yl (19-(ethylamino)-19-oxononadecanoyl) glycinate Compound 29

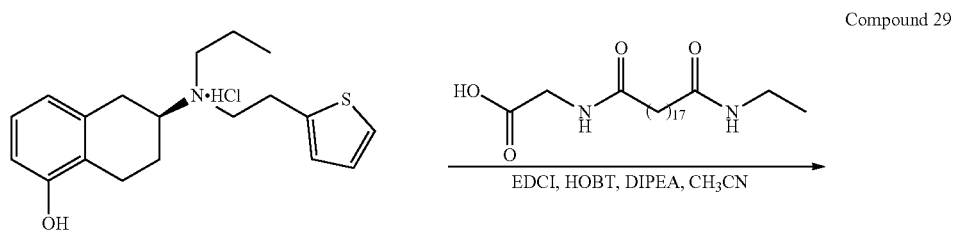

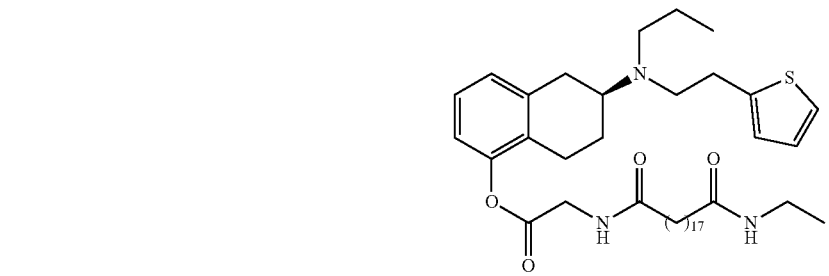

Referring to the method of Embodiment 25, (19-(ethylamino)-19-oxononadecanoyl) glycine (1.1 eq) was used to replace (18-amino-18-oxooctadecanoyl) glycine, so that a white solid powder, Compound 29 (0.25 g, yield: 50%) was prepared. MS(m/z): 710.52 [M+H]$^+$.

Embodiment 30 (S)-6-(propyl (2-(thiophen-2-yl)ethyl)amino)-5,6,7,8-tetrahydronaphthalen-1-yl (18-(ethylamino)-18-oxooctadecanoyl) glycinate

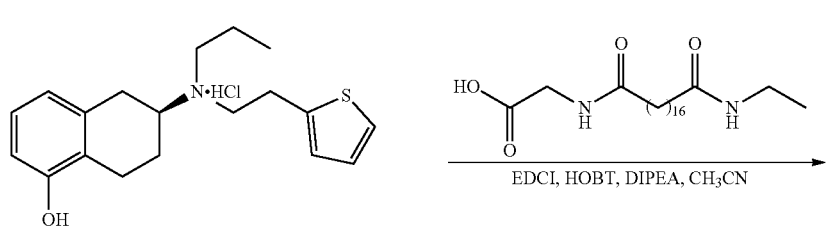

Compound 30

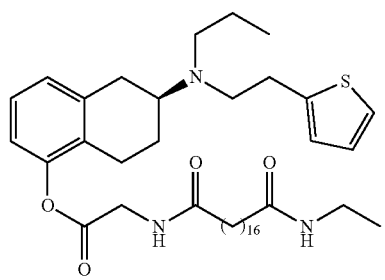

30

Referring to the method of Embodiment 25, (18-(ethylamino)-18-oxooctadecanoyl) glycine (1.1 eq) was used to replace (18-amino-18-oxooctadecanoyl) glycine, so that a white solid powder, Compound 30 (1.27 g, yield: 60%) was prepared. MS(m/z): 696.53 [M+H]⁺.

Embodiment 31 (S)-6-(propyl(2-(thiophen-2-yl)ethyl)amino)-5,6,7,8-tetrahydronaphthalen-1-yl (17-(ethylamino)-17-oxoheptadecanoyl) glycinate

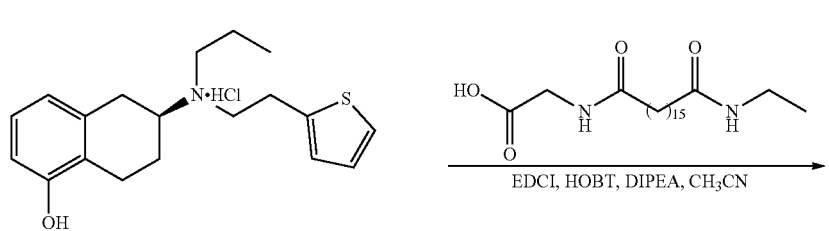

Compound 31

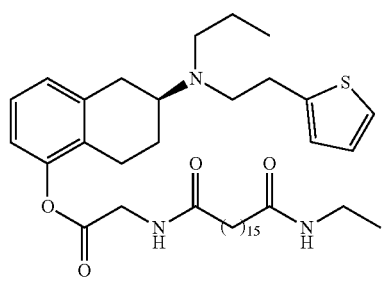

Referring to the method of Embodiment 25, (17-(ethyl-amino)-17-oxoheptadecanoyl) glycine (1.1 eq) was used to replace (18-amino-18-oxooctadecanoyl) glycine, so that a white solid powder, Compound 31 (0.26 g, yield: 62%) was prepared. MS(m/z): 682.46 [M+H]⁺.

Embodiment 32 (S)-6-(propyl(2-(thiophen-2-yl)ethyl)amino)-5,6,7,8-tetrahydronaphthalen-1-yl (16-(ethylamino)-16-oxohexadecanoyl) glycinate

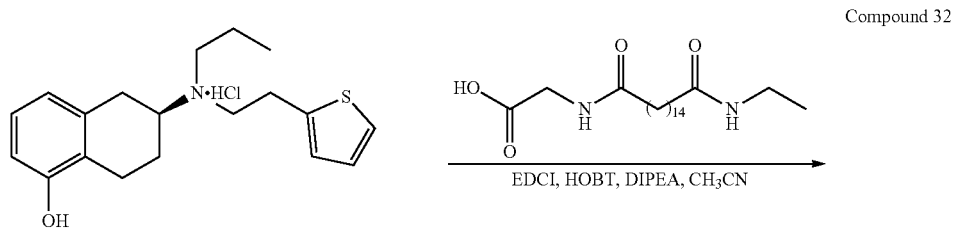

Compound 32

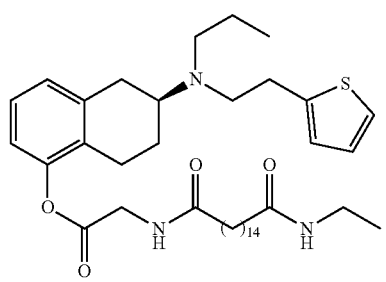

Referring to the method of Embodiment 25, (16-(ethyl-amino)-16-oxohexadecanoyl) glycine (1.1 eq) was used to replace (18-amino-18-oxooctadecanoyl) glycine, so that a white solid powder, Compound 32 (0.48 g, yield: 73.8%) was prepared. ¹H NMR (500 MHz, DMSO-d₆) δ 8.40 (br, 1H), 7.71 (br, 1H), 7.28 (d, J=5.0 Hz, 1H), 7.12 (t, J=7.5 Hz, 1H), 7.01 (d, J=3.0 Hz, 1H), 6.92 (s, 1H), 6.87 (s, 1H), 6.83 (d, J=8.0 Hz, 1H), 4.07 (d, J=5.0 Hz, 2H), 3.05 (t, J=6.5 Hz, 2H), 2.91-2.82 (m, 4H), 2.75-2.63 (m, 4H), 2.50-2.37 (m, 3H), 2.14 (t, J=7.0 Hz, 2H), 2.01 (t, J=7.0 Hz, 2H), 1.90 (br, 1H), 1.50-1.38 (m, 7H), 1.23-1.20 (m, 20H), 0.98 (t, J=7.0 Hz, 3H), (t, J=7.0 Hz, 3H). MS(m/z): 668.60 [M+H]⁺.

Embodiment 33 (S)-6-(propyl(2-(thiophen-2-yl)ethyl)amino)-5,6,7,8-tetrahydronaphthalen-1-yl (15-(ethylamino)-15-oxopentadecanoyl) glycinate

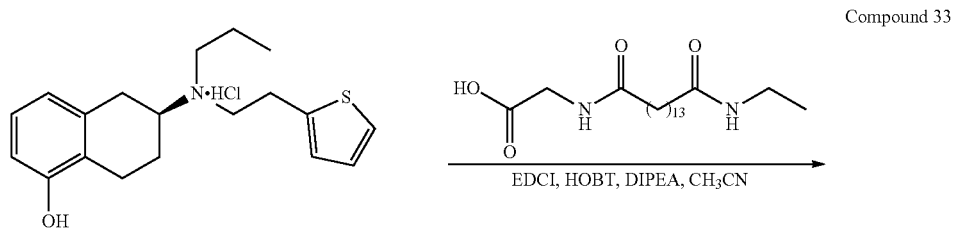

Compound 33

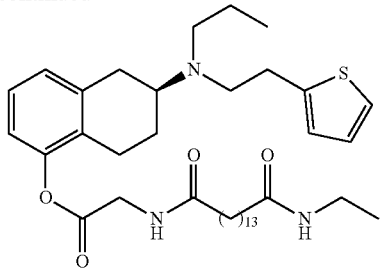

Referring to the method of Embodiment 25, (15-(ethylamino)-15-oxopentadecanoyl) glycine (1.1 eq) was used to replace (18-amino-18-oxooctadecanoyl) glycine, so that a white solid powder, Compound 33 (0.42 g, yield: 70%) was prepared. MS(m/z): 654.45 [M+H]+.

Embodiment 34 (S)-6-(propyl(2-(thiophen-2-yl)ethyl)amino)-5,6,7,8-tetrahydronaphthalen-1-yl (14-(ethylamino)-14-oxotetradecanoyl) glycinate

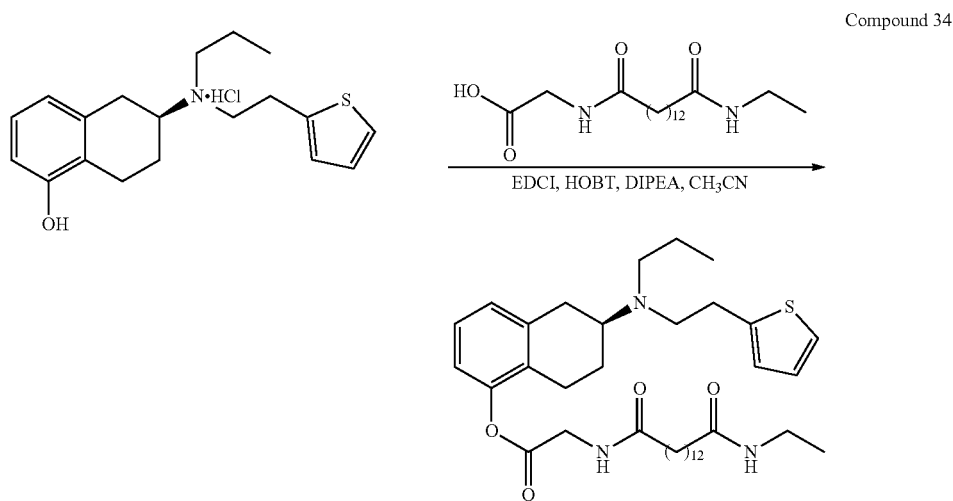

Compound 34

Referring to the method of Embodiment 25, (14-(ethylamino)-14-oxotetradecanoyl) glycine (1.1 eq) was used to replace (18-amino-18-oxooctadecanoyl) glycine, so that a white solid powder, Compound 34 (0.37 g, yield: 65%) was prepared. $^1$H NMR (500 MHz, DMSO-$d_6$) δ 8.41 (br, 1H), 7.72 (m, 1H), 7.28 (d, J=5.0 Hz, 1H), 7.12 (t, J=7.5 Hz, 1H), 7.01 (d, J=3.0 Hz, 1H), 6.92 (s, 1H), 6.87 (s, 1H), 6.83 (d, J=8.0 Hz, 1H), 4.07 (d, J=5.0 Hz, 2H), 3.05 (t, J=6.5 Hz, 2H), 2.92-2.81 (m, 4H), 2.75-2.62 (m, 4H), 2.51-2.35 (m, 3H), 2.14 (t, J=7.0 Hz, 2H), 2.01 (t, J=7.0 Hz, 2H), 1.90 (m, 1H), 1.50-1.38 (m, 7H), 1.23-1.18 (m, 16H), 0.98 (t, J=7.0 Hz, 3H), (t, J=7.0 Hz, 3H). MS(m/z): 640.46 [M+H]+.

Embodiment 35 (S)-6-(propyl(2-(thiophen-2-yl)ethyl)amino)-5,6,7,8-tetrahydronaphthalen-1-yl (16-(propylamino)-16-oxohexadecanoyl) glycinate Compound 35

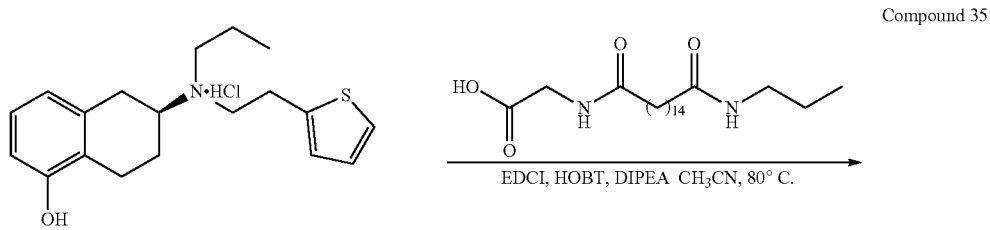

-continued

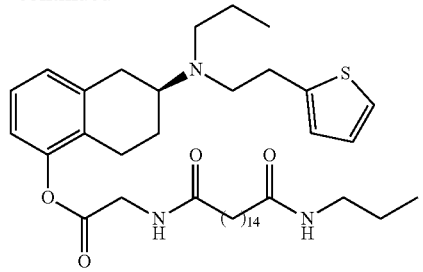

Referring to the method of Embodiment 25, (16-(propylamino)-16-oxohexadecanoyl) glycine (1.1 eq) was used to replace (18-amino-18-oxooctadecanoyl) glycine, so that a white solid powder, Compound 35 (0.62 g, yield: 64%) was prepared. $^1$H NMR (500 MHz, CDCl$_3$) δ 7.13-7.12 (m, 2H), 7.01 (d, J=7.5 Hz, 1H), 6.92 (t, J=4.0 Hz, 1H), 6.82 (d, J=7.0 Hz, 1H), 6.82 (s, 1H), 6.02 (br, 1H), 5.42 (m, 1H), 4.31 (d, J=5.5 Hz, 2H), 3.21 (dd, J=8.5 Hz, 7.0 Hz, 2H), 2.96 (m, 4H), 2.82 (m, 4H), 2.54 (m, 3H), 2.27 (t, J=7.5 Hz, 2H), 2.15 (t, J=7.5 Hz, 2H), 2.03 (m, 1H), 1.67-1.48 (m, 9H), 1.31-1.24 (m, 20H), 0.92 (m, 6H). MS(m/z): 682.67 [M+H]$^+$.

Embodiment 36 (S)-6-(propyl(2-(thiophen-2-yl)ethyl)amino)-5,6,7,8-tetrahydronaphthalen-1-yl (15-(propylamino)-15-oxopentadecanoyl) glycinate Compound 36

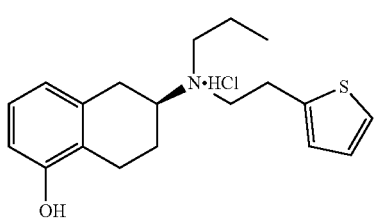
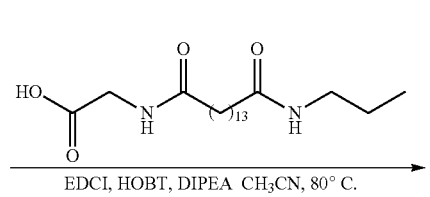

EDCI, HOBT, DIPEA CH$_3$CN, 80° C.

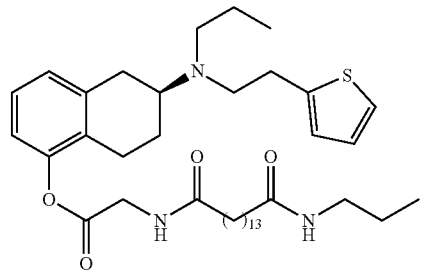

Referring to the method of Embodiment 25, (15-(propylamino)-15-oxopentadecanoyl) glycine (1.1 eq) was used to replace (18-amino-18-oxooctadecanoyl) glycine, so that a white solid powder, Compound 36 (0.34 g, yield: 62%) was prepared. MS(m/z): 668.60 [M+H]$^+$.

Embodiment 37 (S)-6-(propyl(2-(thiophen-2-yl)ethyl)amino)-5,6,7,8-tetrahydronaphthalen-1-yl (14-(propylamino)-14-oxotetradecanoyl) glycinate Compound 37

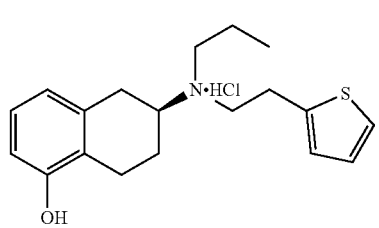
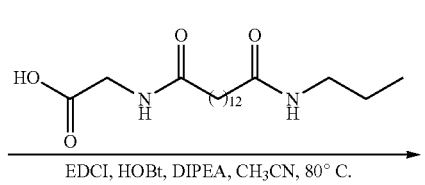

EDCI, HOBt, DIPEA, CH$_3$CN, 80° C.

-continued

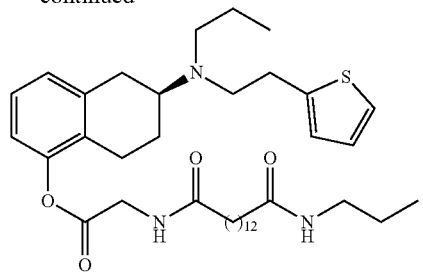

Referring to the method of Embodiment 25, (14-(propylamino)-14-oxopentadecanoyl) glycine (1.1 eq) was used to replace (18-amino-18-oxooctadecanoyl) glycine, so that a white solid powder, Compound 37 (0.42 g, yield: 73%) was prepared. $^1$H NMR (500 MHz, DMSO-d$_6$) 7.14-7.11 (m, 2H), 7.01 (d, J=7.5 Hz, 1H), 6.92 (t, J=4.0 Hz, 1H), 6.82 (d, J=7.0 Hz, 1H), 6.82 (s, 1H), 6.02 (br, 1H), 5.42 (br, 1H), 4.31 (d, J=5.5 Hz, 2H), 3.21 (dd, J=8.5 Hz, 7.0 Hz, 2H), 2.96 (m, 4H), 2.82 (m, 4H), 2.54 (m, 3H), 2.27 (t, J=7.5 Hz, 2H), 2.15 (t, J=7.5 Hz, 2H), 2.03 (m, 1H), 1.67-1.47 (m, 9H), 1.30-1.23 (m, 16H), 0.95-0.83 (m, 6H). MS(m/z): 654.46 [M+H]$^+$.

Embodiment 38 (S)-6-(propyl(2-(thiophen-2-yl)ethyl)amino)-5,6,7,8-tetrahydronaphthalen-1-yl (13-(propylamino)-13-oxotridecanoyl) glycinate Compound 38

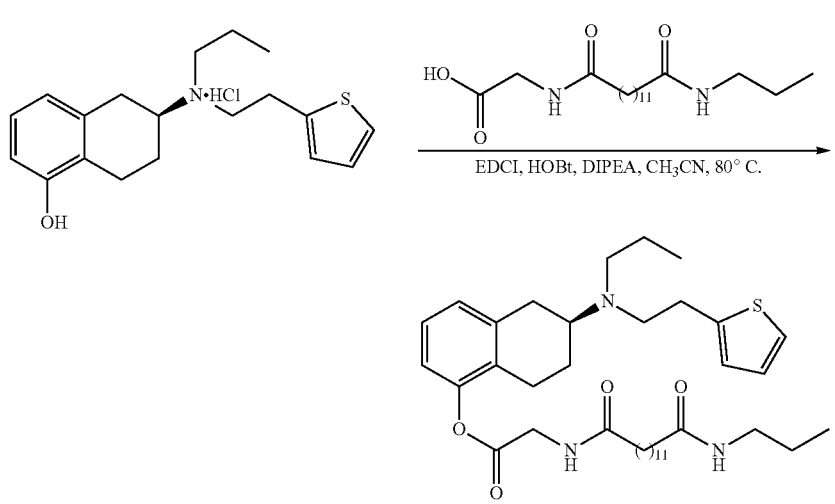

Referring to the method of Embodiment 25, (13-(propylamino)-13-oxotridecanoyl) glycine (1.1 eq) was used to replace (18-amino-18-oxooctadecanoyl) glycine, so that a white solid powder, Compound 38 (0.18 g, yield: 60%) was prepared. MS(m/z): 640.43 [M+H]$^+$.

Embodiment 39 (S)-6-(propyl(2-(thiophen-2-yl)ethyl)amino)-5,6,7,8-tetrahydronaphthalen-1-yl (12-(propylamino)-12-oxododecanoyl) glycinate Compound 39

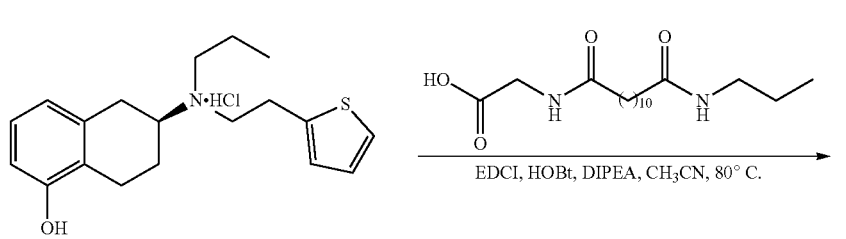

-continued

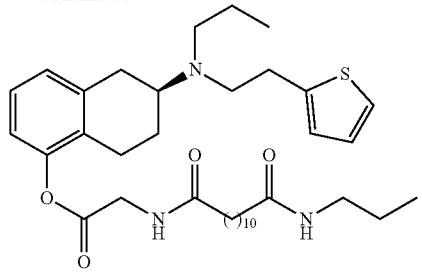

Referring to the method of Embodiment 25, (12-(propylamino)-12-oxododecanoyl) glycine (1.1 eq) was used to replace (18-amino-18-oxooctadecanoyl) glycine, so that a white solid powder, Compound 39 (0.20 g, yield: 65%) was prepared. MS(m/z): 626.40 [M+H]+.

Embodiment 40 (S)-6-(propyl(2-(thiophen-2-yl)ethyl)amino)-5,6,7,8-tetrahydronaphthalen-1-yl (15-(butylamino)-15-oxopentadecanoyl) glycinate Compound 40

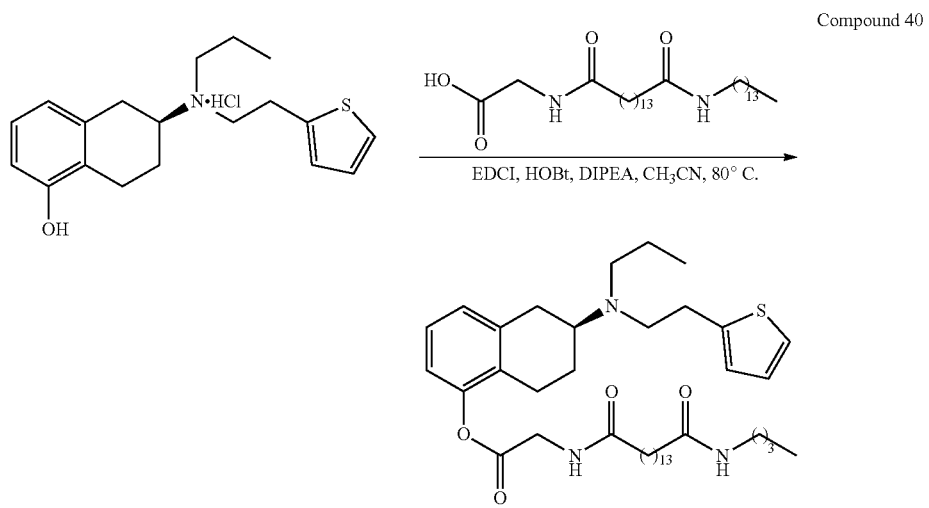

Referring to the method of Embodiment 25, (15-(butylamino)-15-oxopentadecanoyl) glycine (1.1 eq) was used to replace (18-amino-18-oxooctadecanoyl) glycine, so that a white solid powder, Compound 40 (0.26 g, yield: 67%) was prepared. MS(m/z): 682.6 [M+H]+.

Embodiment 41 (S)-6-(propyl(2-(thiophen-2-yl)ethyl)amino)-5,6,7,8-tetrahydronaphthalen-1-yl (14-(butylamino)-14-oxotetradecanoyl) glycinate Compound 41

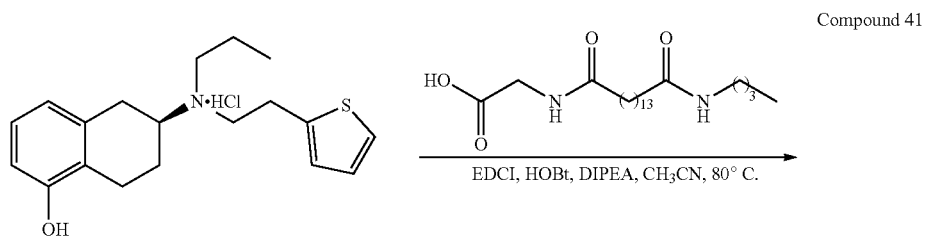

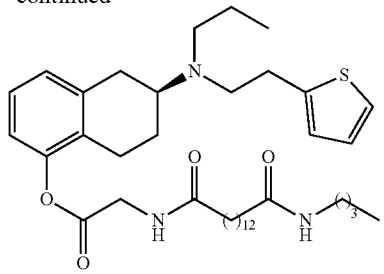

Referring to the method of Embodiment 25, (14-(butylamino)-14-oxotetradecanoyl) glycine (1.1 eq) was used to replace (18-amino-18-oxooctadecanoyl) glycine, so that a white solid powder, Compound 41 (0.45 g, yield: 70%) was prepared. $^1$H NMR (500 MHz, DMSO-d$_6$) δ 7.15-7.10 (m, 2H), 6.98 (d, J=7.5 Hz, 1H), 6.94-6.91 (m, 1H), 6.84 (d, J=8.0 Hz, 1H), 6.81 (d, J=2.5 Hz, 1H), 6.07 (br, 1H), 5.41 (s, 1H), 4.31 (d, J=5.5 Hz, 2H), 3.24 (q, J=6.5 Hz, 2H), 2.83-2.74 (m, 4H), 2.55-2.47 (m, 3H), 2.26 (t, J=7.5 Hz, 2H), 2.14 (t, J=8.0 Hz, 2H), 2.03 (m, 1H), 1.67-1.66 (m, 1H), 1.61-1.55 (m, 4H), 1.50-1.46 (m, 4H), 1.36-1.32 (m, 2H), 1.38-1.23 (m, 16H), 0.94-0.85 (m, 6H). MS(m/z): 668.52 [M+H]$^+$.

Embodiment 42 (S)-6-(propyl(2-(thiophen-2-yl)ethyl)amino)-5,6,7,8-tetrahydronaphthalen-1-yl (13-(butylamino)-13-oxotridecanoyl) glycinate Compound 42

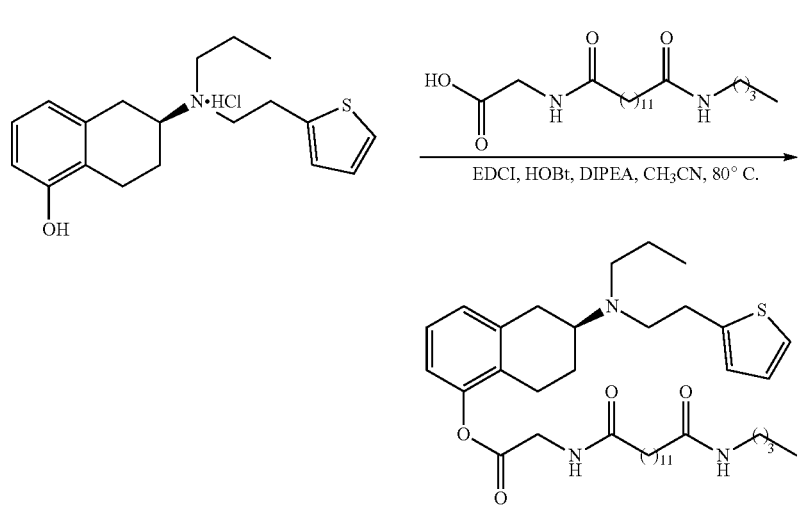

Referring to the method of Embodiment 25, (13-(butylamino)-13-oxotridecanoyl) glycine (1.1 eq) was used to replace (18-amino-18-oxooctadecanoyl) glycine, so that a white solid powder, Compound 42 (0.19 g, yield: 64%) was prepared. MS(m/z): 654.47 [M+H]$^+$.

Embodiment 43 (S)-6-(propyl(2-(thiophen-2-yl)ethyl)amino)-5,6,7,8-tetrahydronaphthalen-1-yl (12-(butylamino)-12-oxododecanoyl) glycinate Compound 43

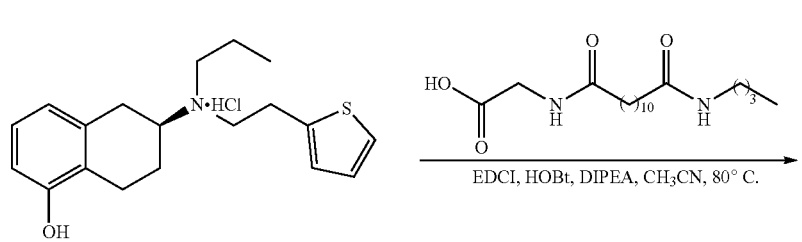

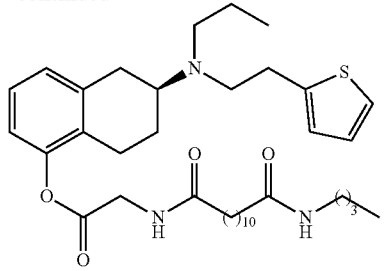

Referring to the method of Embodiment 25, (12-(butylamino)-12-oxododecanoyl) glycine (1.1 eq) was used to replace (18-amino-18-oxooctadecanoyl) glycine, so that a white solid powder, Compound 43 (1.50 g, yield: 82.5%) was prepared. $^1$H NMR (500 MHz, CDCl$_3$) δ 7.14-7.11 (m, 2H), 7.00 (d, J=7.5 Hz, 1H), 6.93-6.91 (m, 1H), 6.84 (d, J=8.0 Hz, 1H), 6.81 (d, J=2.5 Hz, 1H), 6.07 (br, 1H), 5.41 (s, 1H), 4.31 (d, J=5.5 Hz, 2H), 3.24 (q, J=6.5 Hz, 2H), 2.83-2.74 (m, 4H), 2.55-2.47 (m, 3H), 2.26 (t, J=7.5 Hz, 2H), 2.14 (t, J=8.0 Hz, 2H), 2.03 (br, 1H), 1.67-1.66 (m, 1H), 1.61-1.55 (m, 4H), 1.50-1.46 (m, 4H), 1.36-1.32 (m, 2H), 1.26 (m, 12H), 0.93-0.88 (m, 6H). MS(m/z): 640.72 [M+H]$^+$.

Embodiment 44 (S)-6-(propyl(2-(thiophen-2-yl) ethyl)amino)-5,6,7,8-tetrahydronaphthalen-1-yl (12-(hexylamino)-12-oxododecanoyl) glycinate Compound 44

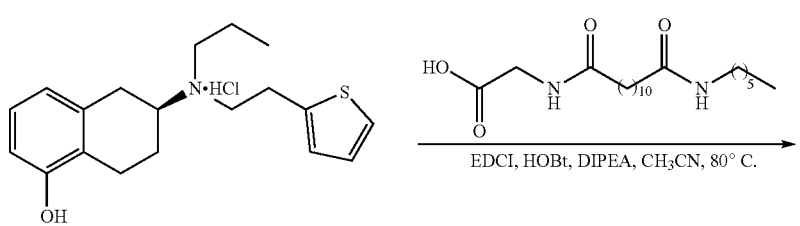

EDCI, HOBt, DIPEA, CH$_3$CN, 80° C.

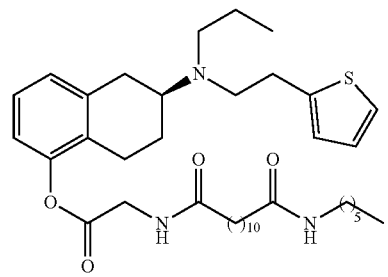

Referring to the method of Embodiment 25, (12-(hexylamino)-12-oxododecanoyl) glycine (1.1 eq) was used to replace (18-amino-18-oxooctadecanoyl) glycine, so that a white solid powder, Compound 44 (0.90 g, yield: 41%) was prepared. $^1$H NMR (500 MHz, CDCl$_3$) δ 7.17-7.11 (m, 2H), 7.02 (d, J=7.6 Hz, 1H), 6.97-6.92 (m, 1H), 6.86 (d, J=7.9 Hz, 1H), 6.83 (d, J=3.4 Hz, 1H), 6.15 (t, J=5.3 Hz, 1H), 5.48 (t, J=5.9 Hz, 1H), 4.33 (d, J=5.3 Hz, 2H), 3.25 (q, J=6.7 Hz, 2H), 3.03-2.74 (m, 8H), 2.62-2.47 (m, 3H), 2.28 (t, J=7.6 Hz, 2H), 2.16 (t, J=7.6 Hz, 2H), 2.09-2.03 (m, 1H), 1.70-1.56 (m, 5H), 1.51 (q, J=7.8 Hz, 4H), 1.37-1.24 (m, 18H), 0.93-0.88 (m, 6H). MS(m/z): 668.92 [M+H]$^+$.

Embodiment 45 (S)-6-(propyl(2-(thiophen-2-yl)ethyl)amino)-5,6,7,8-tetrahydronaphthalen-1-yl (10-(butylamino)-10-oxodecanoyl) glycinate

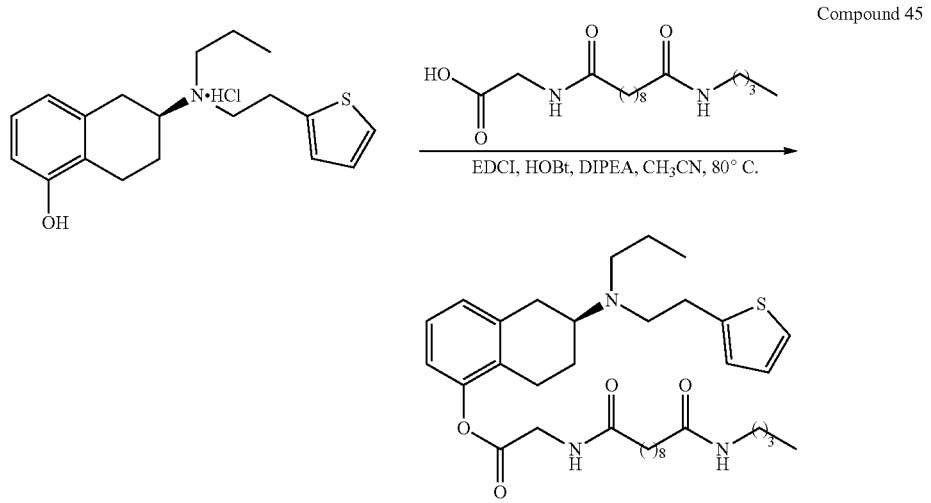

Compound 45

Referring to the method of Embodiment 25, (10-(butylamino)-10-oxodecanoyl) glycine (1.1 eq) was used to replace (18-amino-18-oxooctadecanoyl) glycine, so that a white solid powder, Compound 45 (0.18 g, yield: 52%) was prepared. MS(m/z): 612.40 [M+H]$^+$.

Embodiment 46 (S)-6-(propyl(2-(thiophen-2-yl)ethyl)amino)-5,6,7,8-tetrahydronaphthalen-1-yl (16-(methylamino)-16-oxohexadecanoyl) glycinate

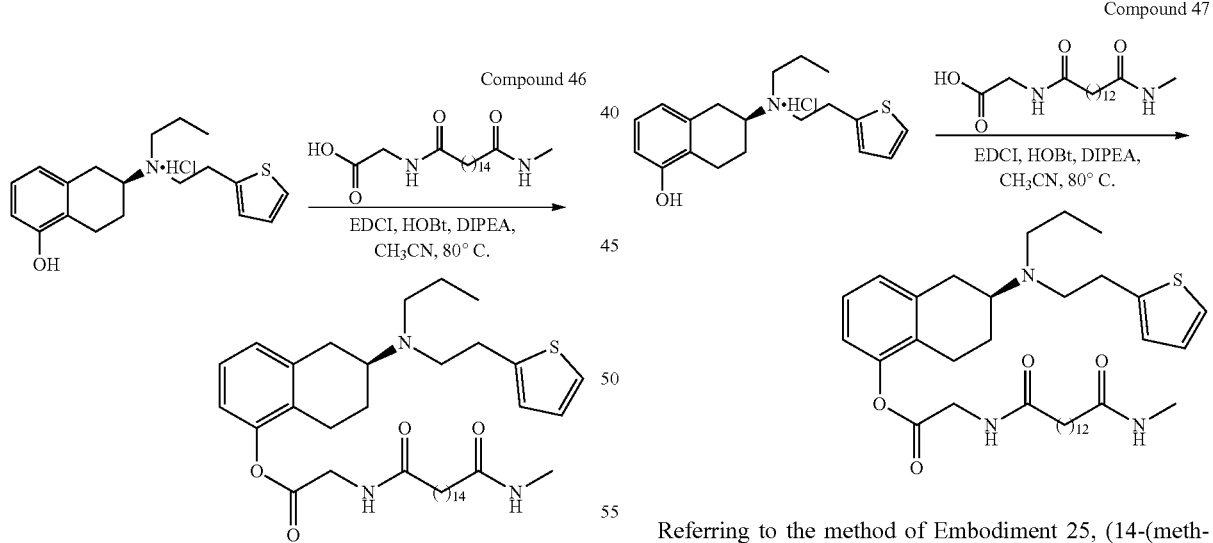

Compound 46

Compound 47

Referring to the method of Embodiment 25, (16-(methylamino)-16-oxohexadecanoyl) glycine (1.29 g, 3.49 mmol, 1.1 eq) was used to replace (18-amino-18-oxooctadecanoyl) glycine, so that a white solid powder, Compound 46 (0.7 g, yield: 75.4%) was prepared. $^1$H NMR (500 MHz, DMSO-d$_6$) δ8.40 (t, J=6.0 Hz, 1H), 7.66 (br, 1H), 7.28 (dd, J=5.0 Hz, 1.0 Hz, 1H), 7.12 (t, J=7.5 Hz, 1H), 7.00 (d, J=7.5 Hz, 1H), 6.93-6.91 (m, 1H), 6.87 (d, J=3.0 Hz, 1H), 6.82 (d, J=8.0 Hz, 1H), 4.07 (d, J=6.0 Hz, 2H), 2.91-2.82 (m, 4H), 2.76-2.67 (m, 4H), 2.57 (d, J=4.5 Hz, 3H), 2.48 (m, 2H), 2.43-2.36 (m, 1H), 2.14 (t, J=7.5 Hz, 2H), 2.01 (t, J=7.0 Hz, 2H), 1.92-1.90 (m, 1H), 1.51-1.36 (m, 7H), 1.22-1.19 (m, 20H), 0.84 (t, J=7.0 Hz, 3H). MS(m/z): 654.54 [M+H]$^+$.

Embodiment 47 (S)-6-(propyl(2-(thiophen-2-yl)ethyl)amino)-5,6,7,8-tetrahydronaphthalen-1-yl (14-(methylamino)-14-oxotetradecanoyl) glycinate Referring to the method of Embodiment 25, (14-(methylamino)-14-oxotetradecanoyl) glycine (1.1 eq) was used to replace (18-amino-18-oxooctadecanoyl) glycine, so that a white solid powder, Compound 47 (1.2 g, yield: 67.5%) was prepared. $^1$H NMR (500 MHz, DMSO-d$_6$) δ8.41 (t, J=5.5 Hz, 1H), 7.67 (br, 1H), 7.29 (d, J=4.5 Hz, 1H), 7.13 (t, J=8.0 Hz, 1H), 7.01 (d, J=7.5 Hz, 1H), 6.92 (dd, J=5.5 Hz, 3.5 Hz, 1H), 6.88 (d, J=2.5 Hz, 1H), 6.82 (d, J=8.0 Hz, 1H), 6.66 (br, 1H), 4.07 (d, J=5.5 Hz, 2H), 2.92-2.83 (m, 4H), 2.73-2.71 (m, 4H), 2.54 (d, J=4.5 Hz, 3H), 2.49 (m, 2H), 2.44-2.37 (m, 1H), 2.15 (t, J=7.5 Hz, 2H), 2.02 (t, J=7.0 Hz, 2H), 1.93-1.91 (m, 1H), 1.51-1.40 (m, 7H), 1.24-1.20 (m, 16H), 0.85 (t, J=7.5 Hz, 3H). MS(m/z): 626.41 [M+H]$^+$.

Embodiment 48 (S)-6-(propyl(2-(thiophen-2-yl)ethyl)amino)-5,6,7,8-tetrahydronaphthalen-1-yl (12-(methylamino)-12-oxododecanoyl) glycinate

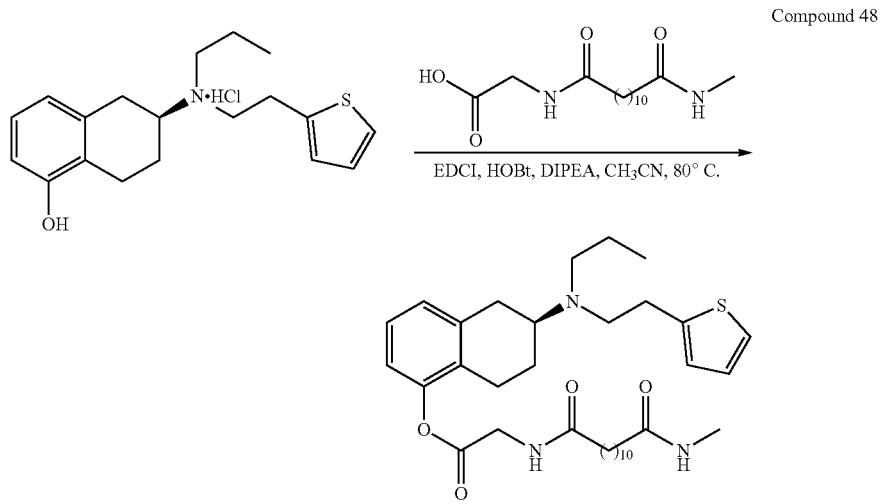

Compound 48

Referring to the method of Embodiment 25, (12-(methylamino)-12-oxododecanoyl) glycine (1.1 eq) was used to replace (18-amino-18-oxooctadecanoyl) glycine, so that a white solid powder, Compound 48 (1.0 g, yield: 58.9%) was prepared. $^1$H NMR (500 MHz, DMSO-$d_6$) δ 8.40 (t, J=6.0 Hz, 1H), 7.66 (s, 1H), 7.29 (d, J=5.5 Hz, 1H), 7.12 (t, J=7.5 Hz, 1H), 7.01 (d, J=7.5 Hz, 1H), 6.92 (dd, J=5.5 Hz, 3.5 Hz, 1H), 6.87 (d, J=3.0 Hz, 1H), 6.82 (d, J=7.5 Hz, 1H), 4.07 (d, J=6.0 Hz, 2H), 2.92-2.82 (m, 4H), 2.76-2.71 (m, 4H), 2.53 (d, J=4.5 Hz, 3H), 2.49 (m, 2H), 2.43-2.37 (m, 1H), 2.14 (t, J=7.5 Hz, 2H), 2.01 (t, J=7.5 Hz, 2H), 1.90 (m, 1H), 1.50-1.38 (m, 7H), 1.23 (s, 4H), 1.19 (s, 8H), 0.84 (t, J=7.5 Hz, 3H). MS(m/z): 598.43 [M+H]$^+$.

Embodiment 49 (S)-6-(propyl(2-(thiophen-2-yl)ethyl)amino)-5,6,7,8-tetrahydronaphthalen-1-yl (4-(hexadecylamino)-4-oxobutanoyl) glycinate

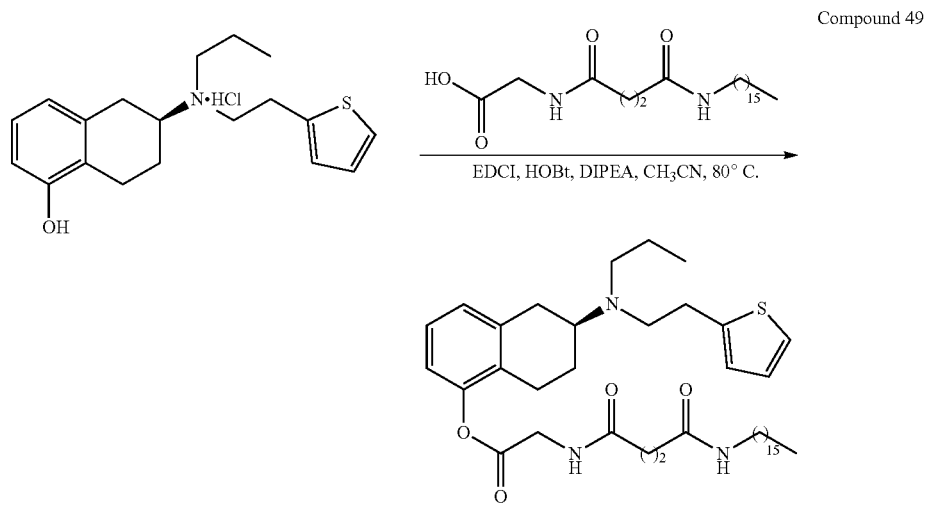

Compound 49

Referring to the method of Embodiment 25, (4-(hexadecylamino)-4-oxobutanoyl) glycine (1.1 eq) was used to replace (18-amino-18-oxooctadecanoyl) glycine, so that a white solid powder, Compound 49 (0.27 g, yield: 45.5%) was prepared. $^1$H NMR (500 MHz, DMSO-$d_6$) δ 8.46 (br, 1H), 7.78 (s, 1H), 7.29 (d, J=4.5 Hz, 1H), 7.13 (t, J=8.0 Hz, 1H), 7.01 (d, J=7.5 Hz, 1H), 6.93 (s, 1H), 6.88 (s, 1H), 6.83 (d, J=8.0 Hz, 1H), 4.08 (d, J=5.0 Hz, 2H), 3.00-2.99 (m, 2H), 2.91-2.82 (m, 4H), 2.77-2.64 (m, 4H), 2.50 (s, 2H), 2.40-2.39 (m, 3H), 2.31 (t, J=7.0 Hz, 2H), 1.91 (m, 1H), 1.51-1.48 (m, 1H), 1.41 (dd, J=14.0 Hz, 7.0 Hz, 2H), 1.35 (m, 2H), 1.23 (s, 26H), 0.86-0.85 (m, 6H). MS(m/z): 696.58 [M+H]$^+$.

Embodiment 50 (S)-6-(propyl(2-(thiophen-2-yl)ethyl)amino)-5,6,7,8-tetrahydronaphthalen-1-yl 3-(20-(ethylamino)-20-oxoicosanamido) propanoate

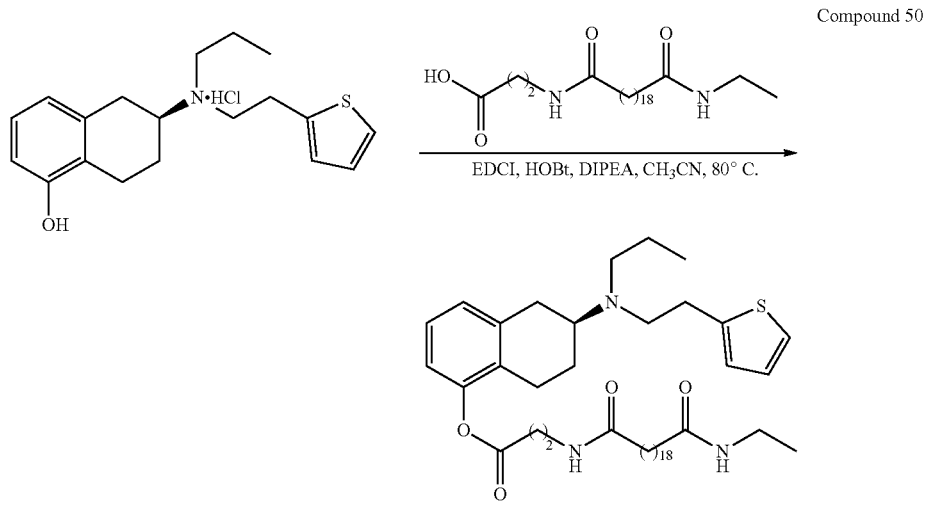
Compound 50

Referring to the method of Embodiment 25, 3-(20-(ethylamino)-20-oxoicosanamido) propanoic acid (1.1 eq) was used to replace (18-amino-18-oxooctadecanoyl) glycine, so that a white solid powder, Compound 50 (0.23 g, yield: 41%) was prepared. MS(m/z): 738.56 [M+H]$^+$.

Embodiment 51 (S)-6-(propyl(2-(thiophen-2-yl)ethyl)amino)-5,6,7,8-tetrahydronaphthalen-1-yl 3-(19-(ethylamino)-19-oxononadecanamido) propanoate

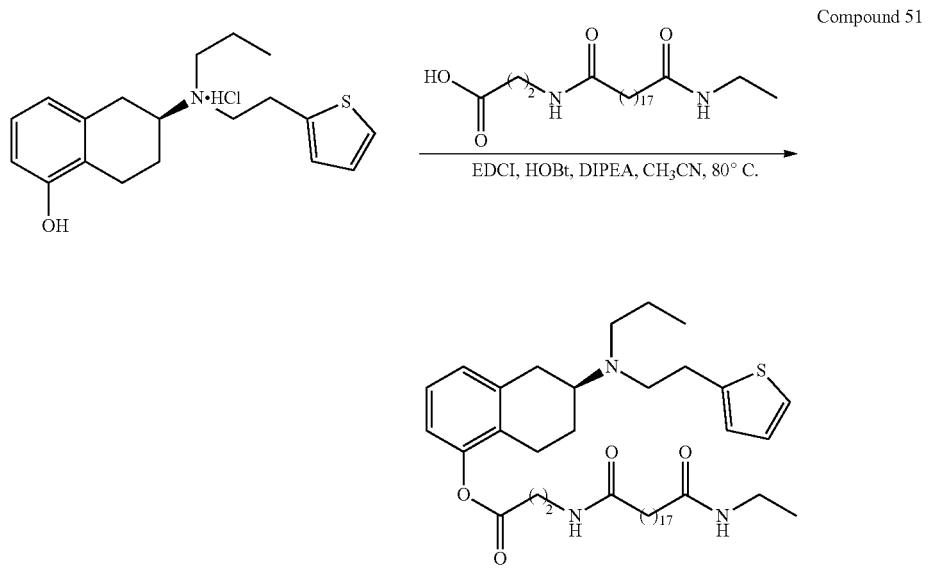
Compound 51

Referring to the method of Embodiment 25, 3-(19-(ethylamino)-19-oxononadecanamido) propanoic acid (1.1 eq) was used to replace (18-amino-18-oxooctadecanoyl) glycine, so that a white solid powder, Compound 51 (0.31 g, yield: 44%) was prepared. MS(m/z): 724.35 [M+H]$^+$.

Embodiment 52 (S)-6-(propyl(2-(thiophen-2-yl)ethyl)amino)-5,6,7,8-tetrahydronaphthalen-1-yl 3-(18-(ethylamino)-18-oxooctadecanamido) propanoate

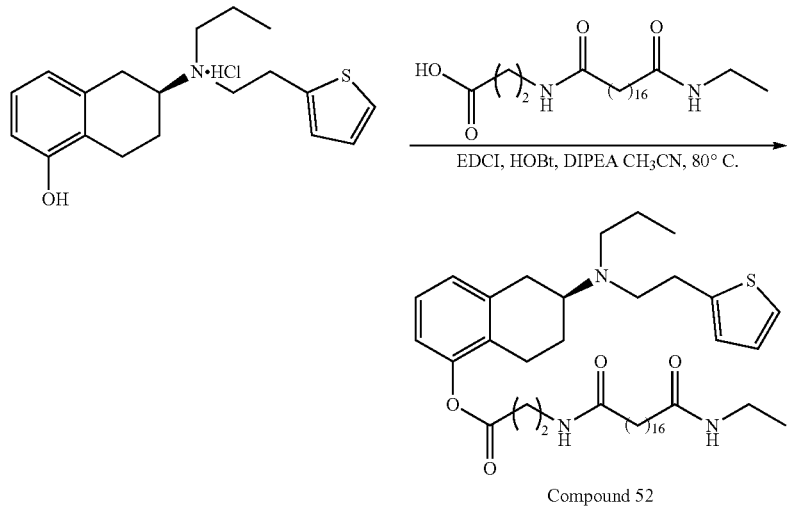

Compound 52

Referring to the method of Embodiment 25, 3-(18-(ethylamino)-18-oxooctadecanamido) propanoic acid (1.29 g, 3.49 mmol, 1.1 eq) was used to replace (18-amino-18-oxooctadecanoyl) glycine, so that a white solid powder, Compound 52 (0.25 g, yield: 60%) was prepared. MS(m/z): 710.39 [M+H]$^+$.

Embodiment 53 (S)-6-(propyl(2-(thiophen-2-yl)ethyl)amino)-5,6,7,8-tetrahydronaphthalen-1-yl 3-(17-(ethylamino)-17-oxoheptadecanamido) propanoate

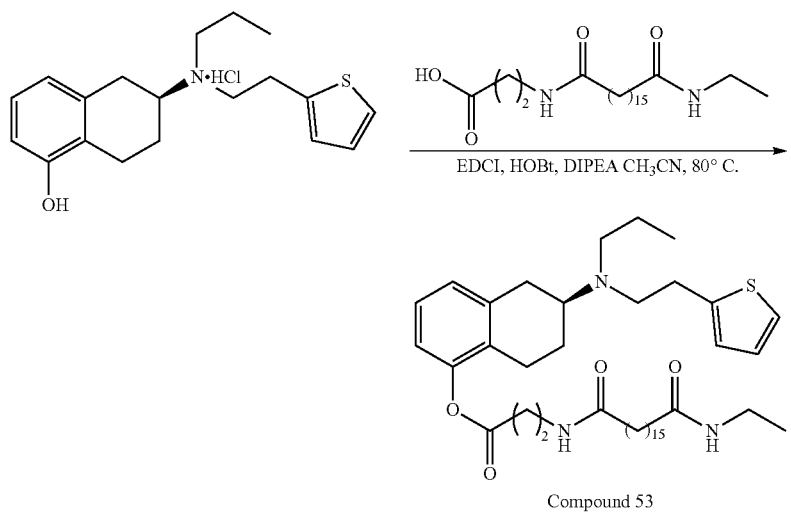

Compound 53

Referring to the method of Embodiment 25, 3-(17-(ethylamino)-17-oxoheptadecanamido) propanoic acid (1.1 eq) was used to replace (18-amino-18-oxooctadecanoyl) glycine, so that a white solid powder, Compound 53 (0.28 g, yield: 65%) was prepared. MS(m/z): 696.42 [M+H]$^+$.

Embodiment 54 (S)-6-(propyl(2-(thiophen-2-yl)ethyl)amino)-5,6,7,8-tetrahydronaphthalen-1-yl 3-(16-(ethylamino)-16-oxohexadecanamido) propanoate

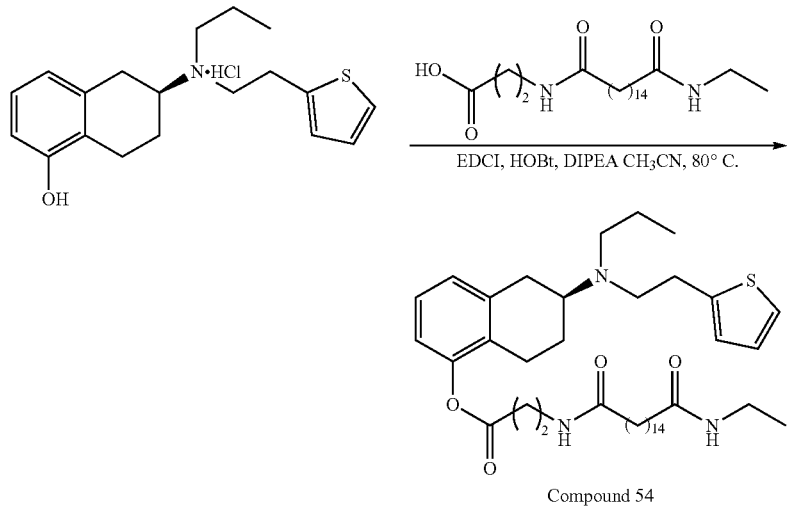

Compound 54

Referring to the method of Embodiment 25, 3-(16-(ethylamino)-16-oxohexadecanamido) propanoic acid (1.1 eq) was used to replace (18-amino-18-oxooctadecanoyl) glycine, so that Compound 54 (2.5 g, yield: 87.5%) was prepared. $^1$H NMR (500 MHz, CDCl$_3$) δ 7.14-7.11 (m, 2H), 7.00 (d, J=7.5 Hz, 1H), 6.93-6.91 (m, 1H), 6.83-6.81 (m, 2H), 6.06 (br, 1H), 5.39 (br, 1H), 3.62 (q, J=6.0 Hz, 2H), 3.31-3.26 (m, 2H), 2.93-2.89 (m, 4H), 2.83-2.74 (m, 6H), 2.55-2.45 (m, 3H), 2.17-2.12 (m, 4H), 2.03-2.00 (m, 1H), 1.63-1.56 (m, 5H), 1.51-1.47 (m, 2H), 1.28-1.24 (m, 20H), 1.13 (t, J=7.5 Hz, 3H), J=7.0 Hz, 3H). MS(m/z): 682.98 [M+H]$^+$.

Embodiment 55 (S)-6-(propyl(2-(thiophen-2-yl)ethyl)amino)-5,6,7,8-tetrahydronaphthalen-1-yl 3-(15-(ethylamino)-15-oxopentadecanamido) propanoate

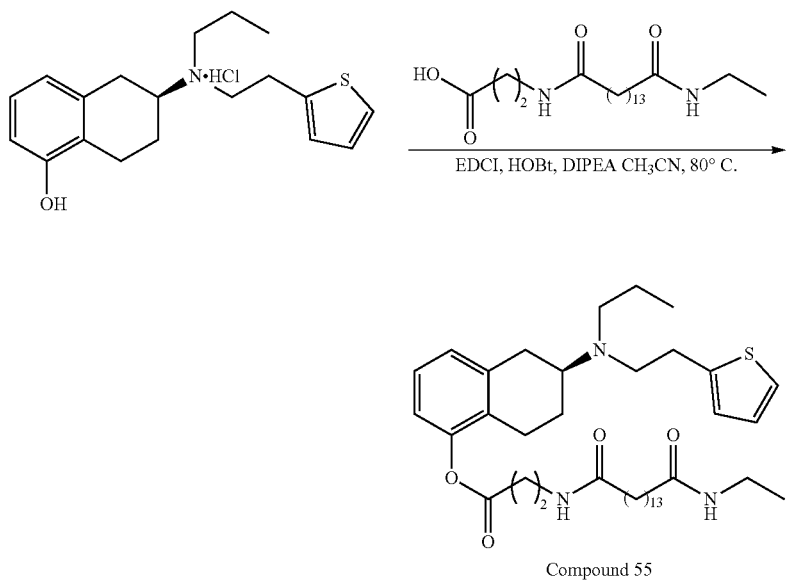

Compound 55

Referring to the method of Embodiment 25, 3-(15-(ethylamino)-15-oxopentadecanamido) propanoic acid (1.1 eq) was used to replace (18-amino-18-oxooctadecanoyl) glycine, so that a white solid powder, Compound 55 (0.28 g, yield: 63%) was prepared. MS(m/z): 668.60 [M+H]$^+$.

Embodiment 56 (S)-6-(propyl(2-(thiophen-2-yl)ethyl)amino)-5,6,7,8-tetrahydronaphthalen-1-yl 3-(14-(ethylamino)-14-oxotetradecanamido) propanoate

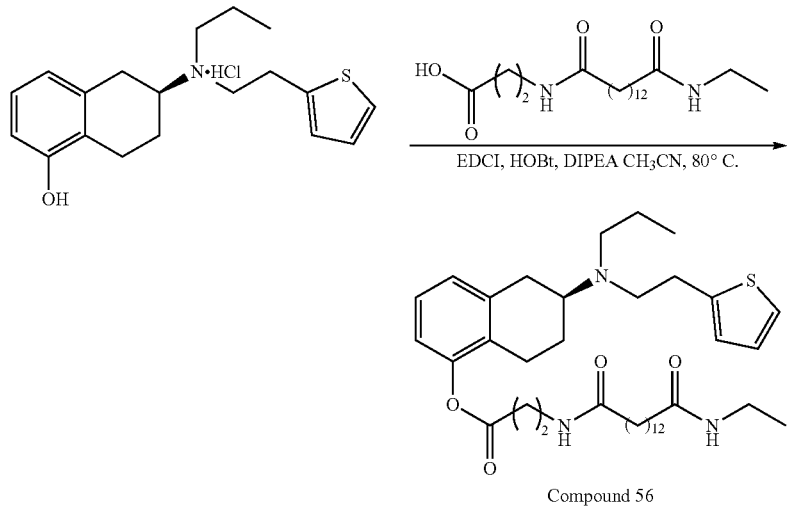

Compound 56

Referring to the method of Embodiment 25, 3-(14-(ethylamino)-14-oxotetradecanamido) propanoic acid (1.1 eq) was used to replace (18-amino-18-oxooctadecanoyl) glycine, so that a white solid powder, Compound 56 (1.0 g, yield: 74%) was prepared. $^1$H NMR (500 MHz, DMSO-$d_6$) δ 7.14-7.10 (m, 2H), 7.00 (d, J=7.5 Hz, 1H), 6.93-6.90 (m, 1H), 6.83-6.81 (m, 2H), 6.06 (br, 1H), 5.39 (br, 1H), 3.62 (q, J=6.0 Hz, 2H), 3.31-3.26 (m, 2H), 2.90-2.89 (m, 4H), 2.83-2.74 (m, 6H), 2.55-2.45 (m, 3H), 2.17-2.10 (m, 4H), 2.03-2.00 (m, 1H), 1.62-1.56 (m, 5H), 1.50-1.46 (m, 2H), 1.28-1.24 (m, 16H), 1.13 (t, J=7.5 Hz, 3H), 0.89 (t, J=7.0 Hz, 3H). MS(m/z): 654.43 [M+H]$^+$.

Embodiment 57 (S)-6-(propyl(2-(thiophen-2-yl)ethyl)amino)-5,6,7,8-tetrahydronaphthalen-1-yl 3-(13-(ethylamino)-13-oxotridecanamido) propanoate

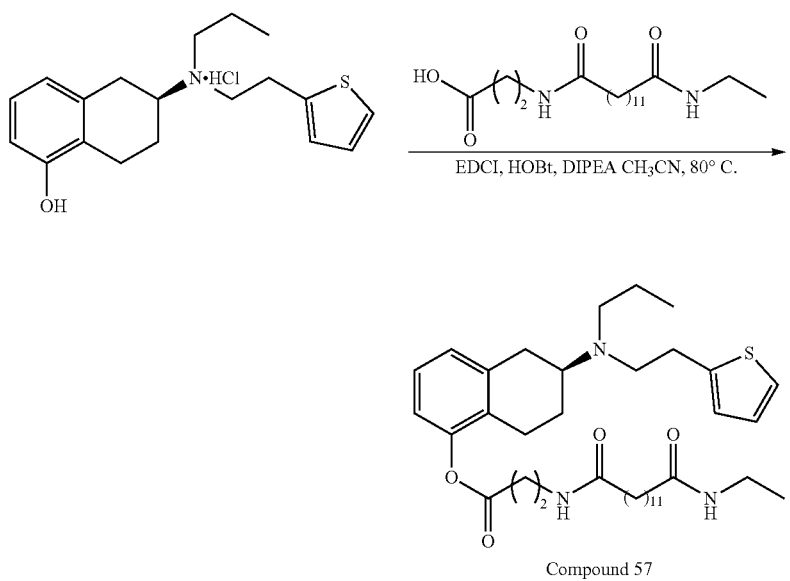

Compound 57

Referring to the method of Embodiment 25, 3-(13-(ethylamino)-13-oxotridecanamido) propanoic acid (1.1 eq) was used to replace (18-amino-18-oxooctadecanoyl) glycine, so that a white solid powder, Compound 57 (0.18 g, yield: 63%) was prepared. MS(m/z): 640.38 [M+H]$^+$.

Embodiment 58 (S)-6-(propyl(2-(thiophen-2-yl)ethyl)amino)-5,6,7,8-tetrahydronaphthalen-1-yl 3-(12-(ethylamino)-12-oxododecanamido) propanoate

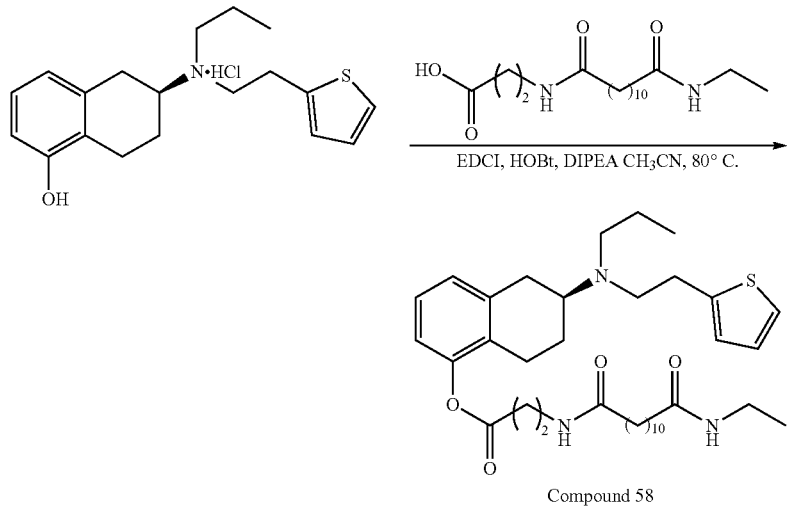

Compound 58

Referring to the method of Embodiment 25, 3-(12-(ethylamino)-12-oxododecanamido) propanoic acid (1.1 eq) was used to replace (18-amino-18-oxooctadecanoyl) glycine, so that a white solid powder, Compound 58 (0.8 g, yield: 70%) was prepared. $^1$H NMR (500 MHz, DMSO-$d_6$) δ 7.16-7.09 (m, 2H), 7.01 (d, J=7.5 Hz, 1H), 6.93-6.90 (m, 1H), 6.84-6.81 (m, 2H), 6.06 (br, 1H), 5.39 (br, 1H), 3.62 (q, J=6.0 Hz, 2H), 3.31-3.26 (m, 2H), 2.91-2.89 (m, 4H), 2.83-2.74 (m, 6H), 2.55-2.45 (m, 3H), 2.18-2.09 (m, 4H), 2.03-2.01 (m, 1H), 1.62-1.56 (m, 5H), 1.51-1.45 (m, 2H), 1.28-1.23 (m, 12H), 1.13 (t, J=7.5 Hz, 3H), 0.89 (t, J=7.0 Hz, 3H). MS(m/z): 626.40 [M+H]$^+$.

Embodiment 59 (S)-6-(propyl(2-(thiophen-2-yl)ethyl)amino)-5,6,7,8-tetrahydronaphthalen-1-yl 3-(16-(propylamino)-16-oxohexadecanamido) propanoate

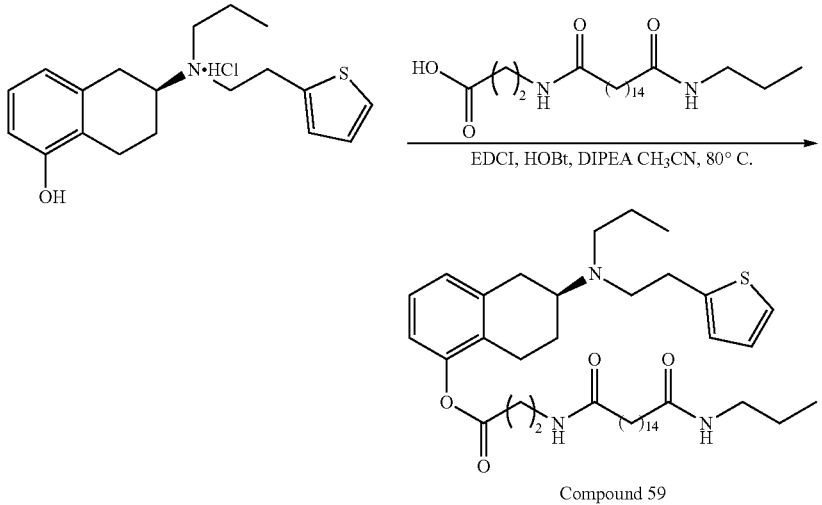

Compound 59

Referring to the method of Embodiment 25, 3-(16-(propylamino)-16-oxohexadecanamido) propanoic acid (1.1 eq) was used to replace (18-amino-18-oxooctadecanoyl) glycine, so that a white solid powder, Compound 59 (0.8 g, yield: 74%) was prepared. $^1$H NMR (500 MHz, DMSO-$d_6$) δ 7.14-7.10 (m, 2H), 7.01 (d, J=7.5 Hz, 1H), 6.93-6.90 (m, 1H), 6.84-6.81 (m, 2H), 6.06 (br, 1H), 5.39 (br, 1H), 3.62 (q, J=6.0 Hz, 2H), 3.31-3.26 (m, 2H), 2.91-2.89 (m, 4H), 2.83-2.74 (m, 6H), 2.55-2.45 (m, 3H), 2.18-2.09 (m, 4H), 2.02 (m, 1H), 1.68-1.47 (m, 9H), 1.30-1.24 (m, 20H), 0.93-0.85 (m, 6H). MS(m/z): 696.48 [M+H]$^+$.

Embodiment 60 (S)-6-(propyl(2-(thiophen-2-yl)ethyl)amino)-5,6,7,8-tetrahydronaphthalen-1-yl 3-(15-(propylamino)-15-oxopentadecanamido)propanoate

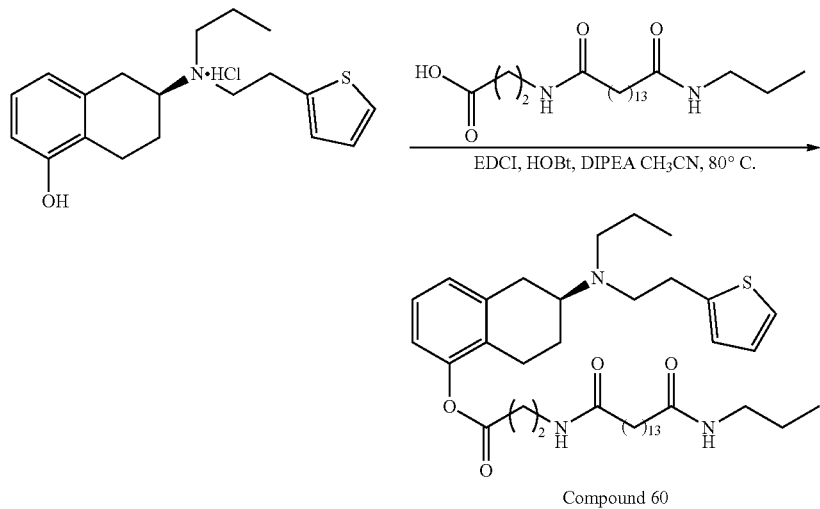

Compound 60

Referring to the method of Embodiment 25, 3-(15-(propylamino)-15-oxopentadecanamido) propanoic acid (1.1 eq) was used to replace (18-amino-18-oxooctadecanoyl) glycine, so that an off-white solid powder, Compound 60 (0.13 g, yield: 51%) was prepared. MS(m/z): 682.38 [M+H]+.

Embodiment 61 (S)-6-(propyl(2-(thiophen-2-yl)ethyl)amino)-5,6,7,8-tetrahydronaphthalen-1-yl 3-(14-(propylamino)-14-oxotetradecanamido)propanoate

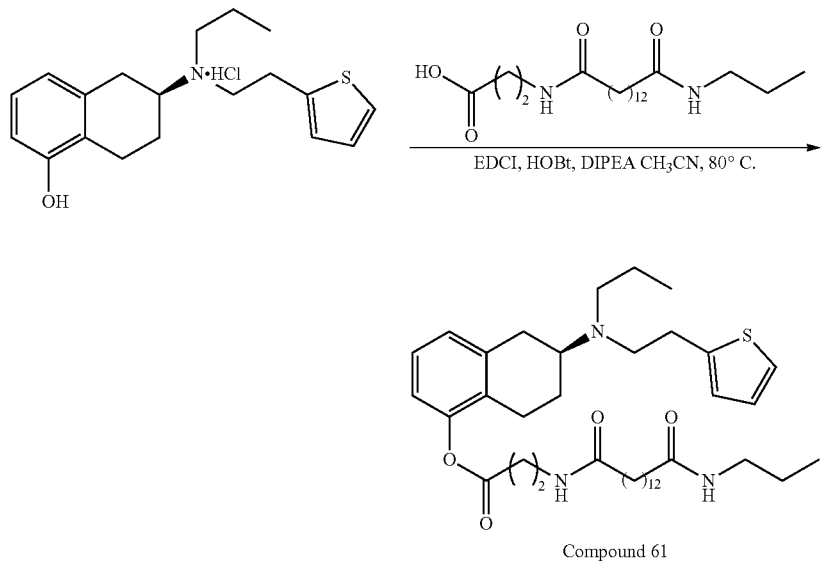

Compound 61

Referring to the method of Embodiment 25, 3-(14-(propylamino)-14-oxotetradecanamido) propanoic acid (1.1 eq) was used to replace (18-amino-18-oxooctadecanoyl) glycine, so that an off-white solid powder, Compound 61 (0.39 g, yield: 67%) was prepared. MS(m/z): 668.33 [M+H]+.

Embodiment 62 (S)-6-(propyl(2-(thiophen-2-yl)ethyl)amino)-5,6,7,8-tetrahydronaphthalen-1-yl 3-(13-(propylamino)-13-oxotridecanamido) propanoate

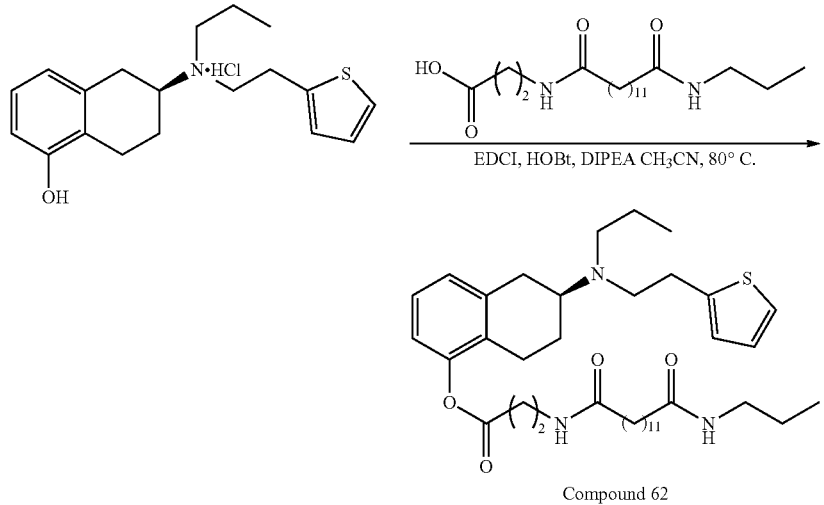

Compound 62

Referring to the method of Embodiment 25, 3-(13-(propylamino)-13-oxotridecanamido) propanoic acid (1.1 eq) was used to replace (18-amino-18-oxooctadecanoyl) glycine, so that an off-white solid powder, Compound 62 (0.31 g, yield: 63%) was prepared. MS(m/z): 654.45 [M+H]$^+$.

Embodiment 63 (S)-6-(propyl(2-(thiophen-2-yl)ethyl)amino)-5,6,7,8-tetrahydronaphthalen-1-yl 3-(12-(propylamino)-12-oxododecanamido) propanoate

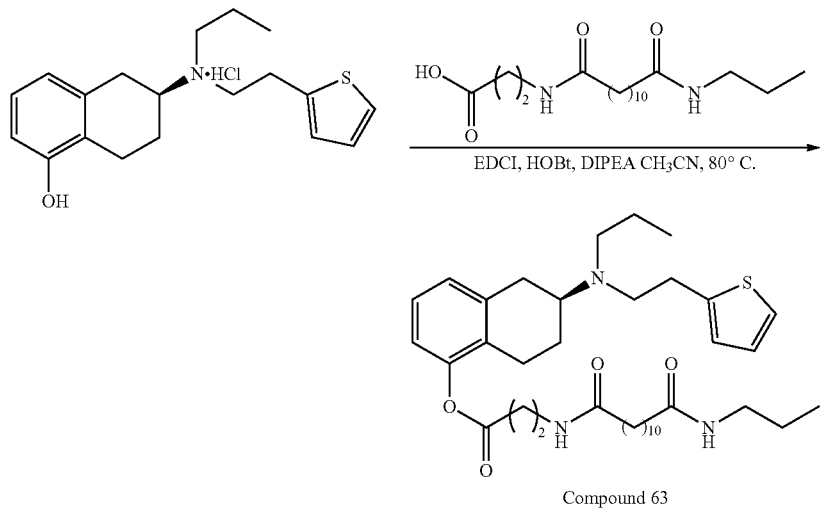

Compound 63

Referring to the method of Embodiment 25, 3-(12-(propylamino)-12-oxododecanamido) propanoic acid (1.1 eq) was used to replace (18-amino-18-oxooctadecanoyl) glycine, so that an off-white solid powder, Compound 63 (0.87 g, yield: 72%) was prepared. $^1$H NMR (500 MHz, DMSO-d$_6$) δ 7.13-7.09 (m, 2H), 7.01 (d, J=7.5 Hz, 1H), 6.93-6.91 (m, 1H), 6.83-6.80 (m, 2H), 6.06 (br, 1H), 5.39 (br, 1H), 3.62 (q, J=6.0 Hz, 2H), 3.33-3.25 (m, 2H), 2.91-2.89 (m, 4H), 2.84-2.75 (m, 6H), 2.54-2.43 (m, 3H), 2.17-2.08 (m, 4H), 2.02 (m, 1H), 1.70-1.48 (m, 9H), 1.30-1.24 (m, 12H), 0.93-0.85 (m, 6H). MS(m/z): 640.47 [M+H]$^+$.

Embodiment 64 (S)-6-(propyl(2-(thiophen-2-yl)
ethyl)amino)-5,6,7,8-tetrahydronaphthalen-1-yl
3-(17-(propylamino)-17-oxoheptadecanamido) pro-
panoate

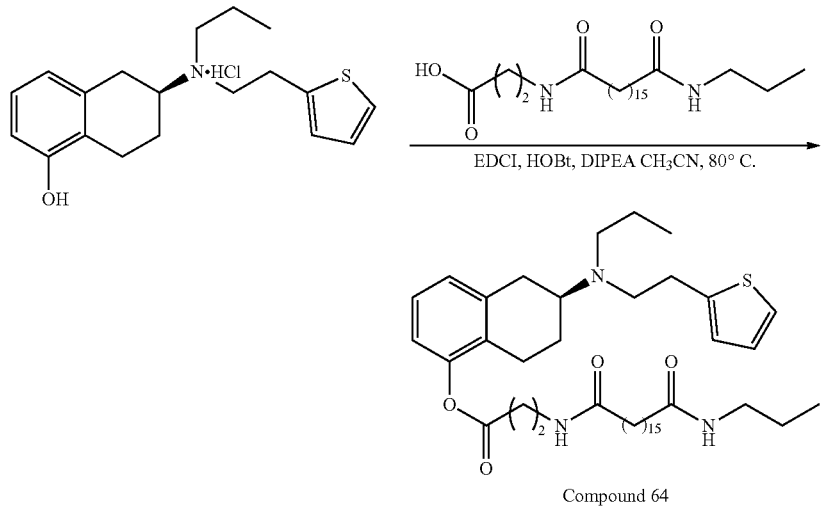

Compound 64

Referring to the method of Embodiment 25, 3-(17-(propylamino)-17-oxoheptadecanamido) propanoic acid (1.1 eq) was used to replace (18-amino-18-oxooctadecanoyl) glycine, so that an off-white solid powder, Compound 64 (0.13 g, yield: 43%) was prepared. MS(m/z): 710.52 [M+H]$^+$.

Embodiment 65 (S)-6-(propyl(2-(thiophen-2-yl)
ethyl)amino)-5,6,7,8-tetrahydronaphthalen-1-yl
3-(18-(propylamino)-18-oxooctadecanamido) pro-
panoate

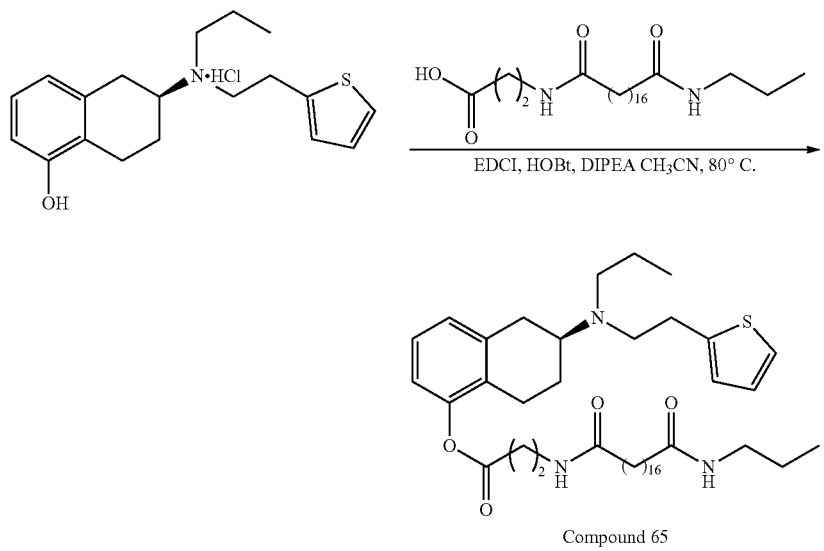

Compound 65

Referring to the method of Embodiment 25, 3-(18-(propylamino)-18-oxooctadecanamido) propanoic acid (1.1 eq) was used to replace (18-amino-18-oxooctadecanoyl) glycine, so that an off-white solid powder, Compound 65 (0.31 g, yield: 67%) was prepared. MS(m/z): 724.43 [M+H]$^+$.

Embodiment 66 (S)-6-(propyl(2-(thiophen-2-yl)ethyl)amino)-5,6,7,8-tetrahydronaphthalen-1-yl 3-(16-(butylamino)-16-oxohexadecanamido) propanoate

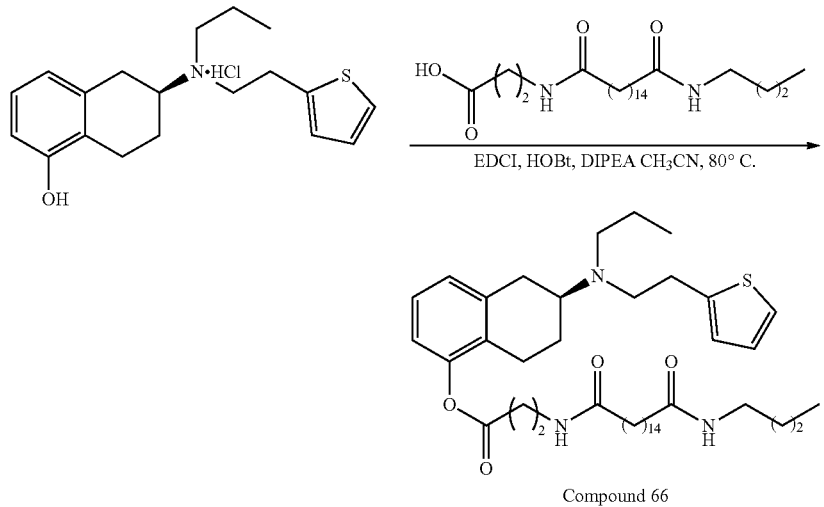

Compound 66

Referring to the method of Embodiment 25, 3-(16-(butylamino)-16-oxohexadecanamido) propanoic acid (1.1 eq) was used to replace (18-amino-18-oxooctadecanoyl) glycine, so that an off-white solid powder, Compound 66 (0.67 g, yield: 76%) was prepared. $^1$H NMR (500 MHz, DMSO-$d_6$) δ 7.16-7.10 (m, 2H), 6.99 (d, J=7.5 Hz, 1H), 6.93-6.91 (m, 1H), 6.84-6.80 (m, 2H), 6.10 (t, J=6.0 Hz, 1H), 5.42 (br, 1H), 3.61 (q, J=6.0 Hz, 2H), 3.23 (q, J=6.5 Hz, 2H), 3.01-2.88 (m, 4H), 2.83-2.72 (m, 6H), 2.56-2.46 (m, 3H), 2.18-2.11 (m, 4H), 2.03 (m, 1H), 1.67 (m, 1H), 1.61 (m, 1.51-1.43 (m, 4H), 1.37-1.31 (m, 2H), 1.27-1.24 (m, 20H), 0.95-0.86 (m, 6H). MS(m/z): 710.42 [M+H]$^+$.

Embodiment 67 (S)-6-(propyl(2-(thiophen-2-yl)ethyl)amino)-5,6,7,8-tetrahydronaphthalen-1-yl 3-(15-(butylamino)-15-oxopentadecanamido) propanoate

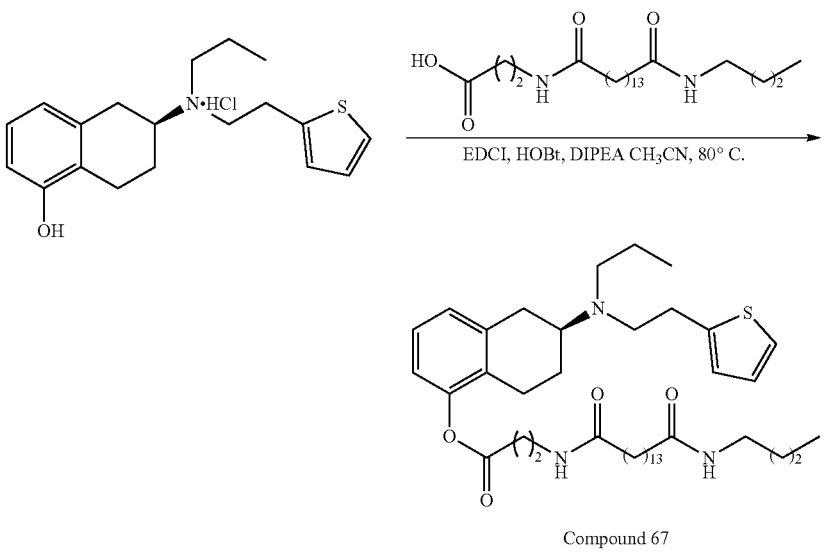

Compound 67

Referring to the method of Embodiment 25, 3-(15-(butylamino)-15-oxopentadecanamido) propanoic acid (1.1 eq) was used to replace (18-amino-18-oxooctadecanoyl) glycine, so that a white solid powder, Compound 67 (0.23 g, yield: 57%) was prepared. MS(m/z): 696.40 [M+H]$^+$.

Embodiment 68 (S)-6-(propyl(2-(thiophen-2-yl)ethyl)amino)-5,6,7,8-tetrahydronaphthalen-1-yl 3-(14-(butylamino)-14-oxotetradecanamido) propanoate

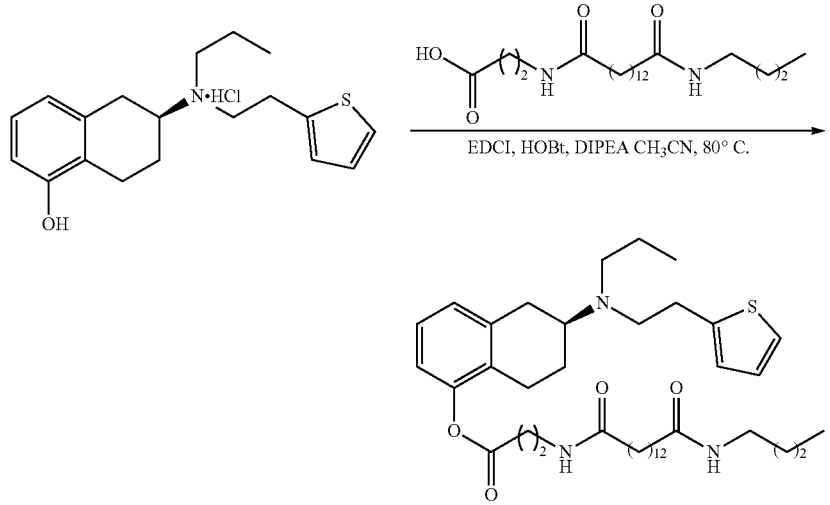

Compound 68

Referring to the method of Embodiment 25, 3-(14-(butylamino)-14-oxotetradecanamido) propanoic acid (1.1 eq) was used to replace (18-amino-18-oxooctadecanoyl) glycine, so that an off-white solid powder, Compound 68 (0.8 g, yield: 69%) was prepared. MS(m/z): 682.47 [M+H]$^+$.

Embodiment 69 (S)-6-(propyl(2-(thiophen-2-yl)ethyl)amino)-5,6,7,8-tetrahydronaphthalen-1-yl 3-(13-(butylamino)-13-oxotridecanamido) propanoate

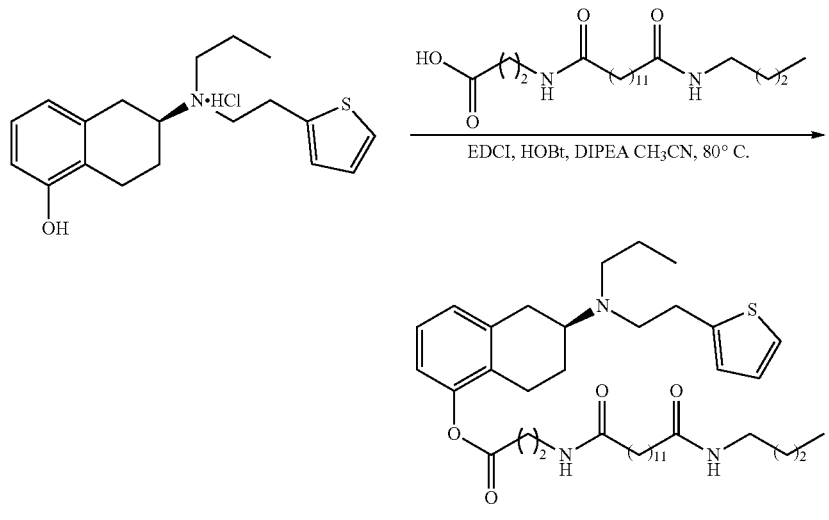

Compound 69

Referring to the method of Embodiment 25, 3-(13-(butylamino)-13-oxotridecanamido) propanoic acid (1.1 eq) was used to replace (18-amino-18-oxooctadecanoyl) glycine, so that an off-white solid powder, Compound 69 (0.37 g, yield: 71%) was prepared. MS(m/z): 668.43 [M+H]$^+$.

Embodiment 70 (S)-6-(propyl(2-(thiophen-2-yl)ethyl)amino)-5,6,7,8-tetrahydronaphthalen-1-yl 3-(12-(butylamino)-12-oxododecanamido) propanoate

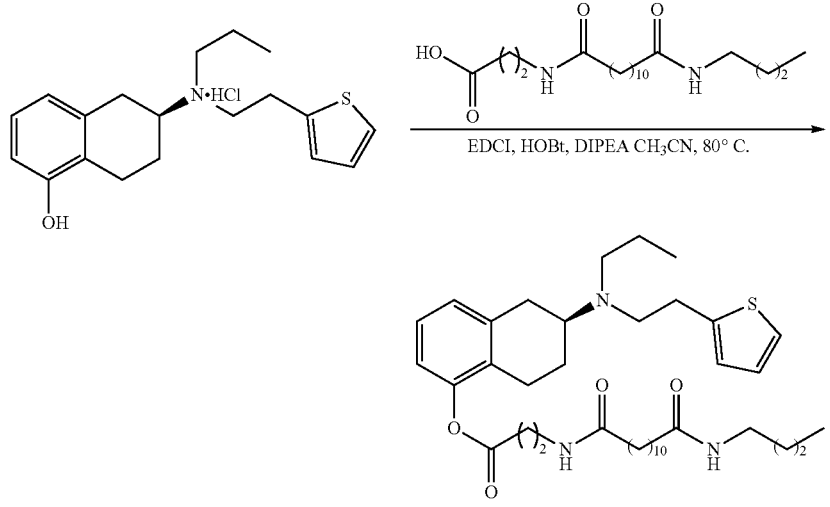

Compound 70

Referring to the method of Embodiment 25, 3-(12-(butylamino)-12-oxododecanamido) propanoic acid (1.1 eq) was used to replace (18-amino-18-oxooctadecanoyl) glycine, so that Compound 70 (1.53 g, yield: 82.4%) was prepared. $^1$H NMR (500 MHz, CDCl$_3$) δ 7.14-7.11 (m, 2H), 6.99 (d, J=7.5 Hz, 1H), 6.93-6.91 (m, 1H), 6.83-6.81 (m, 2H), 6.10 (t, J=6.0 Hz, 1H), 5.42 (s, 1H), 3.61 (q, J=6.0 Hz, 2H), 3.23 (q, J=6.5 Hz, 2H), 2.96-2.89 (m, 4H), 2.83-2.74 (m, 6H), 2.56-2.46 (m, 3H), 2.17-2.12 (m, 4H), 2.03 (br, 1H), 1.67-1.66 (m, 1H), 1.61 (br, 5H), 1.50-1.44 (m, 4H), 1.36-1.31 (m, 2H), 1.27-1.26 (m, 12H), 0.93-0.88 (m, 6H). MS(m/z): 654.69 [M+H]$^+$.

Embodiment 71 (S)-6-(propyl(2-(thiophen-2-yl)ethyl)amino)-5,6,7,8-tetrahydronaphthalen-1-yl 3-(13-(pentylamino)-13-oxotridecanamido) propanoate

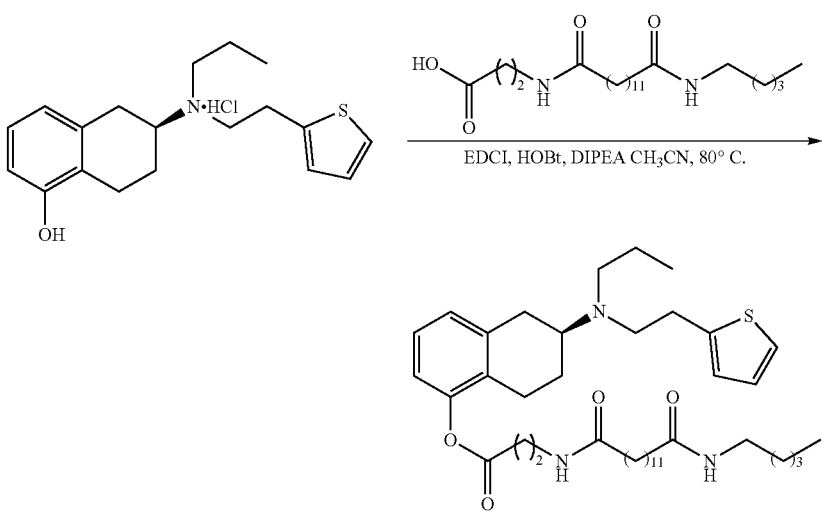

Compound 71

Referring to the method of Embodiment 25, 3-(13-(butylamino)-13-oxotridecanamido) propanoic acid (1.1 eq) was used to replace (18-amino-18-oxooctadecanoyl) glycine, so that an off-white solid powder, Compound 71 (0.16 g, yield: 55%) was prepared. MS(m/z): 682.50 [M+H]$^+$.

Embodiment 72 (S)-6-(propyl(2-(thiophen-2-yl)ethyl)amino)-5,6,7,8-tetrahydronaphthalen-1-yl 3-(12-(hexylamino)-12-oxododecanamido) propanoate

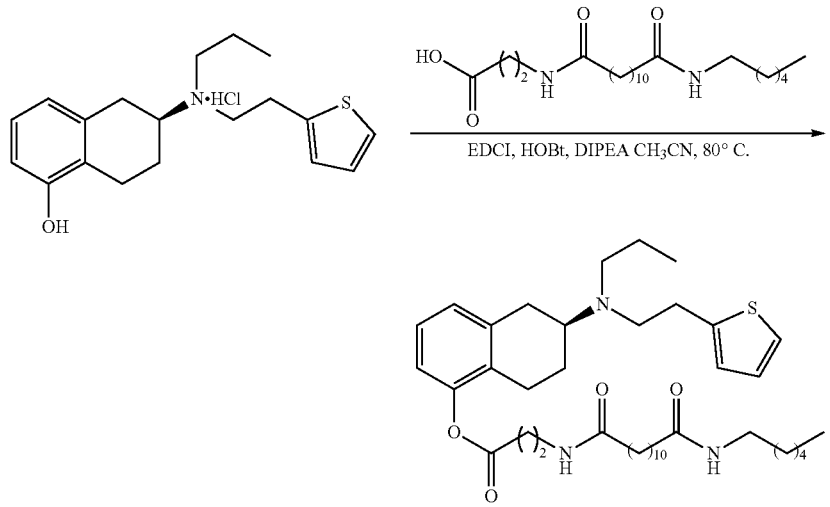

Compound 72

Referring to the method of Embodiment 25, 3-(12-(hexylamino)-12-oxododecanamido) propanoic acid (1.1 eq) was used to replace (18-amino-18-oxooctadecanoyl) glycine, so that Compound 72 (0.96 g, yield: 42%) was prepared. $^1$H NMR (500 MHz, CDCl$_3$) δ 7.13 (t, J=7.6 Hz, 2H), 7.00 (d, J=7.7 Hz, 1H), 6.94-6.89 (m, 1H), 6.82 (t, J=5.4 Hz, 2H), 6.15 (t, J=6.2 Hz, 1H), 5.49 (t, J=6.0 Hz, 1H), 3.61 (q, J=6.2 Hz, 2H), 3.23 (q, J=6.7 Hz, 2H), 3.05-2.71 (m, 10H), 2.61-2.43 (m, 3H), 2.15 (dt, J=12.3, 7.6 Hz, 4H), 2.05-2.02 (m, 1H), 1.66-1.55 (m, 5H), 1.49 (dt, J=13.4, 7.0 Hz, 4H), 1.35-1.17 (m, 18H), 0.94-0.82 (m, 6H). MS(m/z): 682.58 [M+H]$^+$.

Embodiment 73 (S)-6-(propyl(2-(thiophen-2-yl)ethyl)amino)-5,6,7,8-tetrahydronaphthalen-1-yl 3-(11-(heptylamino)-11-oxoundecanamido) propanoate

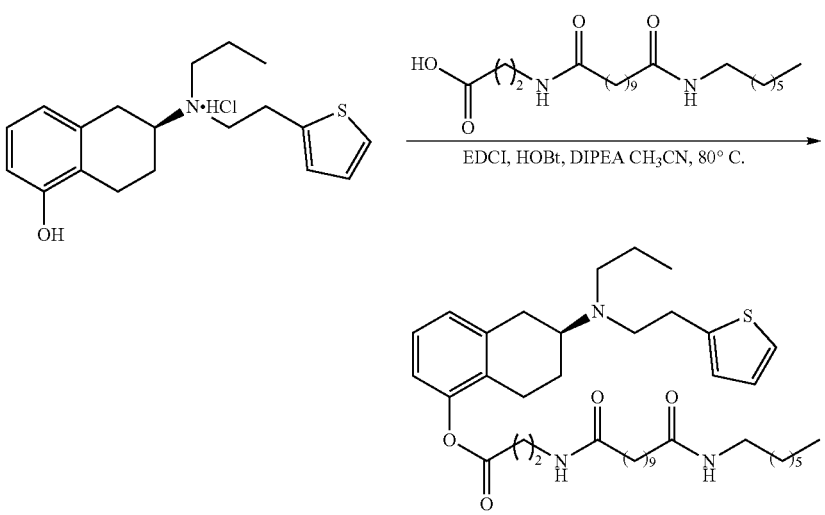

Compound 73

Referring to the method of Embodiment 25, 3-(11-(heptylamino)-11-oxoundecanamido) propanoic acid (1.1 eq) was used to replace (18-amino-18-oxooctadecanoyl) glycine, so that an off-white solid powder, Compound 73 (0.21 g, yield: 58%) was prepared. MS(m/z): 682.52 [M+H]$^+$.

Embodiment 74 (S)-6-(propyl(2-(thiophen-2-yl)ethyl)amino)-5,6,7,8-tetrahydronaphthalen-1-yl 3-(10-(hexylamino)-10-oxodecylamido) propanoate

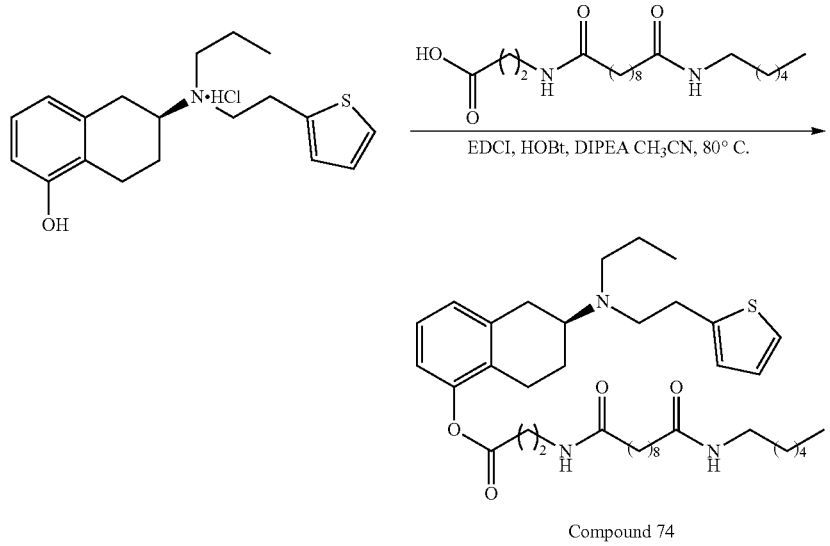

Compound 74

Referring to the method of Embodiment 25, 3-(10-(hexylamino)-10-hexylamido) propanoic acid (1.1 eq) was used to replace (18-amino-18-oxooctadecanoyl) glycine, so that an off-white solid powder, Compound 74 (0.29 g, yield: 63%) was prepared. MS(m/z): 654.31 [M+H]$^+$.

Embodiment 75 (S)-6-(propyl(2-(thiophen-2-yl)ethyl)amino)-5,6,7,8-tetrahydronaphthalen-1-yl 3-(8-(hexylamino)-8-oxooctanamido) propanoate

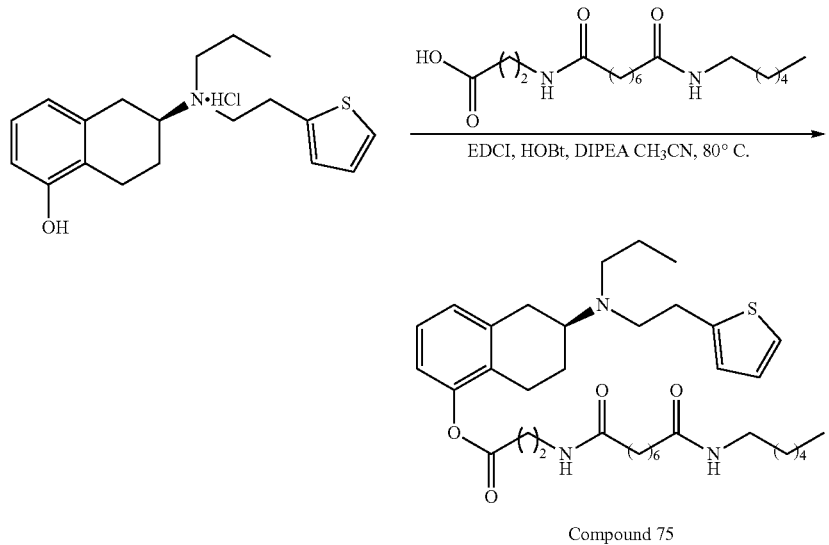

Compound 75

Referring to the method of Embodiment 25, 3-(8-(hexylamino)-8-oxooctanamido) propanoic acid (1.1 eq) was used to replace (18-amino-18-oxooctadecanoyl) glycine, so that an off-white solid powder, Compound 75 (0.33 g, yield: 72%) was prepared. MS(m/z): 626.47 [M+H]$^+$.

Embodiment 76 (S)-6-(propyl(2-(thiophen-2-yl)ethyl)amino)-5,6,7,8-tetrahydronaphthalen-1-yl 3-(12-(tertbutylamino)-12-oxododecanamido) propanoate

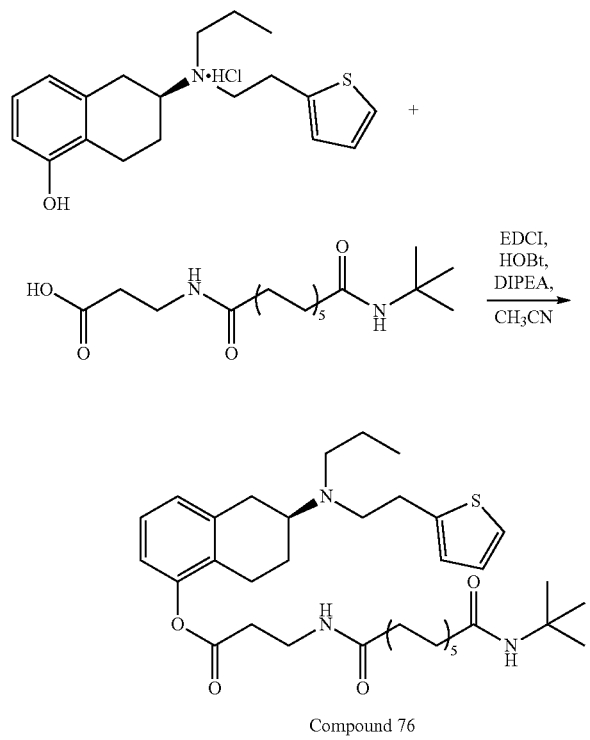

Compound 76

Referring to the method of Embodiment 25, 3-(12-(tert-butylamino)-12-oxododecanamido) propanoic acid (1.1 eq) was used to replace (18-amino-18-oxooctadecanoyl) glycine, so that a white solid powder, Compound 76 (2.12 g, yield: 89.8%) was prepared. $^1$H NMR (500 MHz, CDCl$_3$) δ 7.14-7.11 (m, 2H), 6.99 (d, J=8.0 Hz, 1H), 6.92-6.91 (m, 1H), 6.83-6.81 (br, 2H), 6.10 (t, J=6.0 Hz, 1H), 5.24 (s, 1H), 3.61 (q, J=6.0 Hz, 2H), 2.97-2.83 (m, 4H), 2.02 (br, 1H), 1.73 (br, 1H), 1.62-1.56 (m, 4H), 1.52-1.46 (m, 2H), 1.33 (s, 9H), 1.26 (br, 12H), 0.89 (t, J=7.5 Hz, 3H). MS(m/z): 655.35 [M+H]$^+$.

Embodiment 77 (S)-6-(propyl(2-(thiophen-2-yl)ethyl) amino)-5,6,7,8-tetrahydronaphthalen-1-yl 3-(16-(methylamino)-16-oxohexadecanamido) propanoate

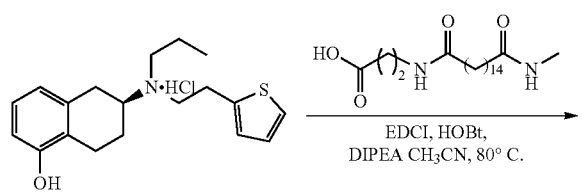

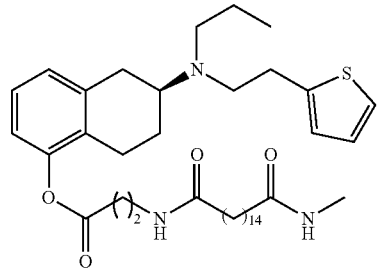

Compound 77

Referring to the method of Embodiment 25, 3-(16-(methylamino)-16-oxohexadecanamido) propanoic acid (1.1 eq) was used to replace (18-amino-18-oxooctadecanoyl) glycine, so that Compound 77 (1.60 g, yield: 56.3%) was prepared. $^1$H NMR (500 MHz, CDCl$_3$) δ 7.14-7.11 (m, 2H), 6.99 (d, J=7.5 Hz, 1H), 6.93-6.91 (m, 1H), 6.83-6.81 (m, 2H), 6.07 (t, J=6.0 Hz, 1H), 1H), 3.63-3.60 (m, 2H), 3.31-3.26 (m, 2H), 2.99-2.89 (m, 3H), 2.84-2.74 (m, 8H), 2.57-2.48 (m, 3H), 2.17-2.14 (m, 4H), 2.04-2.00 (m, 1H), 1.63-1.58 (m, 5H), 1.52-1.47 (m, 2H), 1.28-1.24 (m, 22H), 0.89 (t, J=7.5 Hz, 3H). MS(m/z): 668.69 [M+H]$^+$.

Embodiment 78 (S)-6-(propyl(2-(thiophen-2-yl)ethyl)amino)-5,6,7,8-tetrahydronaphthalen-1-yl 3-(12-(ethyl amino)-12-oxododecanoyl) glycinate

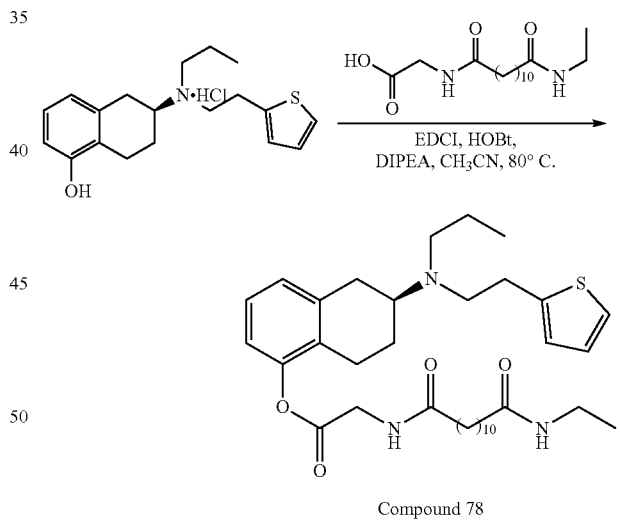

Compound 78

Referring to the method of Embodiment 25, 2-(12-(ethylamino)-12-oxododecanoyl) glycine (1.1 eq) was used to replace (18-amino-18-oxooctadecanoyl) glycine, so that a white solid powder, Compound 78 (1.20 g, yield: 69%) was prepared. $^1$H NMR (500 MHz, DMSO-d$_6$) δ 10.31 (s, 1H), 8.08 (d, J=9.0 Hz, 2H), 7.81 (d, J=8.5 Hz, 2H), 7.67 (s, 1H), 7.32 (br, 2H), J=7.5 Hz, 1H), 7.08 (d, J=7.5 Hz, 1H), 7.01 (d, J=7.5 Hz, 3H), 6.94 (br, 2H), 2.95-2.76 (m, 8H), 2.55 (d, J=9.5 Hz, 3H), 2.37 (t, J=7.5 Hz, 3H), J=7.5 Hz, 2H), 1.61 (t, J=7.0 Hz, 2H), 1.47 (t, J=7.0 Hz, 2H), 1.30-1.25 (m, 12H), 0.87 (t, J=6.5 Hz, 3H). MS(m/z): 612.46 [M+H]$^+$.

Embodiment 79 (S)-6-(propyl(2-(thiophen-2-yl)ethyl)amino)-5,6,7,8-tetrahydronaphthalen-1-yl (dodecylcarbamoyl) glycinate

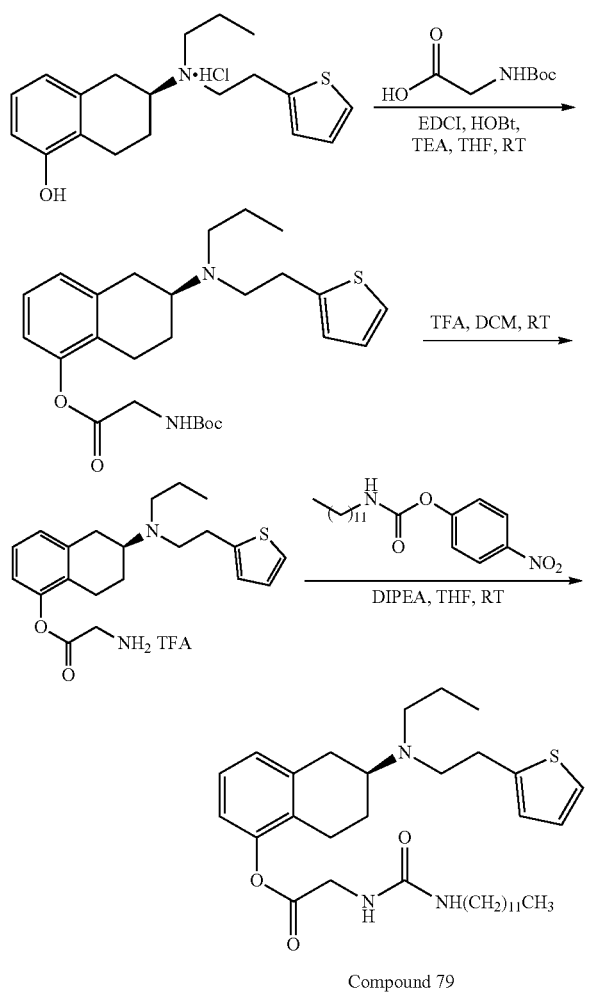

Compound 79

Rotigotine (2.0 g, 5.68 mmol), Boc-glycine (1.04 g, 5.966 mmol, 1.05 eq), triethylamine (1.73 g, 17.05 mmol, 3.0 eq), THF (20.0 mL) were added to a 100 mL single-neck flask. The mixture was stirred while EDCI (1.64 g, 8.52 mmol, 1.5 eq) and HOBT (0.15 g, 1.14 mmol, 0.20 eq) were added and the mixture was reacted for three hours at room temperature. LCMS showed that the raw materials were completely reacted. Subsequently, water and ethyl acetate were added to separate the mixture, the aqueous phase was extracted by ethyl acetate twice, and the organic phase was combined and concentrated under reduced pressure, to obtain residues. Dichloromethane (20.0 mL) was added to the residues to dissolve them, and then trifluoroacetic acid (5.0 mL) was added. The mixture was reacted for two hours at room temperature, and TLC showed that the raw materials were completely reacted. The reaction mixture was concentrated under reduced pressure, to obtain residues. Tetrahydrofuran (20.0 mL) was added to the residues to dissolve them, and then DIPEA (2.53 g, 19.60 mmol, 4.0 eq) and 4-nitrophenyldodecylcarbamate (2.06 g, 5.88 mmol, 1.2 eq) were added. The mixture was reacted for two hours at room temperature, and TLC showed that the raw materials were completely reacted. Water and ethyl acetate were further added to separate the aqueous phase and organic phase, the aqueous phase as extracted by ethyl acetate twice, and the organic phase was combined, concentrated under reduced pressure, purified through a column chromatography, to obtain Compound 79 (0.88 g, yield: 24.2%), a light yellow oily product. $^1$H NMR (500 MHz, DMSO-$d_6$) $\delta$7.28 (dd, J=5.0 Hz, 1.5 Hz, 1H), 7.12 (t, J=8.0 Hz, 1H), 6.99 (d, J=7.5 Hz, 1H), 6.93-6.91 (m, 2H), 6.87-6.86 (m, 1H), 6.82 (d, J=8.0 Hz, 1H), 6.28 (t, J=5.5 Hz, 1H), 6.19 (t, J=5.5 Hz, 1H), 4.02 (d, J=6.5 Hz, 2H), 2.99 (q, J=1.5 Hz, 2H), 2.90 (t, J=7.0 Hz, 2H), 2.85-2.81 (m, 2H), 2.76-2.60 (m, 4H), 2.44-2.38 (m, 1H), 1.92-1.90 (m, 1H), 1.50-1.46 (m, 1H), 1.42-1.34 (m, 4H), 1.24-1.22 (m, 20H), 0.86-0.82 (m, 6H). MS(m/z): 584.59 [M+H]$^+$.

Embodiment 80 (S)-6-(propyl(2-(thiophen-2-yl)ethyl)amino)-5,6,7,8-tetrahydronaphthalen-1-yl (4-octanamidobutanoyl) glycinate

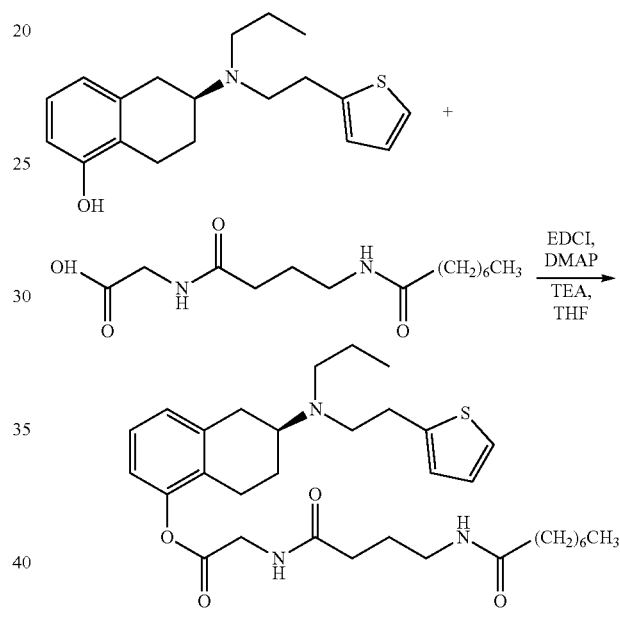

Compound 80

Referring to the method of Embodiment 1, (4-octanamidobutanoyl) glycine (1.1 eq) was used to replace octanonamido acetic acid, so that a light yellow oily product, Compound 80 (0.25 g, yield: 66.7%) was prepared. $^1$H NMR (500 MHz, CDCl$_3$) $\delta$ 7.21 (s, 1H), 7.12-7.10 (br, 2H), 6.98 (d, J=7.5 Hz, 1H), 6.93-6.91 (br, 1H), 6.85 (d, J=8.0 Hz, 1H), 6.81 (s, 1H), 5.88 (s, 1H), 4.29 (d, J=5.5 Hz, 2H), 3.39-3.36 (dd, J=12.0 Hz, 6.0 Hz, 2H), 2.98-2.89 (br, 4H), 2.84-2.82 (br, 4H), 2.55-2.49 (br, 3H), 2.31 (t, J=6.0 Hz, 2H), 2.17 (t, J=7.5 Hz, 2H), 2.04 (br, 1H), 1.87-1.83 (m, 2H), 1.63-1.60 (br, 5H), 1.29-1.27 (br, 8H), 0.91-0.86 (m, 6H). MS(m/z): 584.44 [M+H]$^+$.

Embodiment 81 Assay for Testing Physical and Chemical Properties of the Compounds of the Present Disclosure The compounds of the present disclosure to be tested were taken in a proper amount and filled in an aluminum crucible for testing DSC. The test results were shown in Table 1. The test results indicated that the compounds of the present disclosure had higher melting points, which met the requirements of grinding method to prepare a long-acting drug.

Instrument Model: NETZSCH DSC 3500
Heating rate: 10.0 K/min
Atmosphere: N$_2$

TABLE 1
DSC Test results of melting points of the compounds of the present disclosure
| Embodiments | Structural formula | Melting points/ °C. |
|---|---|---|
| 15 | 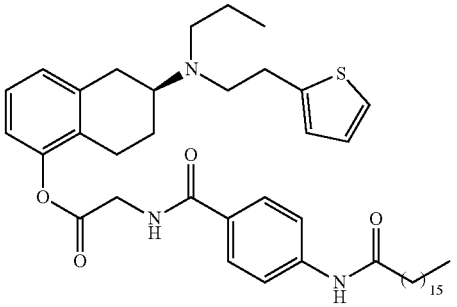 | 116.8 |
| 24 | 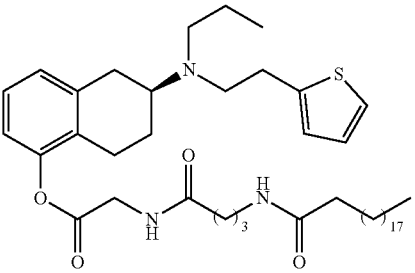 | 92.5 |
| 27 | 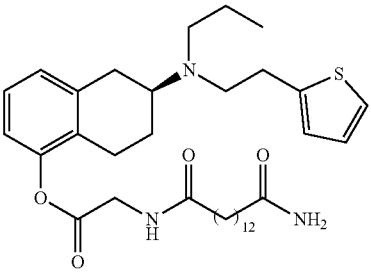 | 97.4 |
| 32 | 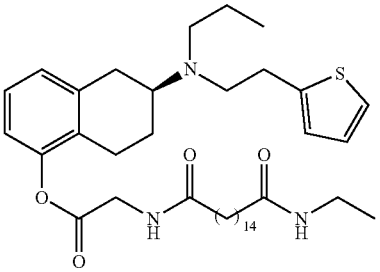 | 112.3 |
| 43 | 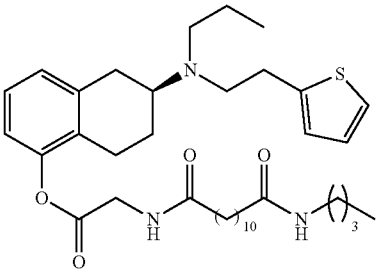 | 101.1 |

TABLE 1-continued

DSC Test results of melting points of the compounds of the present disclosure

| Embodiments | Structural formula | Melting points/ °C. |
|---|---|---|
| 44 | | 88.5 |
| 47 | | 102.8 |
| 54 | | 113.7 |
| 70 | | 101.2 |
| 72 | | 92.8 |

TABLE 1-continued

DSC Test results of melting points of the compounds of the present disclosure

| Embodiments | Structural formula | Melting points/ °C. |
|---|---|---|
| 76 | | 70.6 |
| 78 | | 105.1 |
| 79 | | <25 |
| 80 | | <25 |

Embodiment 82 Preparation of Drugs Used in Pharmacokinetics Experiment

The compounds of the present disclosure were precisely weighed in a proper amount and placed in a 20 ml vial, a blank matrix solution and a zirconia grinding ball were added to grind by vortex. After grinding, the suspension sample was transferred, and the blank matrix solution was used for diluting the suspension sample to final volume, and the suspension sample was packaged into 7 ml vials to prepare about a 20 mg/ml suspension. After the quantitative analysis was determined, the suspension was used for the pharmacokinetics experiment in the mouse.

Embodiment 83 Pharmacokinetics Experiment of the Compounds of the Present Disclosure in Mouse Suspensions of Embodiments 15, 24, 27, 32 and 54 were prepared according to the method of Embodiment 82 and were taken at a dose of 9 mg/kg(calculated according to Rotigotine), and each of the above-mentioned compound suspensions was intramuscularly administrated for three SD mice, and whole blood samples were taken in 1 h, 4 h, 8 h, 24 h, 48 h, 72 h, 96 h, 120 h, 168 h, 216, 264 h, 312 h, and 360 h after administration, with 0.3 ml/time point. K2EDT/ heparin sodium were added to the whole blood samples for anticoagulation, and a BNPP stabilizer was further added, and then each whole blood sample was centrifuged to obtain plasma in 30 min. The results were shown in Table 2 and FIG. 1:

TABLE 2

The blood concentrations (ng/ml) of the active compounds at different time points after the intramuscular injection of the compound suspensions of the present disclosure in mouse

| TIME (h) | Embodiment 24 | Embodiment 15 | Embodiment 32 | Embodiment 54 | Embodiment 27 |
|---|---|---|---|---|---|
| 1 | 2.73 | 1.75 | 0.363 | 0.288 | 0.889 |
| 4 | 2.55 | 2.12 | 1.38 | 1.26 | 3.9 |
| 8 | 3.35 | 1.89 | 2.92 | 2.53 | 9.52 |
| 24 | 2.67 | 0.652 | 2.15 | 2.31 | 6.79 |
| 48 | 1.89 | 0.533 | 2.16 | 2.02 | 4.6 |
| 72 | 2.17 | 0.646 | 1.94 | 1.51 | 3.3 |
| 96 | 2.6 | 0.504 | 2.33 | 1.57 | 3.35 |
| 120 | 2.94 | 1.1 | 2.68 | 1.86 | 3.7 |
| 168 | 2.46 | 1.85 | 2.77 | 2.29 | 1.75 |
| 216 | 1.99 | 3.1 | 2.6 | 2.76 | 1.01 |
| 264 | 0.741 | 1.98 | 1.54 | 1.83 | 0.212 |
| 312 | 0.919 | 1.56 | 1.03 | 1.33 | 0.0935 |
| 360 | 0.314 | 0.822 | 0.619 | 0.906 | 0 |

The experiment indicated that the compounds of the present disclosure can sustainably and slowly release in vivo and have short onset time and long effect time.

In conclusion, the compounds of the present disclosure have a low solubility, higher melting point and can be prepared into a suspension preparation with short onset time and long effect time, and therefore they have a better clinical application prospect.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A compound, having a structure of formula (I), or a stereoisomer, a solvate, or a pharmaceutically acceptable salt thereof:

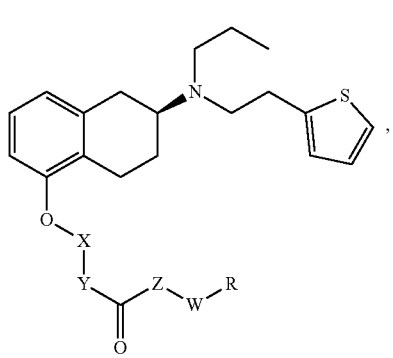

(I)

wherein,
X is absent, or X is —C($R^1$)($R^2$)—;
Y is absent, or Y is O;
Z is absent, or Z is $C_{1-15}$ alkylene;
W is —C(=O)NH—, or —NHC(=O)—;

each of $R^1$ and $R^2$ is independently H, D, F, Cl, OH, —CN, or $C_{1-4}$ alkyl;
R is $C_{1-30}$ alkyl, $C_{1-30}$ heteroalkyl, $C_{2-30}$ alkenyl, $C_{2-30}$ alkynyl, $C_{3-10}$ cycloalkyl, $C_{3-10}$ cycloalkyl-$C_{1-10}$ aliphatic, $C_{2-10}$ heterocyclyl, $C_{2-10}$ heterocyclyl-$C_{1-10}$ aliphatic, aryl, aryl-$C_{1-10}$ aliphatic, heteroaryl, heteroaryl-$C_{1-10}$ aliphatic, cholane aliphatic group, —$R^{3a}$—C(=O)NH—$R^{3b}$, or —$R^{3a}$—NHC(=O)—$R^{3b}$;
$R^{3a}$ is $C_{1-24}$ alkylene, $C_{2-10}$ alkenylene, arylene, —$C_{1-10}$ aliphatic-aryl-, or -aryl-$C_{1-10}$ aliphatic-;
$R^{3b}$ is H, $C_{1-22}$ alkyl, $C_{2-10}$ alkenyl, aryl, or aryl-$C_{1-10}$ aliphatic;
each of the alkyl, alkylene, heteroalkyl, alkenyl, alkenylene, alkynyl, cycloalkyl, heterocyclyl, cycloalkyl aliphatic, heterocyclyl aliphatic, aryl, arylene, aryl aliphatic, heteroaryl, heteroaryl aliphatic, -aliphatic-aryl-, -aryl-aliphatic-, cholane aliphatic group of $R^1$, $R^2$, R, $R^{3a}$, and $R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, $C_{1-6}$ alkyl, $C_{1-6}$ alkoxy, carboxyl, $C_{3-6}$ cycloalkyl, $C_{6-10}$ aryl, and $C_{1-9}$ heteroaryl; and
each of $R^{4a}$ and $R^{4b}$ is independently H, or $C_{1-6}$ alkyl.

2. The compound of claim 1, wherein the compound has a structure of formula (II):

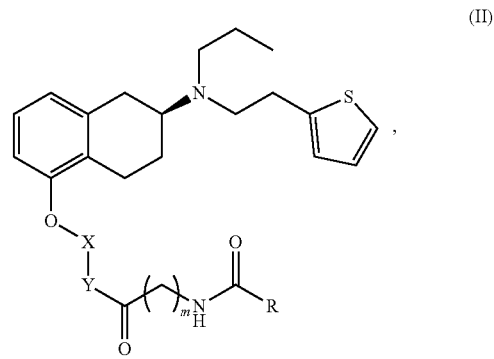

(II)

or a stereoisomer, a solvate, or a pharmaceutically acceptable salt thereof,
wherein, m is an integer from 1 to 5.

3. The compound of claim 1, wherein X is absent; and Y is absent.

4. The compound of claim 1, wherein each of $R^1$ and $R^2$ is independently H, D, F, Cl, OH, —CN, methyl, or ethyl.

5. The compound of claim 1, wherein R is $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;
wherein, each of $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$ —$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

6. The compound of claim 1, wherein R is $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

7. The compound of claim 1, wherein $R^{3a}$ is $C_{1-20}$ alkylene, $C_{2-6}$ alkenylene, $C_{6-10}$ arylene, —$C_{1-6}$ aliphatic-$C_{6-10}$ aryl-, or —$C_{6-10}$ aryl-$C_{1-6}$ aliphatic-; and $R^{3b}$ is H, $C_{1-19}$ alkyl, $C_{2-6}$ alkenyl, $C_{6-10}$ aryl, or $C_{6-10}$ aryl-$C_{1-6}$ aliphatic-;

wherein, each of $C_{1-19}$ alkyl, $C_{1-20}$ alkylene, $C_{2-6}$ alkenyl, $C_{2-6}$ alkenylene, $C_{6-10}$ aryl, $C_{6-10}$ arylene, —$C_{1-6}$ aliphatic-$C_{6-10}$ aryl-, —$C_{6-10}$ aryl-$C_{1-6}$ aliphatic-, or —$C_{6-10}$ aryl-$C_{1-6}$ aliphatic- is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

8. The compound of claim 1, wherein the compound is selected from any one of the following structures:

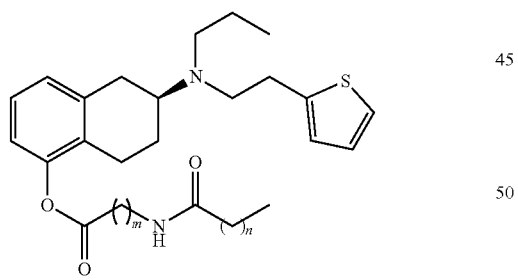

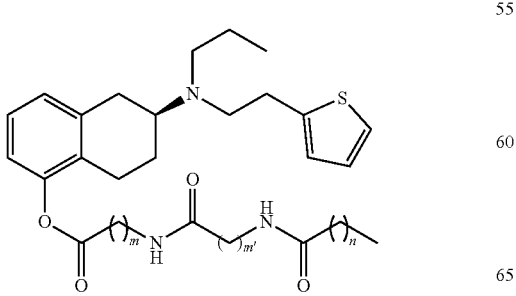

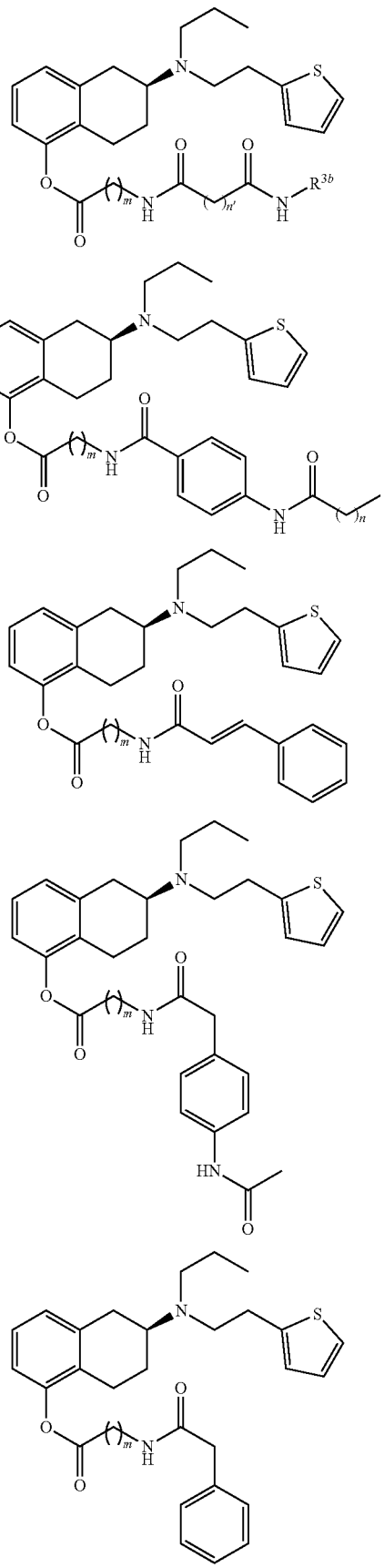

123
-continued
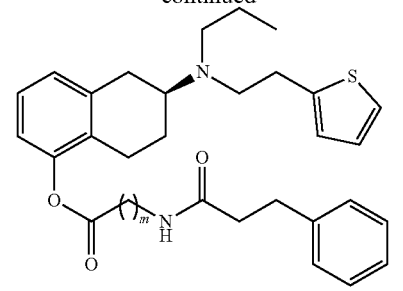
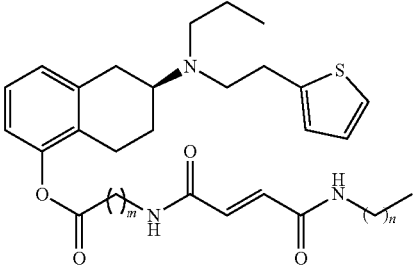
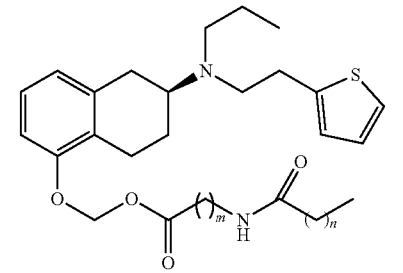
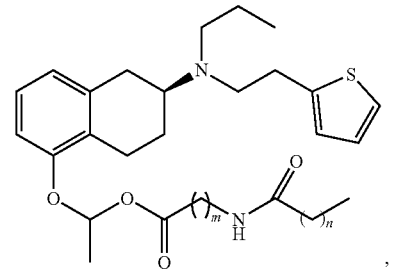
or a stereoisomer, a solvate, or a pharmaceutically acceptable salt thereof;
wherein, each of m and m' is independently an integer from 1 to 5; n is an integer from 7 to 20; n' is an integer from 2 to 20; and $R^{3b}$ is H, or $C_{1-18}$ alkyl.
9. The compound of claim 1, wherein the compound is a compound selected from any one of the following compounds:
(1)
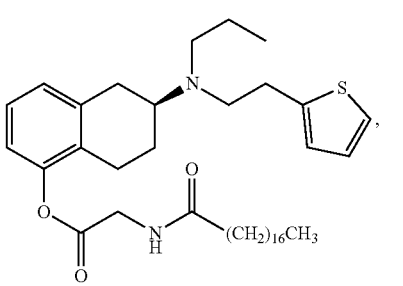
124
-continued
(2)
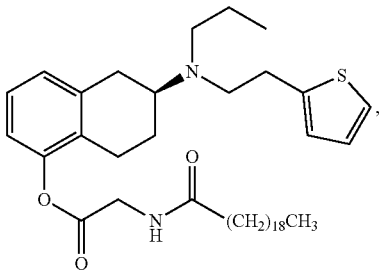
(3)
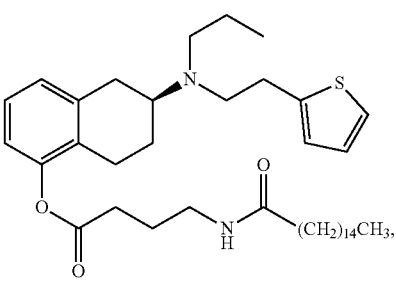
(4)
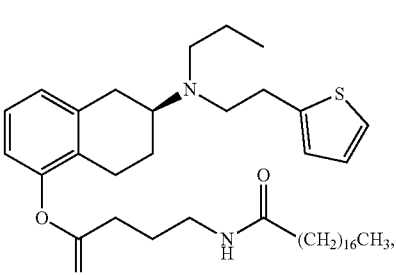
(5)
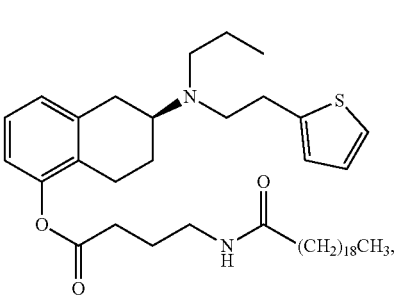
(6)
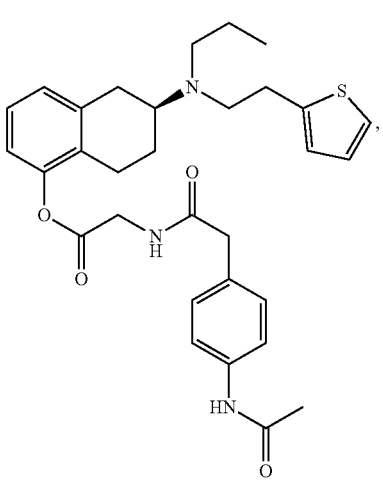

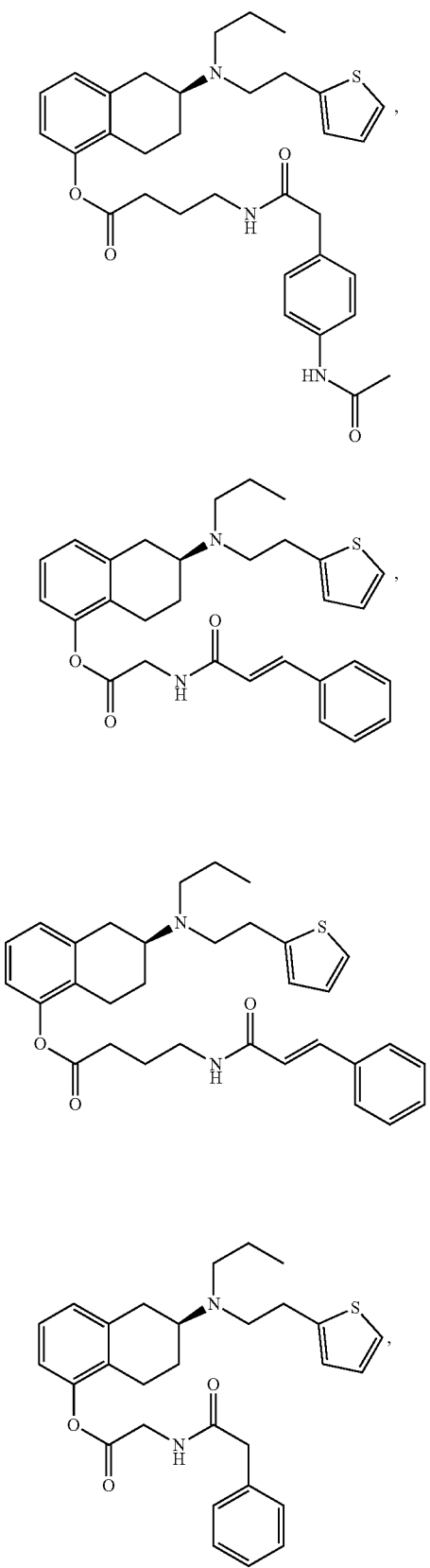
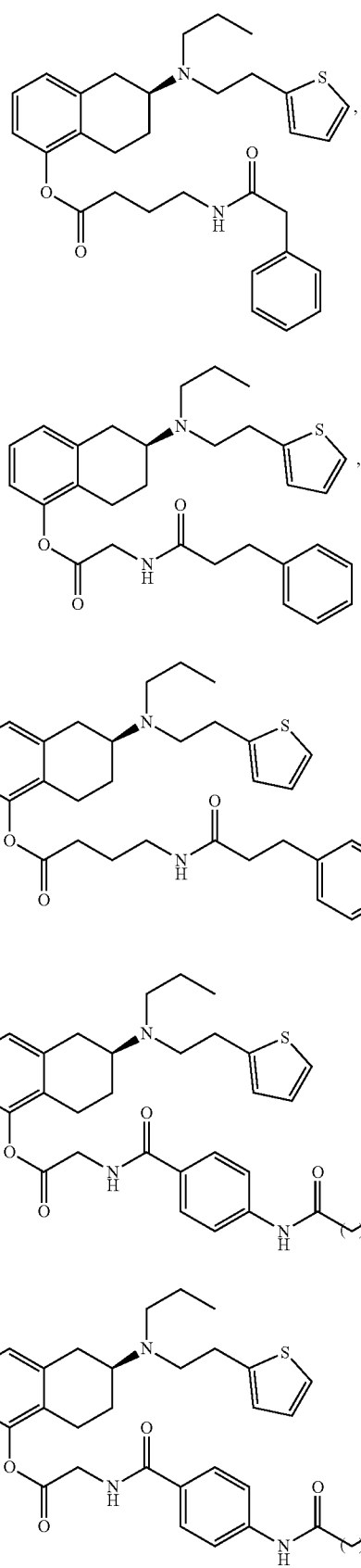

127
-continued
(16)
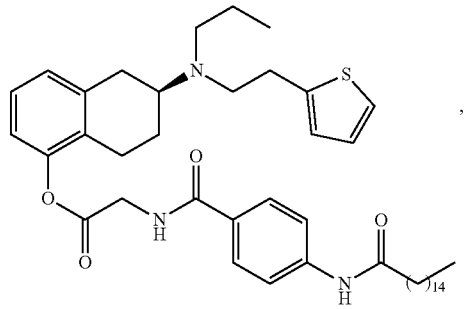
(17)
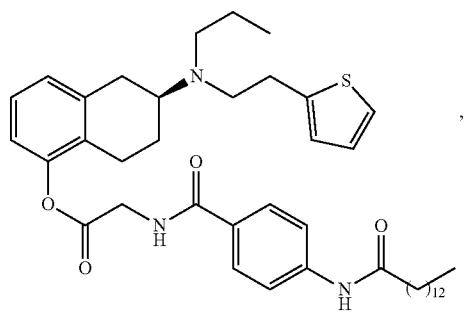
(18)
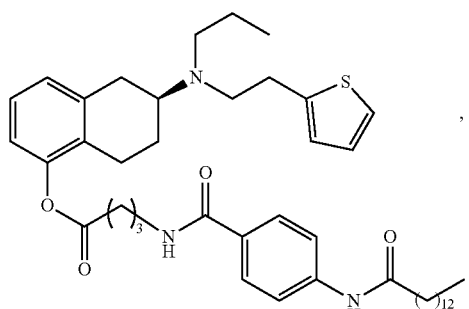
(19)
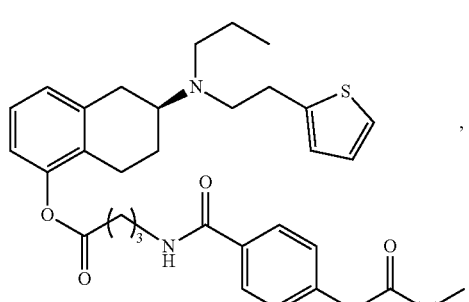
(20)
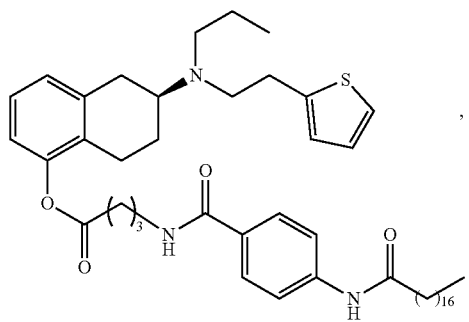
128
-continued
(21)
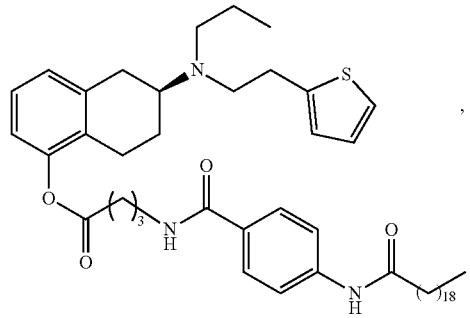
(22)
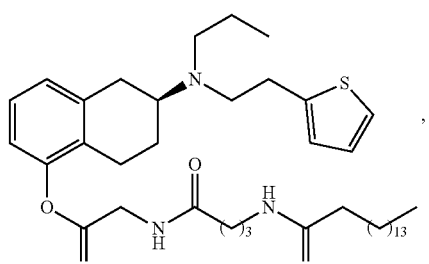
(23)
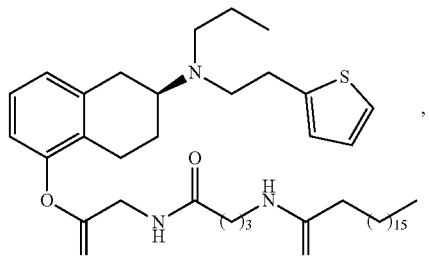
(24)
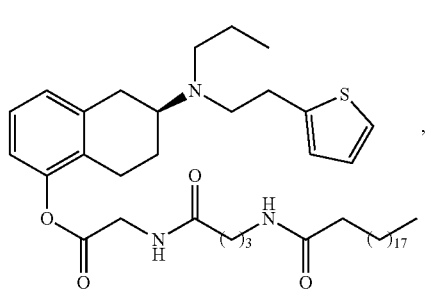
(25)
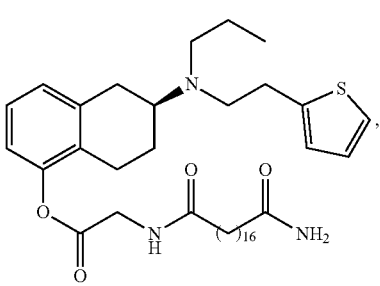

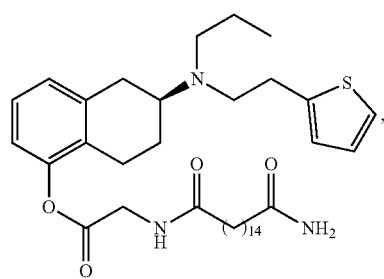
(26)
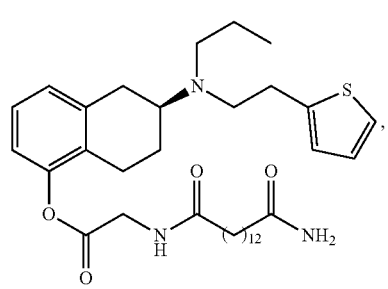
(27)
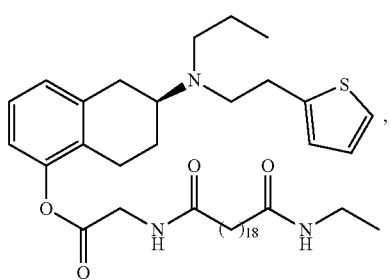
(28)
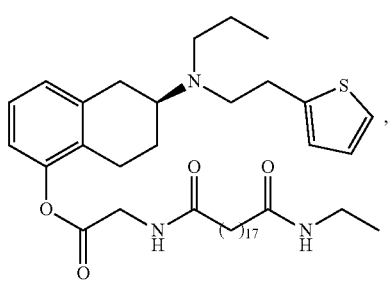
(29)
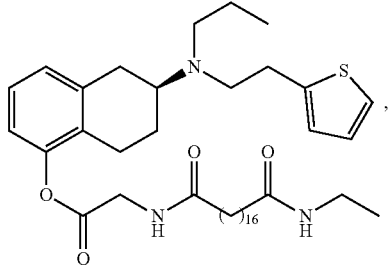
(30)
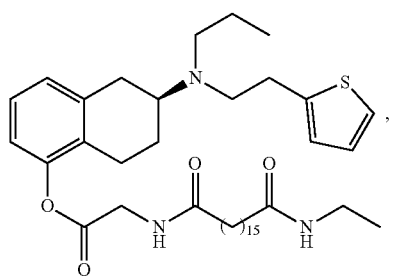
(31)
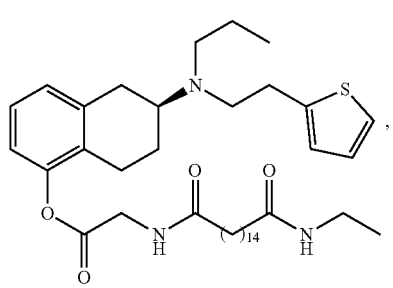
(32)
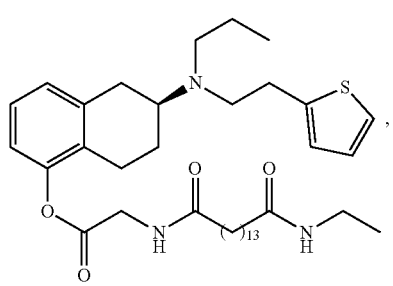
(33)
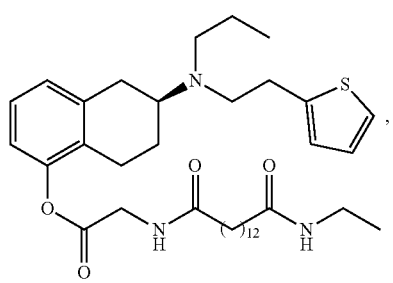
(34)
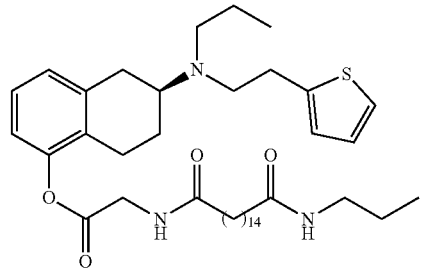
(35)

(36)
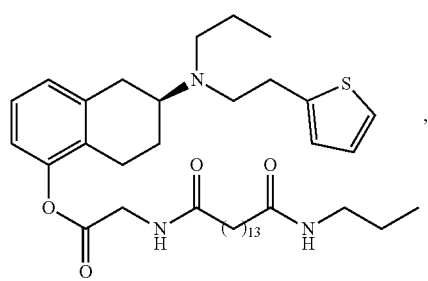
(37)
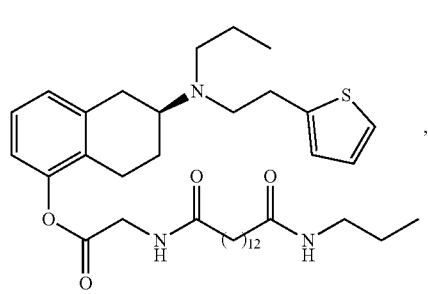
(38)
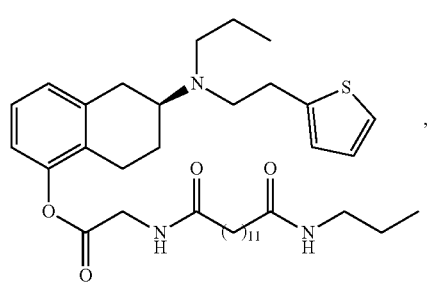
(39)
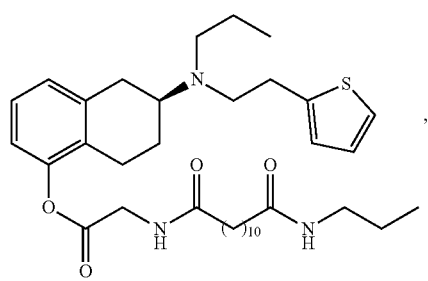
(40)
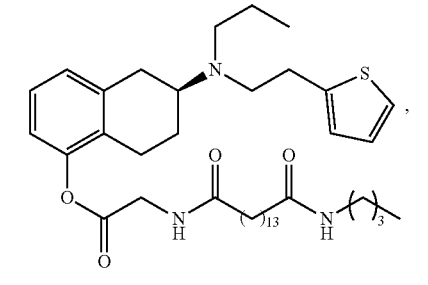
(41)
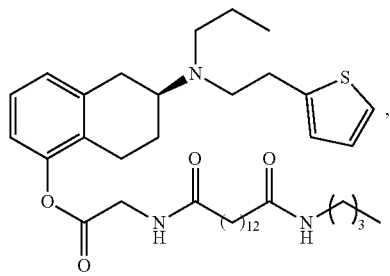
(42)
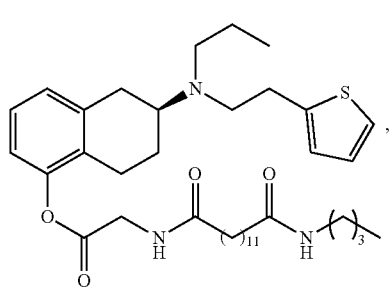
(43)
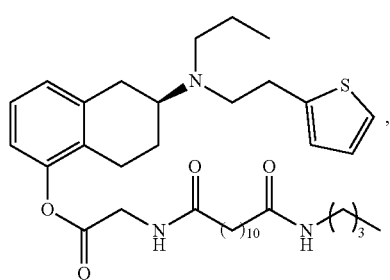
(44)
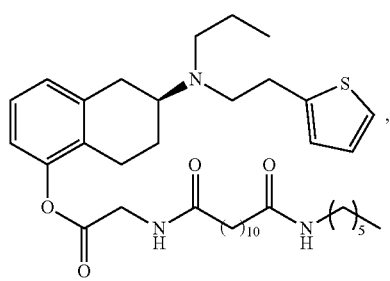
(45)
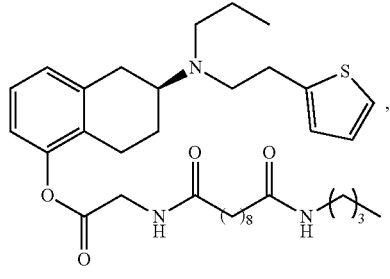

(46)
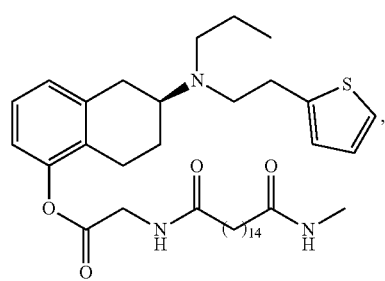
(47)
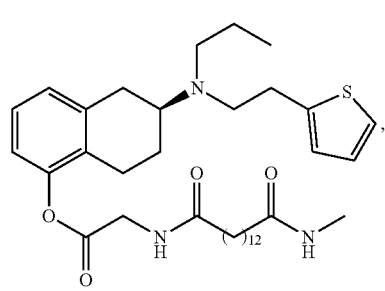
(48)
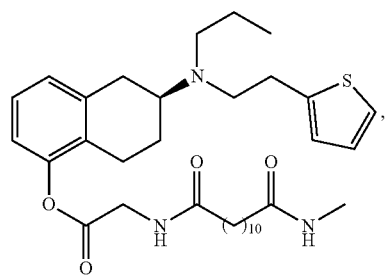
(49)
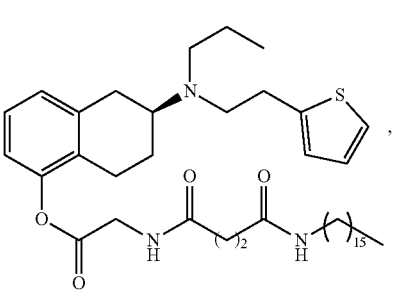
(50)
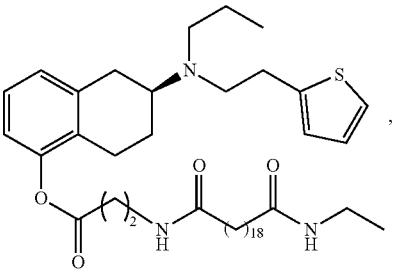
(51)
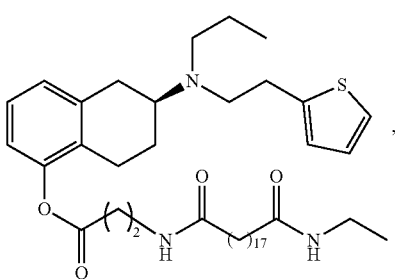
(52)
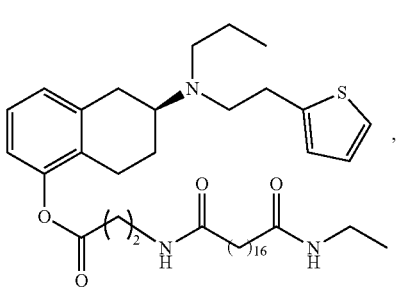
(53)
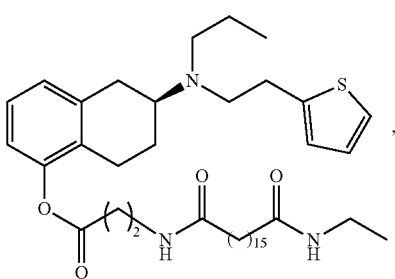
(54)
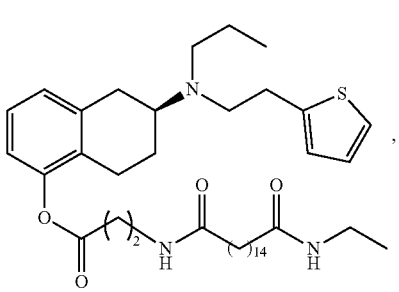
(55)
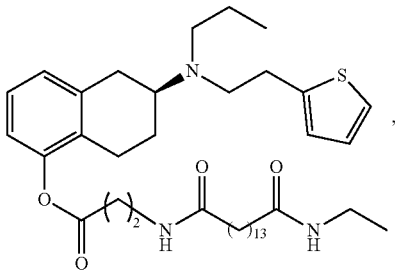

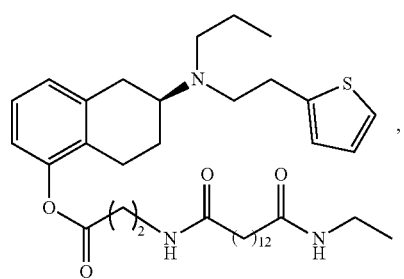
(56)
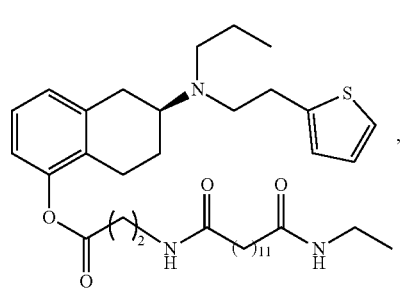
(57)
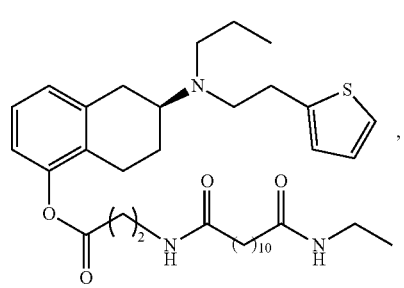
(58)
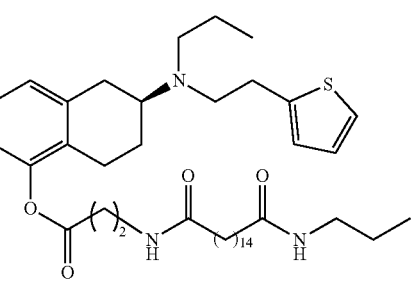
(59)
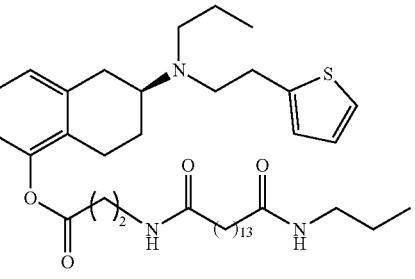
(60)
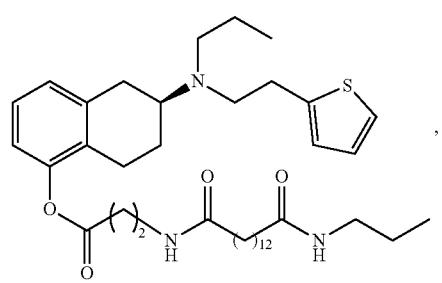
(61)
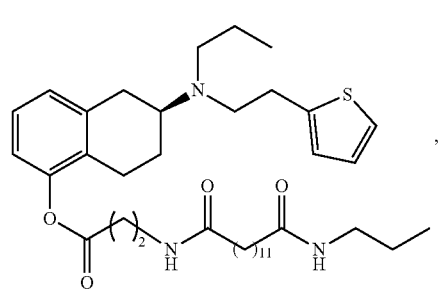
(62)
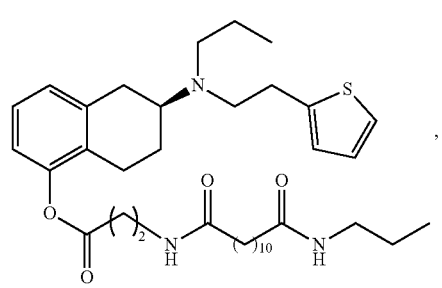
(63)
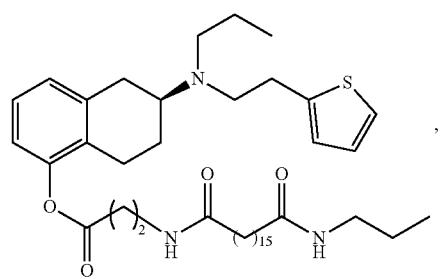
(64)
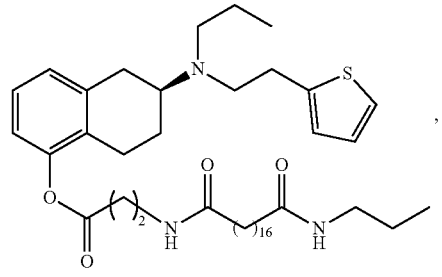
(65)

(66)
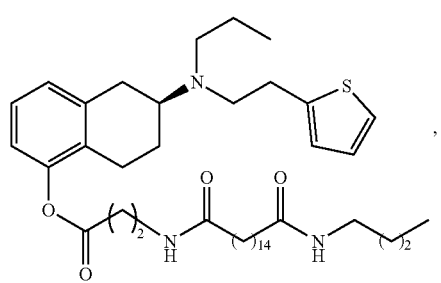
(67)
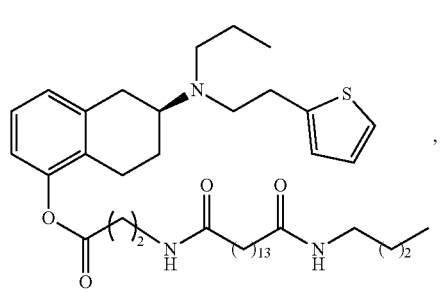
(68)
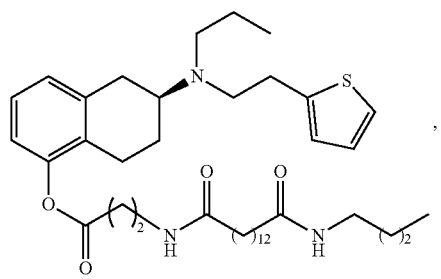
(69)
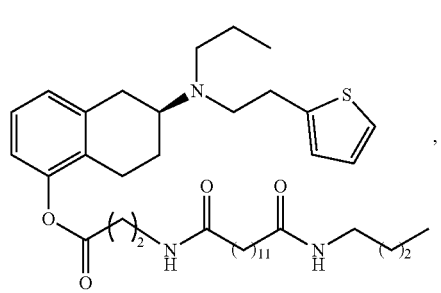
(70)
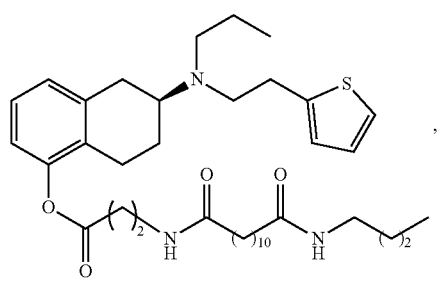
(71)
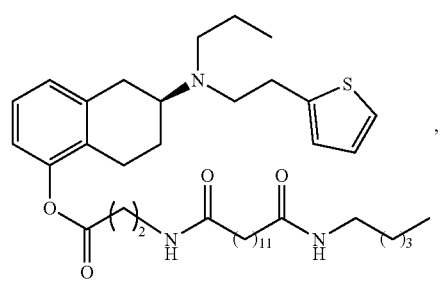
(72)
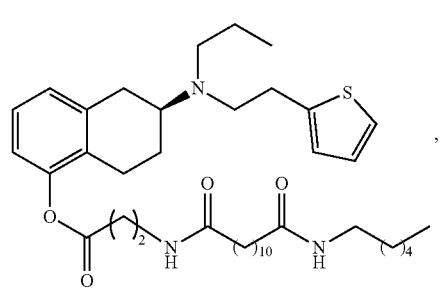
(73)
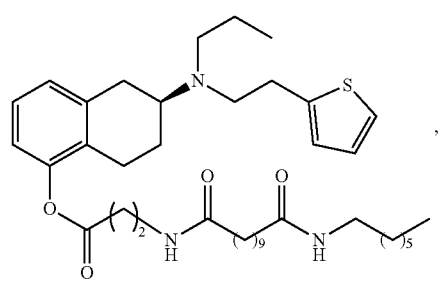
(74)
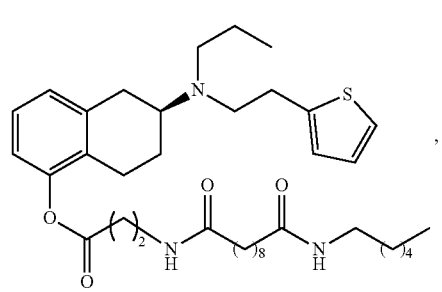
(75)
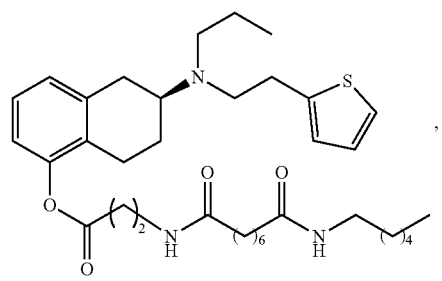

-continued

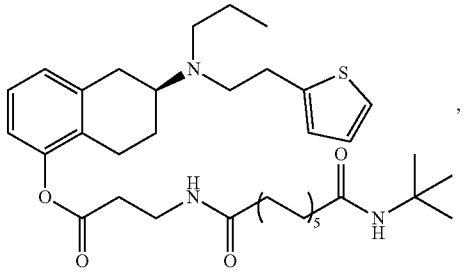

(76)

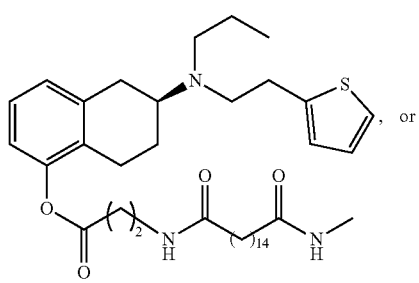

, or (77)

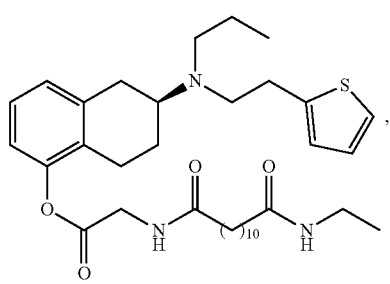

(78)

or a stereoisomer, a solvate, or a pharmaceutically acceptable salt thereof.

10. A pharmaceutical composition, comprising the compound, or the stereoisomer, the solvate, or a pharmaceutically acceptable salt thereof of claim 1, and a pharmaceutically acceptable excipient, a carrier, or a diluent.

11. A method of preventing or treating a central nervous system disease in a mammal in need thereof, comprising administrating at least one of the compound or a stereoisomer, a solvate, or a pharmaceutically acceptable salt thereof of claim 1, or administrating a pharmaceutical composition comprising the compound or a stereoisomer, a solvate, or a pharmaceutically acceptable salt thereof.

12. The method of claim 11, wherein the medicament is a long-acting drug.

13. The method of claim 11, wherein the central nervous system disease comprises Parkinson's disease, Restless Legs Syndrome, or depression.

14. The compound of claim 2, wherein X is absent; and Y is absent.

15. The compound of claim 2, wherein each of $R^1$ and $R^2$ is independently H, D, F, Cl, OH, —CN, methyl, or ethyl.

16. The compound of claim 2, wherein R is $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{1-22}$ alkyl, $C_{2-22}$ alkenyl, $C_{3-10}$ cycloalkyl, $C_{3-10}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

17. The compound of claim 2, wherein R is $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$;

wherein, each of $C_{5-20}$ alkyl, $C_{2-20}$ alkenyl, $C_{3-6}$ cycloalkyl, $C_{3-6}$ cycloalkyl-$C_{1-6}$ aliphatic, $C_{2-7}$ heterocyclyl, $C_{2-7}$ heterocyclyl-$C_{1-6}$ aliphatic, $C_{6-10}$ aryl, $C_{6-10}$ aryl-$C_{1-6}$ aliphatic, $C_{1-9}$ heteroaryl, $C_{1-9}$ heteroaryl-$C_{1-6}$ aliphatic, cholane aliphatic group, —$R^{3a}$—C(=O)NH—$R^{3b}$, or —$R^{3a}$—NHC(=O)—$R^{3b}$ is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

18. The compound of claim 2, wherein $R^{3a}$ is $C_{1-20}$ alkylene, $C_{2-6}$ alkenylene, $C_{6-10}$ arylene, —$C_{1-6}$ aliphatic-$C_{6-10}$ aryl-, or —$C_{6-10}$ aryl-$C_{1-6}$ aliphatic-; and $R^{3b}$ is H, $C_{1-19}$ alkyl, $C_{2-6}$ alkenyl, $C_{6-10}$ aryl, or $C_{6-10}$ aryl-$C_{1-6}$ aliphatic-;

wherein, each of $C_{1-19}$ alkyl, $C_{1-20}$ alkylene, $C_{2-6}$ alkenyl, $C_{2-6}$ alkenylene, $C_{6-10}$ aryl, $C_{6-10}$ arylene, —$C_{1-6}$ aliphatic-$C_{6-10}$ aryl-, —$C_{6-10}$ aryl-$C_{1-6}$ aliphatic-, or —$C_{6-10}$ aryl-$C_{1-6}$ aliphatic- is independently substituted with 1, 2, 3, or 4 substituents independently selected from H, D, oxo (=O), thio (=S), F, Cl, Br, —OH, —CN, amino, —C(=O)NH—$R^{4a}$, —NHC(=O)—$R^{4a}$, —S(=O)$_{1-2}$NH—$R^{4b}$, —NHS(=O)$_{1-2}$—$R^{4b}$, carboxyl, $C_{1-4}$ alkyl, $C_{1-4}$ alkoxy, $C_{3-6}$ cycloalkyl, $C_{6-10}$ aryl, or $C_{1-9}$ heteroaryl.

19. The compound of claim 2, wherein the compound is a compound selected from any one of the following compounds:

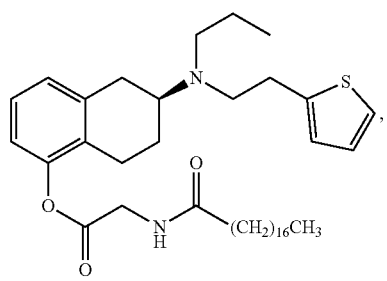

(1)

(2)
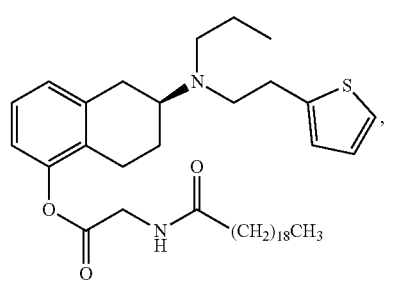
(3)
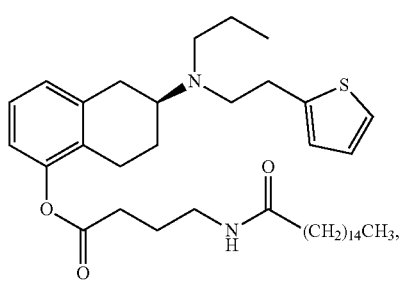
(4)
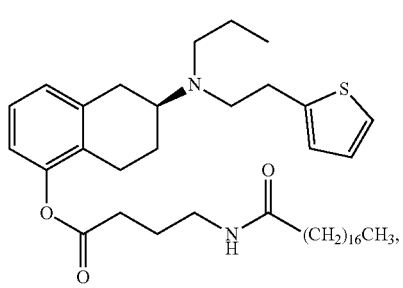
(5)
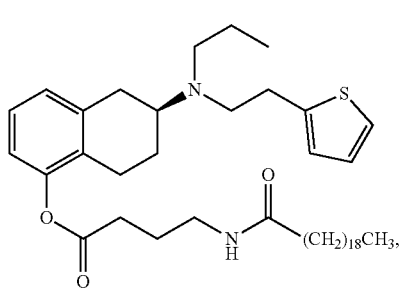
(6)
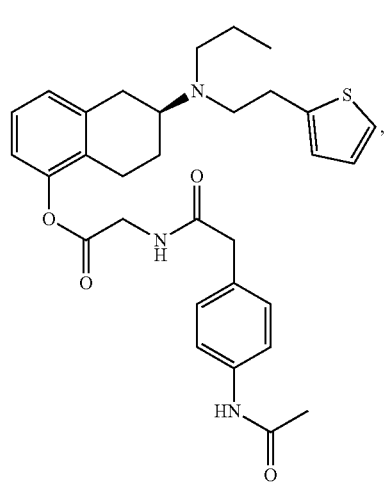
(7)
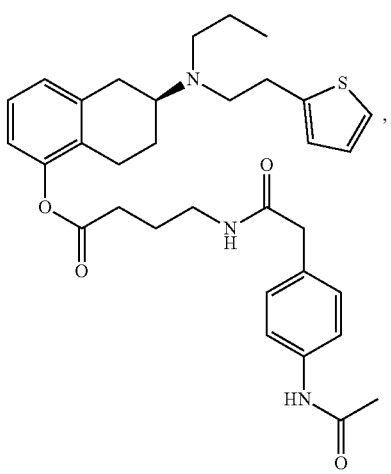
(8)
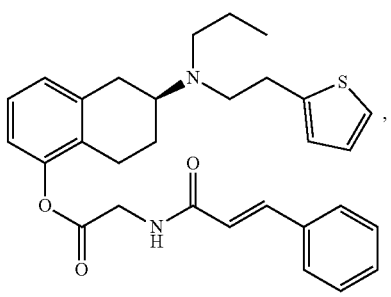
(9)
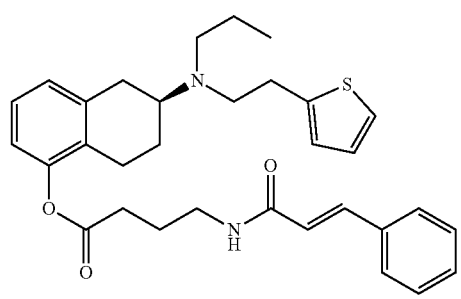
(10)
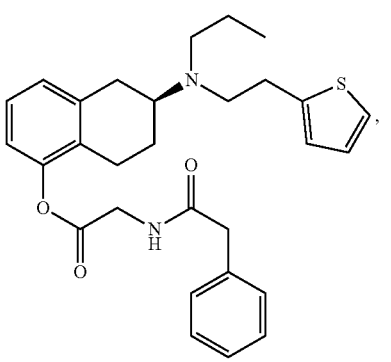

(11)
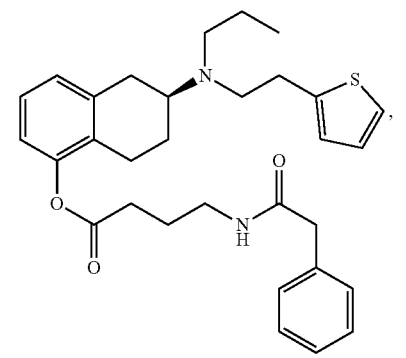
(12)
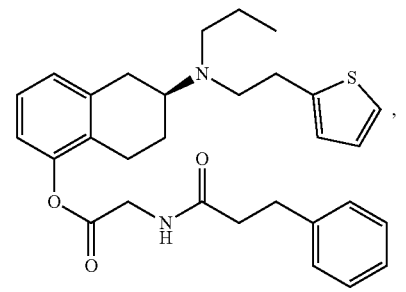
(13)
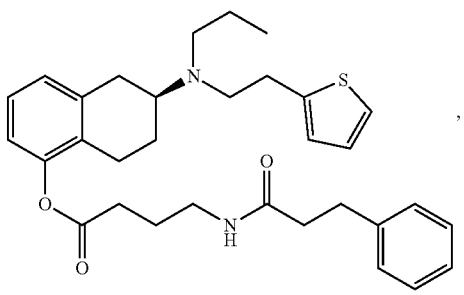
(14)
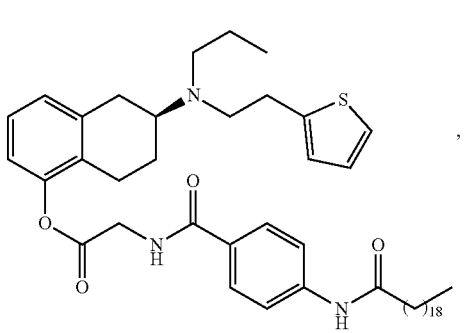
(15)
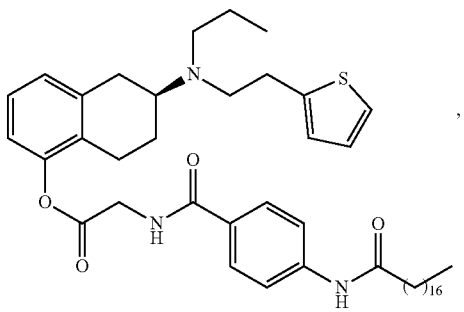
(16)
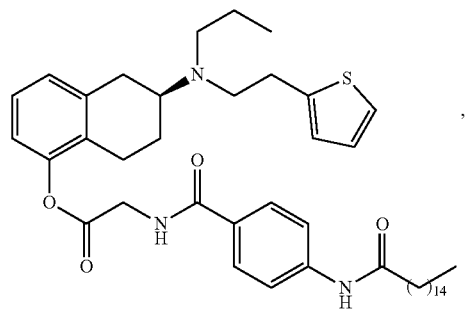
(17)
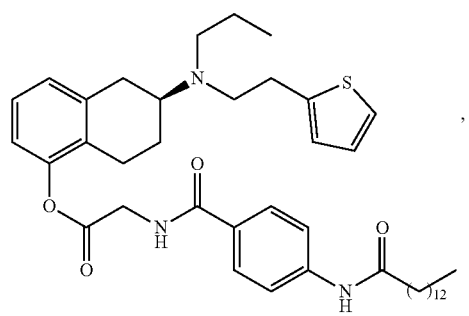
(18)
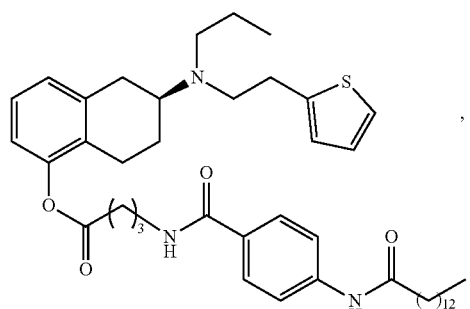
(19)
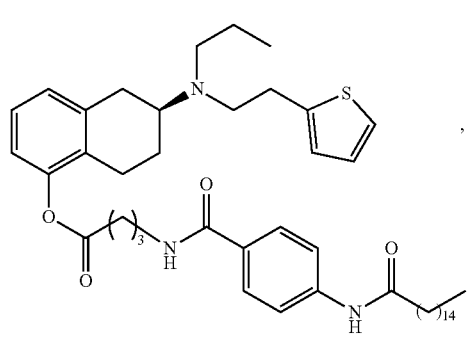
(20)
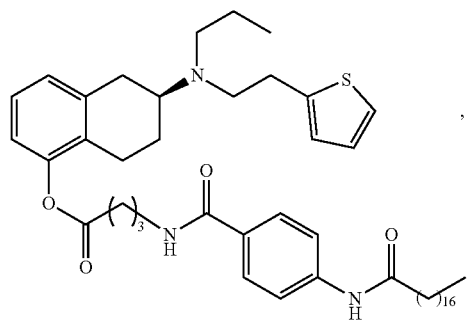

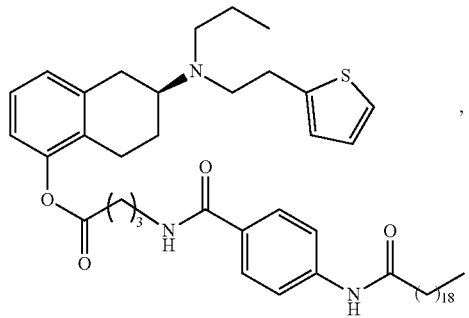
(21)
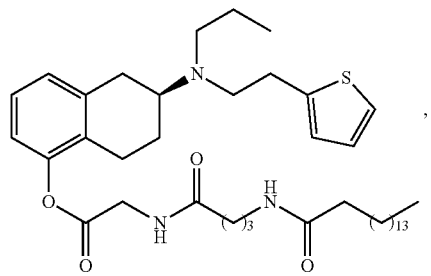
(22)
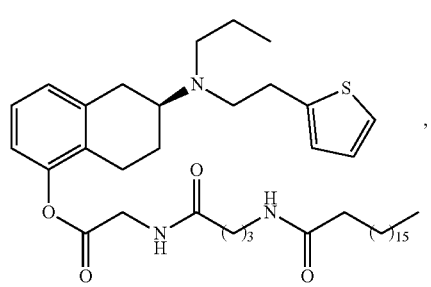
(23)
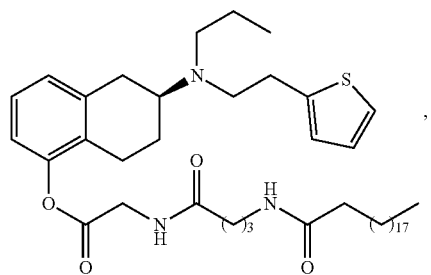
(24)
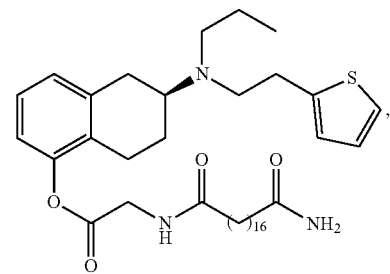
(25)
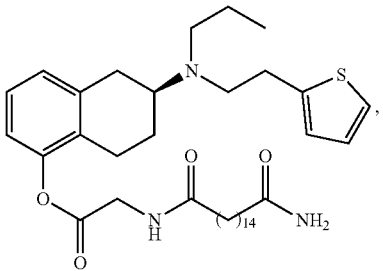
(26)
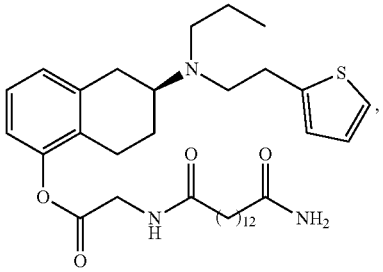
(27)
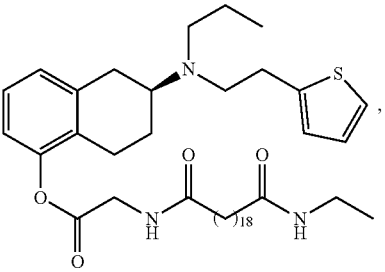
(28)
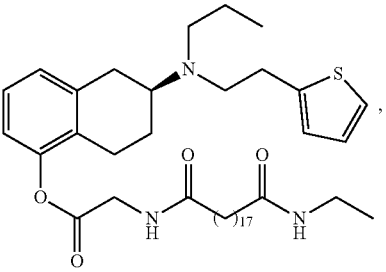
(29)
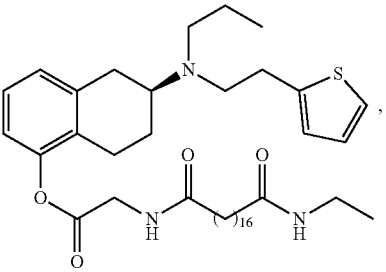
(30)

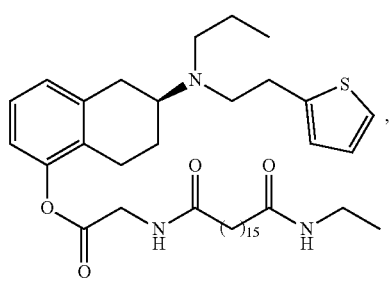
(31)
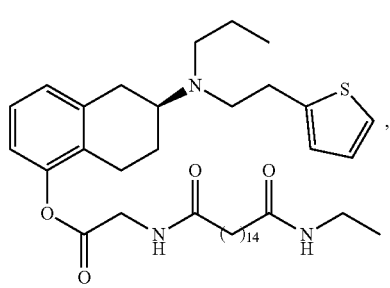
(32)
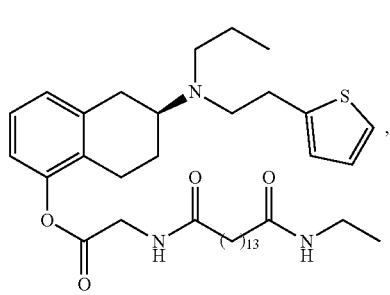
(33)
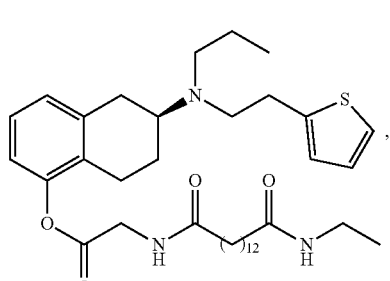
(34)
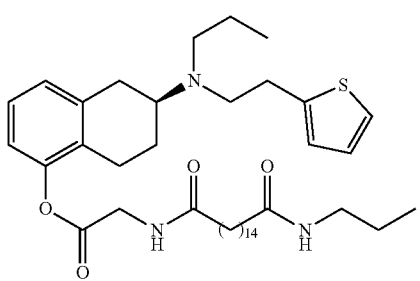
(35)
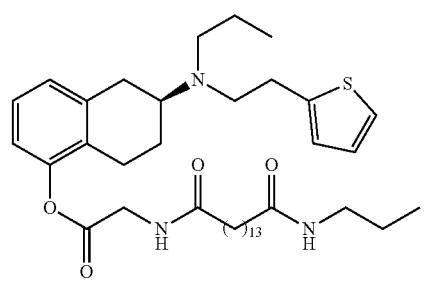
(36)
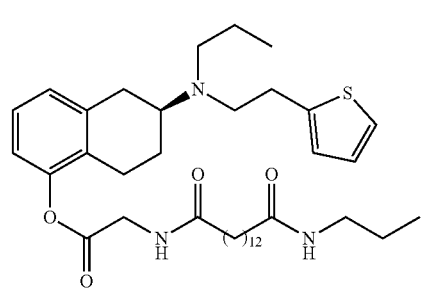
(37)
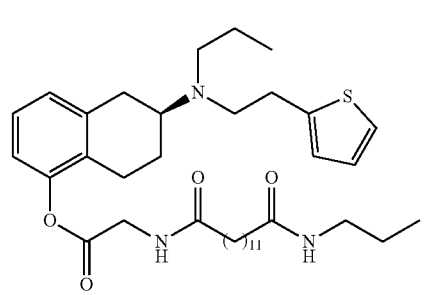
(38)
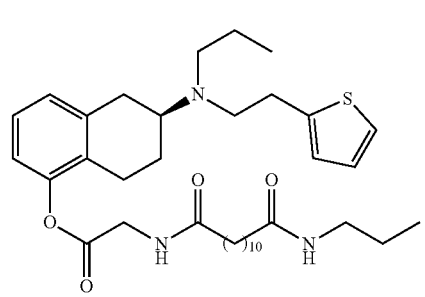
(39)
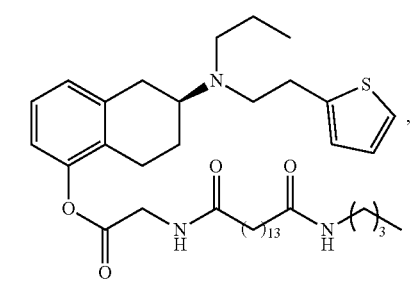
(40)

(41)
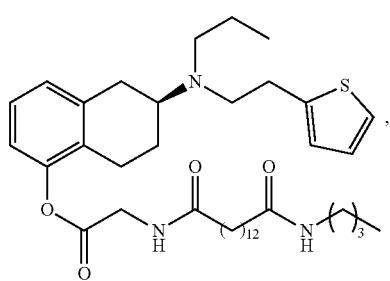
(42)
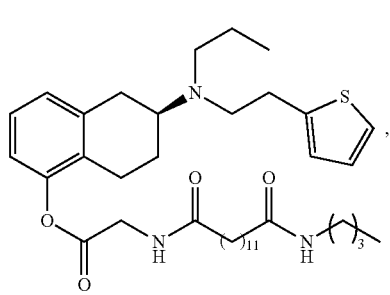
(43)
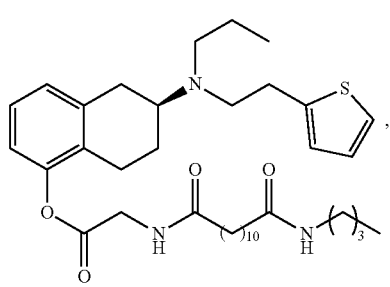
(44)
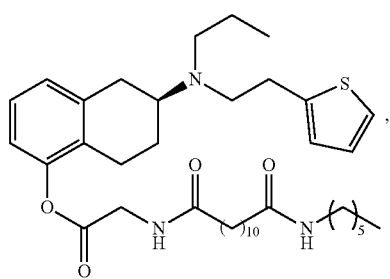
(45)
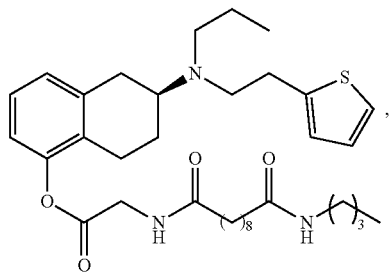
(46)
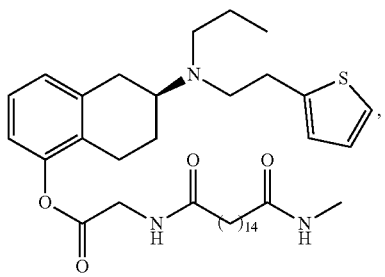
(47)
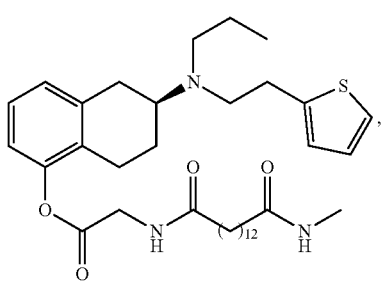
(48)
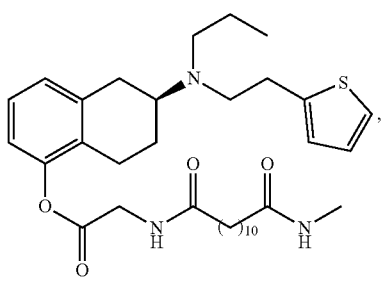
(49)
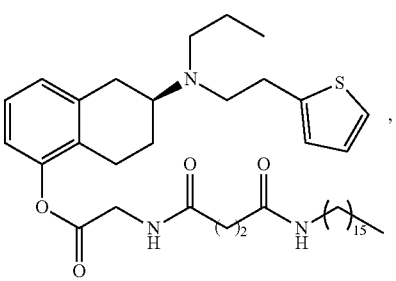
(50)

-continued
(51)
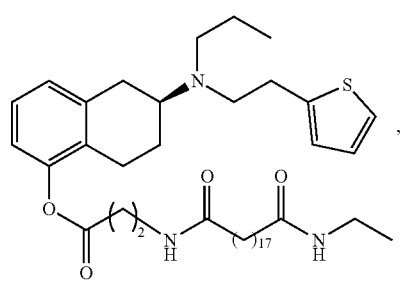
(52)
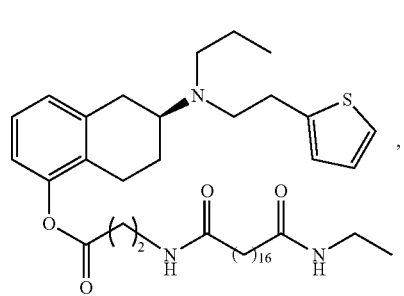
(53)
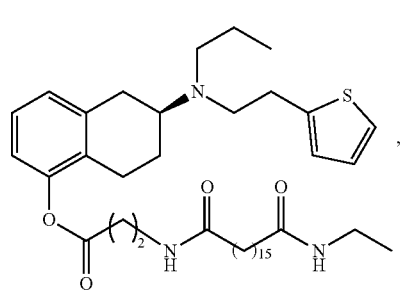
(54)
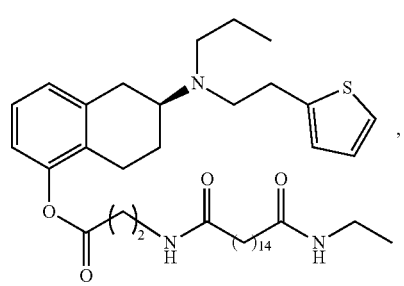
(55)
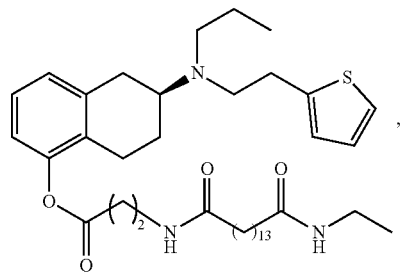
-continued
(56)
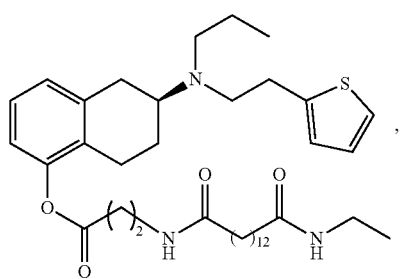
(57)
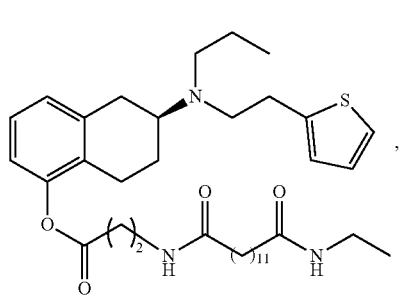
(58)
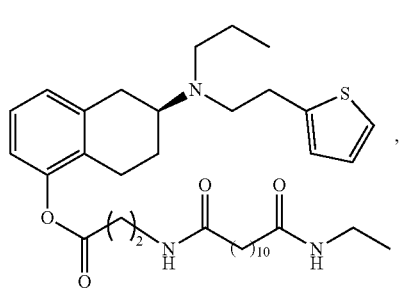
(59)
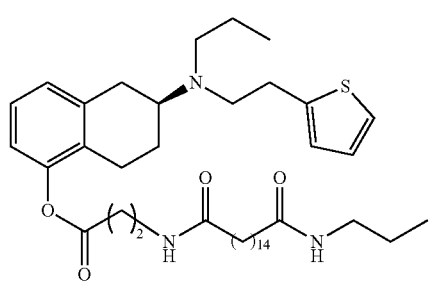
(60)
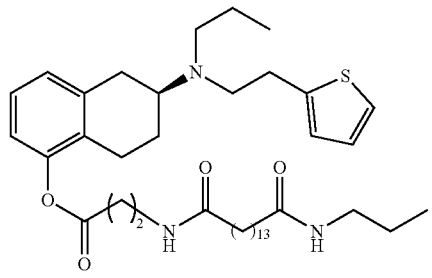

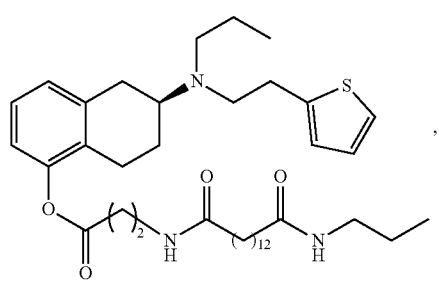
(61)
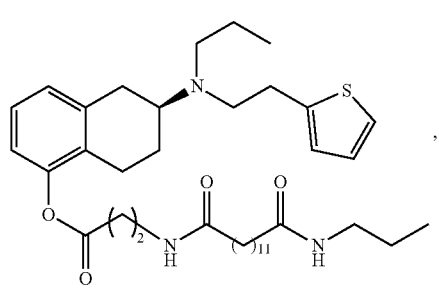
(62)
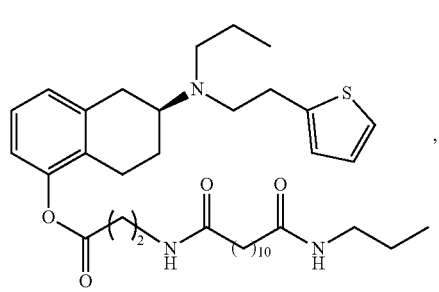
(63)
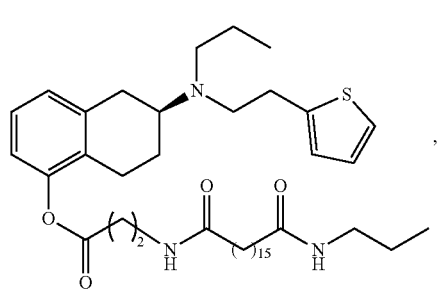
(64)
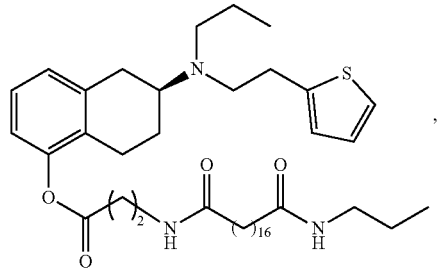
(65)
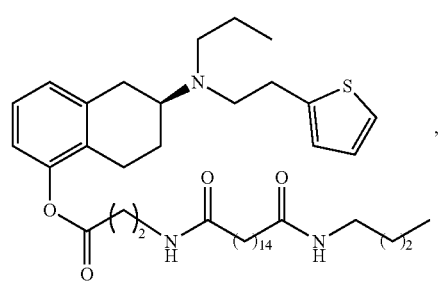
(66)
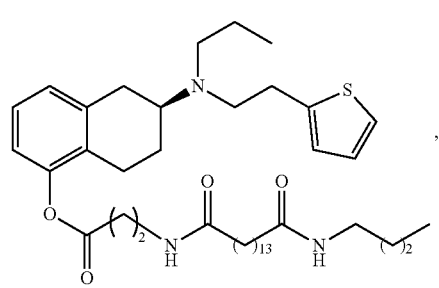
(67)
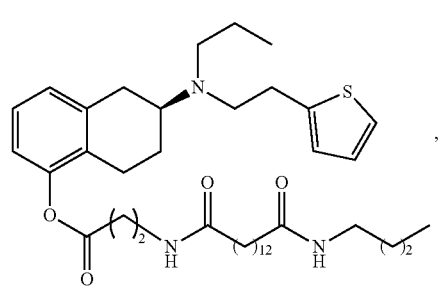
(68)
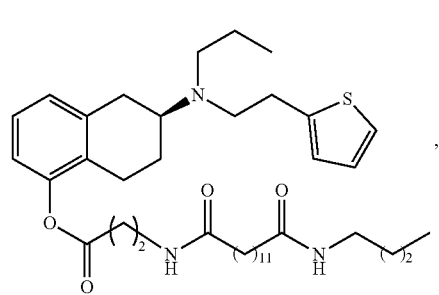
(69)
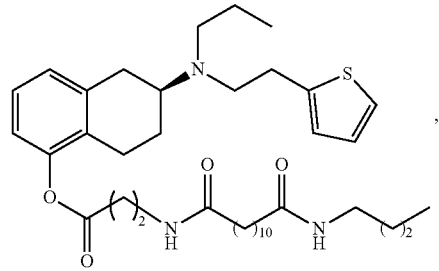
(70)

-continued
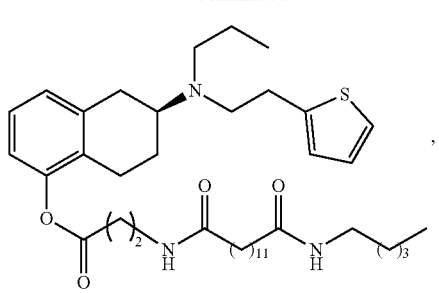 (71)
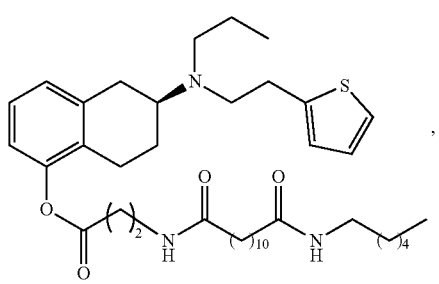 (72)
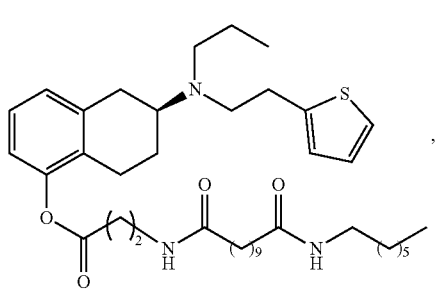 (73)
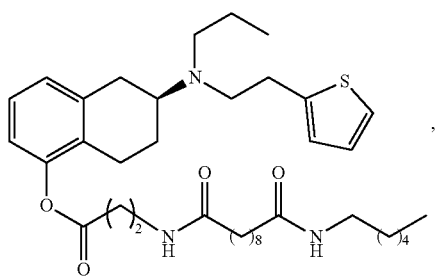 (74)
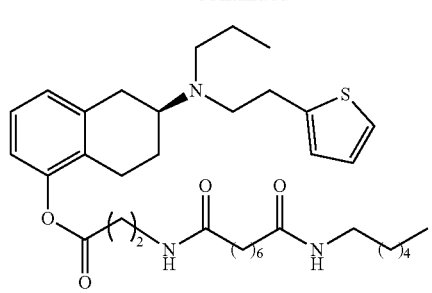 (75)
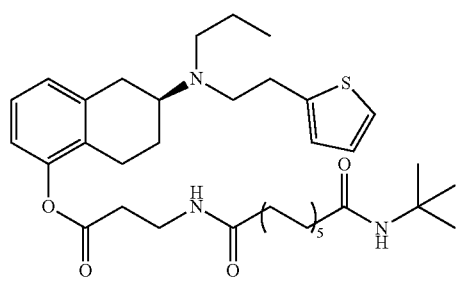 (76)
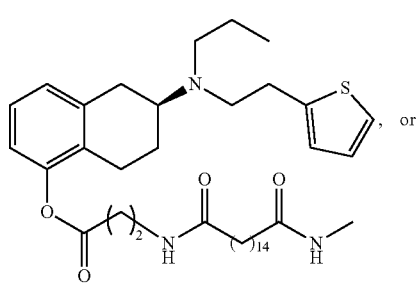 (77)
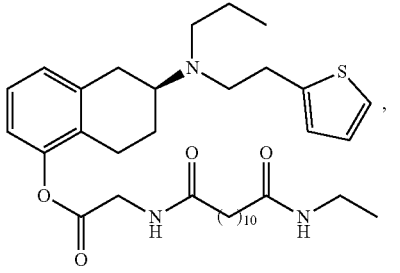 (78)
or a stereoisomer, a solvate, or a pharmaceutically acceptable salt thereof.
20. A pharmaceutical composition, comprising the compound, or the stereoisomer, the solvate, or a pharmaceutically acceptable salt thereof of claim 2, and a pharmaceutically acceptable excipient, a carrier, or a diluent.
* * * * *